US012732999B2

(12) United States Patent
Hoshino et al.

(10) Patent No.: US 12,732,999 B2
(45) Date of Patent: Sep. 8, 2026

(54) COMMUNICATION APPARATUS, BASE STATION, AND COMMUNICATION METHOD

(71) Applicants: DENSO CORPORATION, Kariya-city (JP); TOYOTA JIDOSHA KABUSHIKI KAISHA, Toyota (JP)

(72) Inventors: Masayuki Hoshino, Kariya-city (JP); Hideaki Takahashi, Kariya-city (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 307 days.

(21) Appl. No.: 18/533,416

(22) Filed: Dec. 8, 2023

(65) Prior Publication Data

US 2024/0107539 A1 Mar. 28, 2024

Related U.S. Application Data

(63) Continuation of application No. PCT/JP2022/023185, filed on Jun. 8, 2022.

(30) Foreign Application Priority Data

Jun. 10, 2021 (JP) ................................ 2021-097597

(51) Int. Cl.
*H04W 72/00* (2023.01)
*H04W 72/12* (2023.01)
*H04W 72/20* (2023.01)

(52) U.S. Cl.
CPC .......... *H04W 72/20* (2023.01); *H04W 72/12* (2013.01)

(58) Field of Classification Search
None
See application file for complete search history.

(56) References Cited

U.S. PATENT DOCUMENTS

2020/0236692 A1* 7/2020 Lin .................... H04W 72/535
2022/0104252 A1 3/2022 Shi et al.
2022/0303895 A1* 9/2022 Lin ...................... H04W 72/23
2023/0309115 A1* 9/2023 Zhou ................ H04W 52/0229

FOREIGN PATENT DOCUMENTS

KR 20200121726 A 10/2020

OTHER PUBLICATIONS

RP-200938, Revised WID UE Power Saving Enhancements for NR, MediaTek, Jun. 29-Jul. 3, 2020, pp. 1-5.
R1-2100170, DCI-based power saving adaptation solutions, OPPO, Jan. 25-Feb. 5, 2021, pp. 1-7.
R1-2100593, On enhancements to DCI-based UE power saving during DRX active time, MediaTek, Jan. 25-Feb. 5, 2021, pp. 1-8.
R1-2101476, DCI-based power saving adaptation during DRX Active Time, Qualcomm, Jan. 25-Feb. 5, 2021, pp. 1-4.

(Continued)

*Primary Examiner* — Abdelilah Elmejjarmi
(74) *Attorney, Agent, or Firm* — Harness, Dickey & Pierce, P.L.C.

(57) ABSTRACT

A communication apparatus comprises a transmitter configured to transmit a scheduling request (SR), and a controller configured to control a state related to monitoring of a physical downlink control channel (PDCCH) based on the transmission of the SR or a trigger of the SR.

6 Claims, 30 Drawing Sheets

(56) References Cited

OTHER PUBLICATIONS

R1-2105118, Enhanced DCI-based power saving adaptation, Apple, May 10-May 27, 2021, pp. 1-6.
R1-2104253, Extension(s) to Rel-16 DCI-based power saving adaptation for an active BWP, Huawei, May 10-27, 2021, pp. 1-6.
R1-2105505, UE power saving enhancements for Active Time, Nokia, May 10-27, 2021, pp. 1-8.
3GPP TSG RAN WG1 #105-e, R1-2106243, DCI-based power saving adaptation, Moderator (vivo), May 10-27, 2021, pp. 1-85.

* cited by examiner

FIG. 2

100
UE
NAS
RRC
PDCP
RLC
MAC
PHY

200
BASE STATION
RRC
PDCP
RLC
MAC
PHY

300
CORE NETWORK APPARATUS (AMF)
NAS

FIG. 5

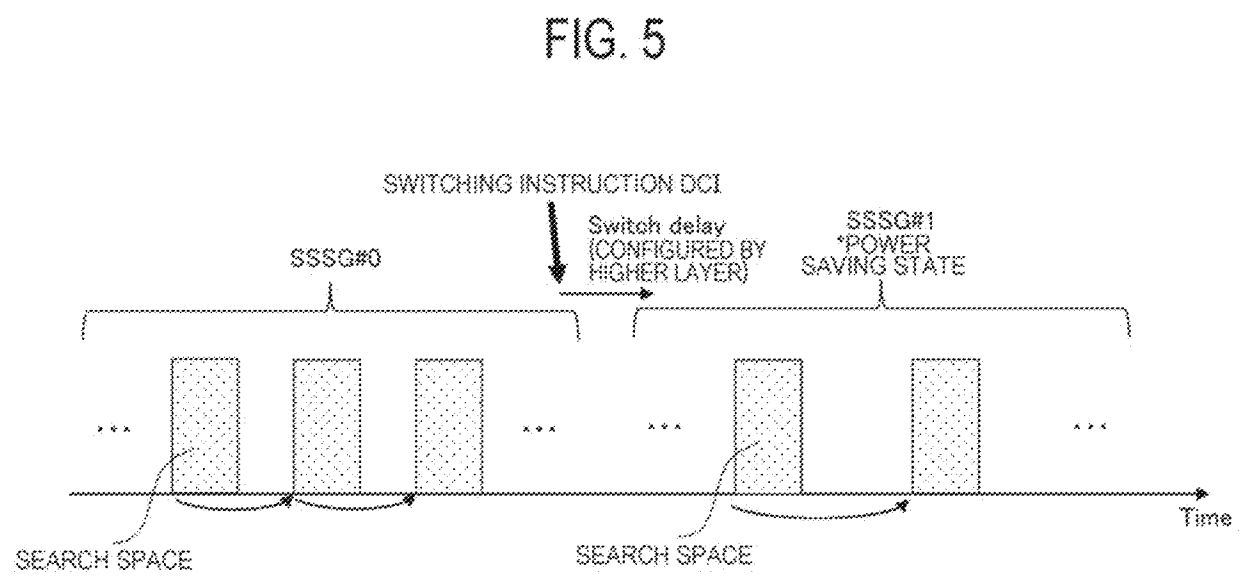

SWITCHING INSTRUCTION DCI
Switch delay (CONFIGURED BY HIGHER LAYER)
SSSG#0
SSSG#1 (POWER SAVING STATE)
SEARCH SPACE
SEARCH SPACE
Time START
S21
APPLY CERTAIN SSSG
S22
RECEIVE SWITCHING INSTRUCTION DCI FROM BASE STATION
S23
· SWITCH TO INSTRUCTED SSSG
· ACTIVATE SWITCHING TIMER
S24
SWITCHING TIMER EXPIRES?
YES
NO
S25
SWITCH TO DEFAULT SSSG
END UE 100
BASE STATION 200
S31
RRC MESSAGE
(SR CONFIGURATION)
S32
SR TRANSMISSION TRIGGER
S33
SR (PUCCH)
S34
UL GRANT

FIG. 13

100
UE
120
CONTROLLER
110
COMMUNICATOR
111
TRANSMITTER
112
RECEIVER

FIG.17

*SchedulingRequestConfig* information element

```
-- ASN1START
-- TAG-SCHEDULINGREQUESTCONFIG-START

SchedulingRequestConfig ::=          SEQUENCE {
    schedulingRequestToAddModList        SEQUENCE (SIZE (1..maxNrofSR-ConfigPerCellGroup)) OF SchedulingRequestToAddMod
                                                                                          OPTIONAL, -- Need N
    schedulingRequestToReleaseList       SEQUENCE (SIZE (1..maxNrofSR-ConfigPerCellGroup)) OF SchedulingRequestId
                                                                                          OPTIONAL  -- Need N
}

SchedulingRequestToAddMod ::=        SEQUENCE {
    schedulingRequestId                  SchedulingRequestId,
    sr-ProhibitTimer                     ENUMERATED {ms1, ms2, ms4, ms8, ms16, ms32, ms64, ms128}        OPTIONAL, -- Need S
    sr-TransMax                          ENUMERATED { n4, n8, n16, n32, n64, spare3, spare2, spare1}
}

SchedulingRequestConfig-v17xy ::=          SEQUENCE {
    schedulingRequestToAddModListExt-r17        SEQUENCE (SIZE (1..maxNrofSR-ConfigPerCellGroup)) OF
SchedulingRequestToAddMod-v17xy
}

SchedulingRequestToAddMod-v17xy ::=        SEQUENCE {
   searchSpaceSetId-r17                   SearchSpaceSetId-r17                              OPTIONAL-- Need N
}


-- TAG-SCHEDULINGREQUESTCONFIG-STOP
-- ASN1STOP
```

*SchedulingRequestResourceConfig* information element

```
-- ASN1START
-- TAG-SCHEDULINGREQUESTRESOURCECONFIG-START

SchedulingRequestResourceConfig ::=     SEQUENCE {
    schedulingRequestResourceId             SchedulingRequestResourceId,
    schedulingRequestID                     SchedulingRequestId,
    periodicityAndOffset                    CHOICE {
        sym2                                    NULL,
        sym6or7                                 NULL,
        sl1                                     NULL,                       -- Recurs in every slot
        sl2                                     INTEGER (0..1),
        sl4                                     INTEGER (0..3),
        sl5                                     INTEGER (0..4),
        sl8                                     INTEGER (0..7),
        sl10                                    INTEGER (0..9),
        sl16                                    INTEGER (0..15),
        sl20                                    INTEGER (0..19),
        sl40                                    INTEGER (0..39),
        sl80                                    INTEGER (0..79),
        sl160                                   INTEGER (0..159),
        sl320                                   INTEGER (0..319),
        sl640                                   INTEGER (0..639)
    }                                                                       OPTIONAL,   -- Need M
    resource                                PUCCH-ResourceId                OPTIONAL    -- Need M
}

SchedulingRequestResourceConfigExt-v1610 ::=    SEQUENCE {
    phy-PriorityIndex-r16                       ENUMERATED {p0, p1}         OPTIONAL,   -- Need M
    ...,
    [[
    searchSpaceSetId-r17                        SearchSpaceSetId-r17        OPTIONAL    -- Need M
    ]]
}

-- TAG-SCHEDULINGREQUESTRESOURCECONFIG-STOP
-- ASN1STOP
```

*PDCCH-Config* information element

```
-- ASN1START
-- TAG-PDCCH-CONFIG-START

PDCCH-Config ::=                    SEQUENCE {
    controlResourceSetToAddModList      SEQUENCE(SIZE (1..3)) OF ControlResourceSet                          OPTIONAL,   -- Need N
    controlResourceSetToReleaseList     SEQUENCE(SIZE (1..3)) OF ControlResourceSetId                        OPTIONAL,   -- Need N
    searchSpacesToAddModList            SEQUENCE(SIZE (1..10)) OF SearchSpace                                OPTIONAL,   -- Need N
    searchSpacesToReleaseList           SEQUENCE(SIZE (1..10)) OF SearchSpaceId                              OPTIONAL,   -- Need N
    downlinkPreemption                  SetupRelease { DownlinkPreemption }                                  OPTIONAL,   -- Need M
    tpc-PUSCH                           SetupRelease { PUSCH-TPC-CommandConfig }                             OPTIONAL,   -- Need M
    tpc-PUCCH                           SetupRelease { PUCCH-TPC-CommandConfig }                             OPTIONAL,   -- Need M
    tpc-SRS                             SetupRelease { SRS-TPC-CommandConfig}                                OPTIONAL,   -- Need M
    ...,
    [[
    controlResourceSetToAddModListSizeExt-v1610 SEQUENCE (SIZE (1..2)) OF ControlResourceSet                 OPTIONAL,   -- Need N
    controlResourceSetToReleaseListSizeExt-r16 SEQUENCE (SIZE (1..5)) OF ControlResourceSetId-r16            OPTIONAL,   -- Need N
    searchSpacesToAddModListExt-r16     SEQUENCE(SIZE (1..10)) OF SearchSpaceExt-r16                         OPTIONAL,   -- Need N
    uplinkCancellation-r16              SetupRelease { UplinkCancellation-r16 }                              OPTIONAL,   -- Need M
    monitoringCapabilityConfig-r16      ENUMERATED { r15monitoringcapability,r16monitoringcapability }       OPTIONAL,   -- Need M
    searchSpaceSwitchConfig-r16         SearchSpaceSwitchConfig-r16                                          OPTIONAL    -- Need R
    ]],
    [[
    defaultSearchSpaceSet-r17           SearchSpaceSetId-r17                                                 OPTIONAL,   -- Need S
    firstSearchSpaceSet-r17             SearchSpaceSetId-r17                                                 OPTIONAL,   -- Need M
    ]]
}

SearchSpaceSwitchConfig-r16 ::=     SEQUENCE {
    cellGroupsForSwitchList-r16         SEQUENCE(SIZE (1..4)) OF CellGroupForSwitch-r16                      OPTIONAL,   -- Need R
    searchSpaceSwitchDelay-r16          INTEGER (10..52)                                                     OPTIONAL    -- Need R
}

CellGroupForSwitch-r16 ::=          SEQUENCE(SIZE (1..16)) OF ServCellIndex

-- TAG-PDCCH-CONFIG-STOP
-- ASN1STOP
```

Figure 20:
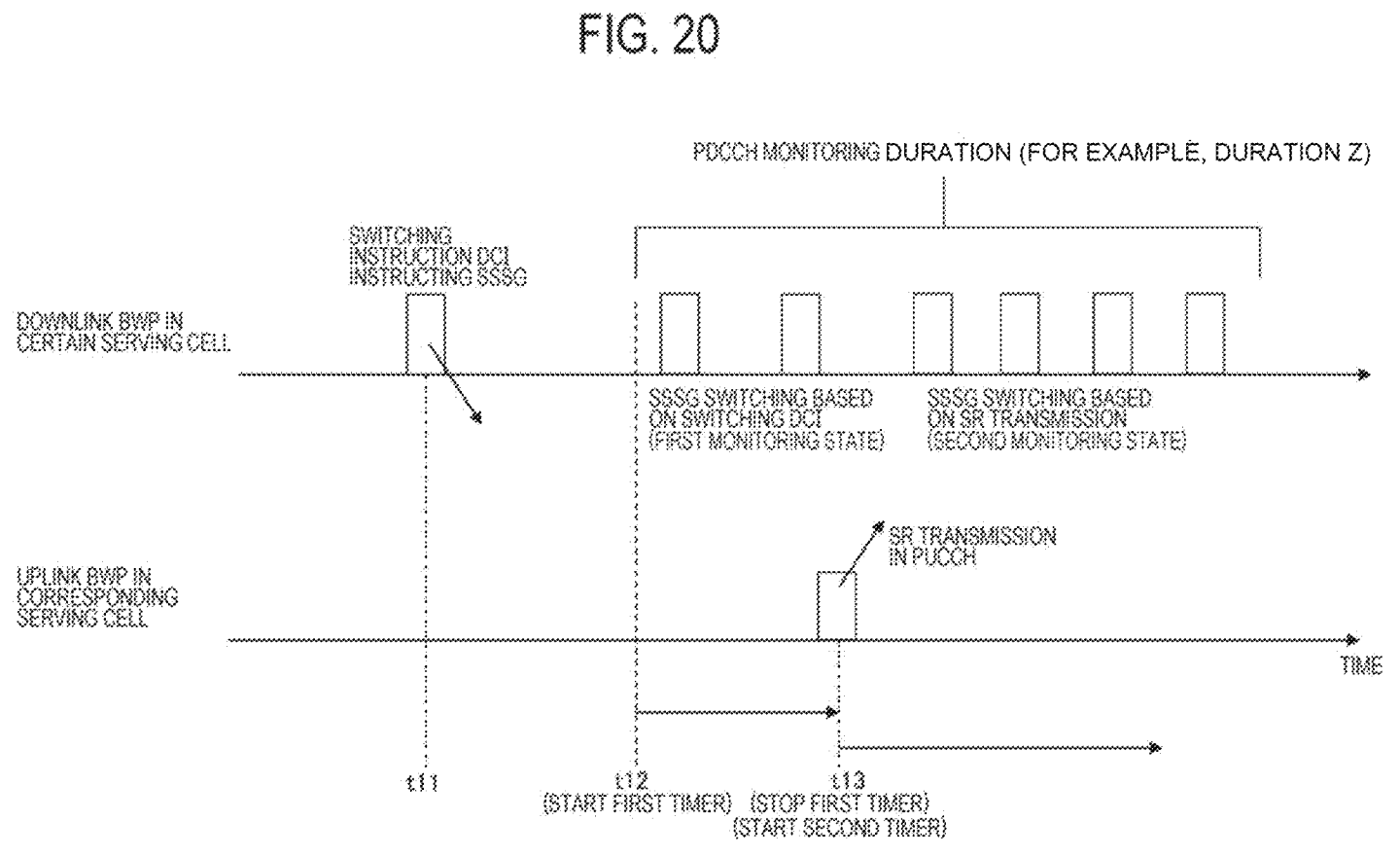

PDCCH MONITORING DURATION (FOR EXAMPLE, DURATION Z)

SWITCHING INSTRUCTION DCI INSTRUCTING SSSG

DOWNLINK BWP IN CERTAIN SERVING CELL

SSSG SWITCHING BASED ON SWITCHING DCI (FIRST MONITORING STATE)

SSSG SWITCHING BASED ON SR TRANSMISSION (SECOND MONITORING STATE)

SR TRANSMISSION IN PUCCH

UPLINK BWP IN CORRESPONDING SERVING CELL

TIME t11 t12 (START FIRST TIMER)

t13 (STOP FIRST TIMER) (START SECOND TIMER)

FIG. 21

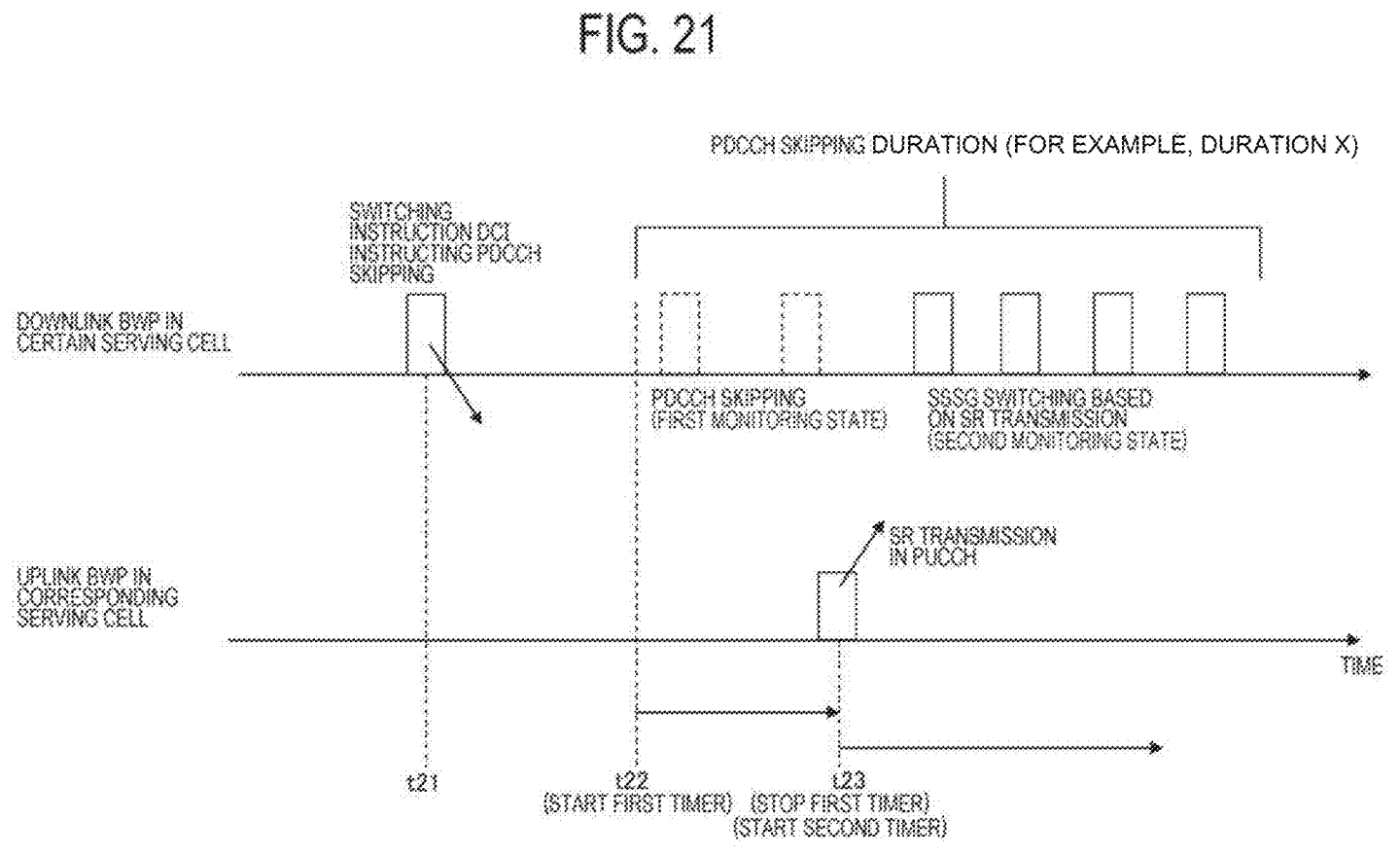

PDCCH SKIPPING DURATION (FOR EXAMPLE, DURATION X)
SWITCHING INSTRUCTION DCI INSTRUCTING PDCCH SKIPPING
DOWNLINK BWP IN CERTAIN SERVING CELL
PDCCH SKIPPING (FIRST MONITORING STATE)
SSSG SWITCHING BASED ON SR TRANSMISSION (SECOND MONITORING STATE)
SR TRANSMISSION IN PUCCH
UPLINK BWP IN CORRESPONDING SERVING CELL
TIME
t21
t22 (START FIRST TIMER)
t23 (STOP FIRST TIMER) (START SECOND TIMER)

FIG. 22

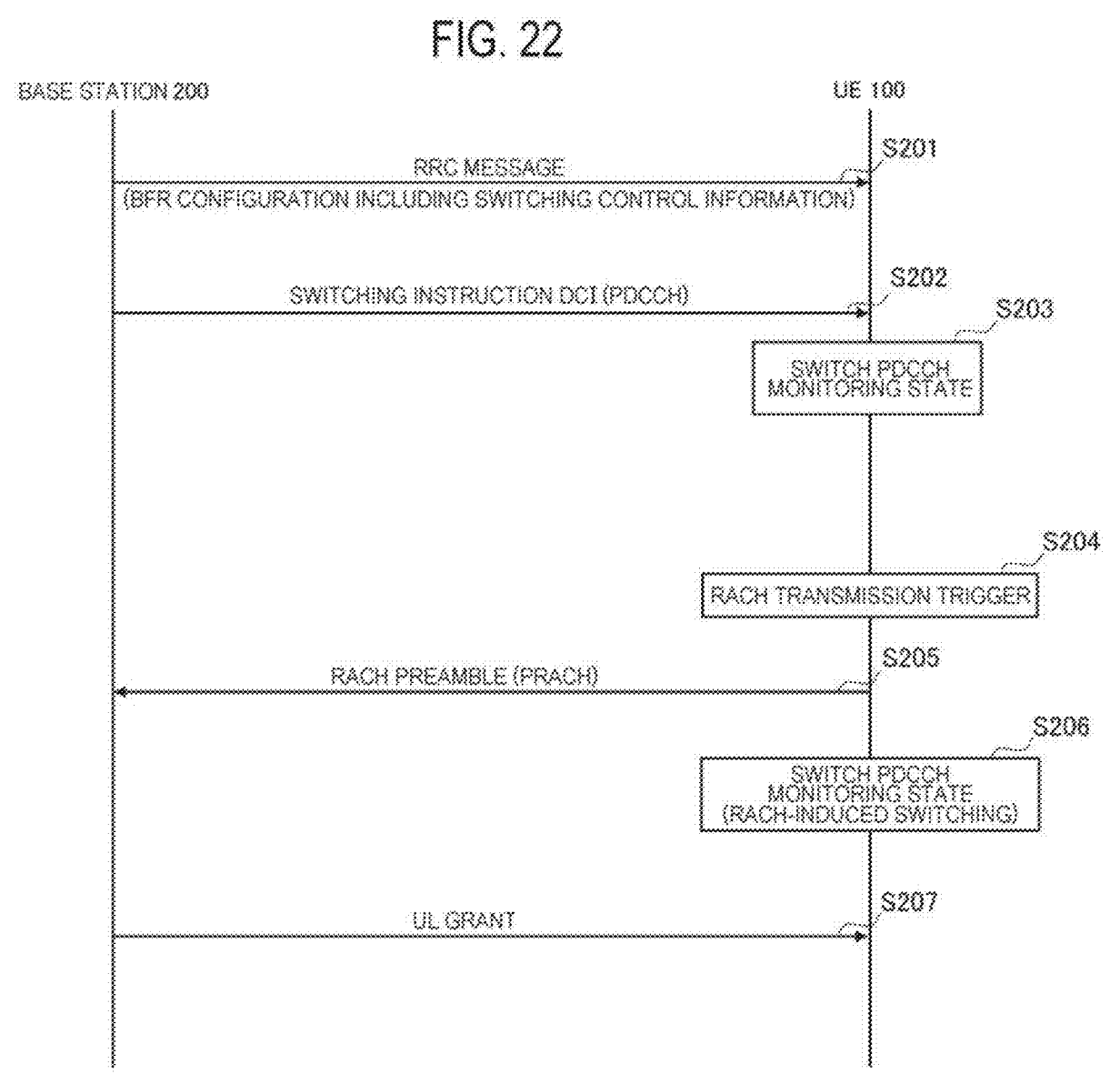

BASE STATION 200

UE 100

S201

RRC MESSAGE
(BFR CONFIGURATION INCLUDING SWITCHING CONTROL INFORMATION)

S202

SWITCHING INSTRUCTION DCI (PDCCH)

S203

SWITCH PDCCH
MONITORING STATE

S204

RACH TRANSMISSION TRIGGER

S205

RACH PREAMBLE (PRACH)

S206

SWITCH PDCCH
MONITORING STATE
(RACH-INDUCED SWITCHING)

S207

UL GRANT

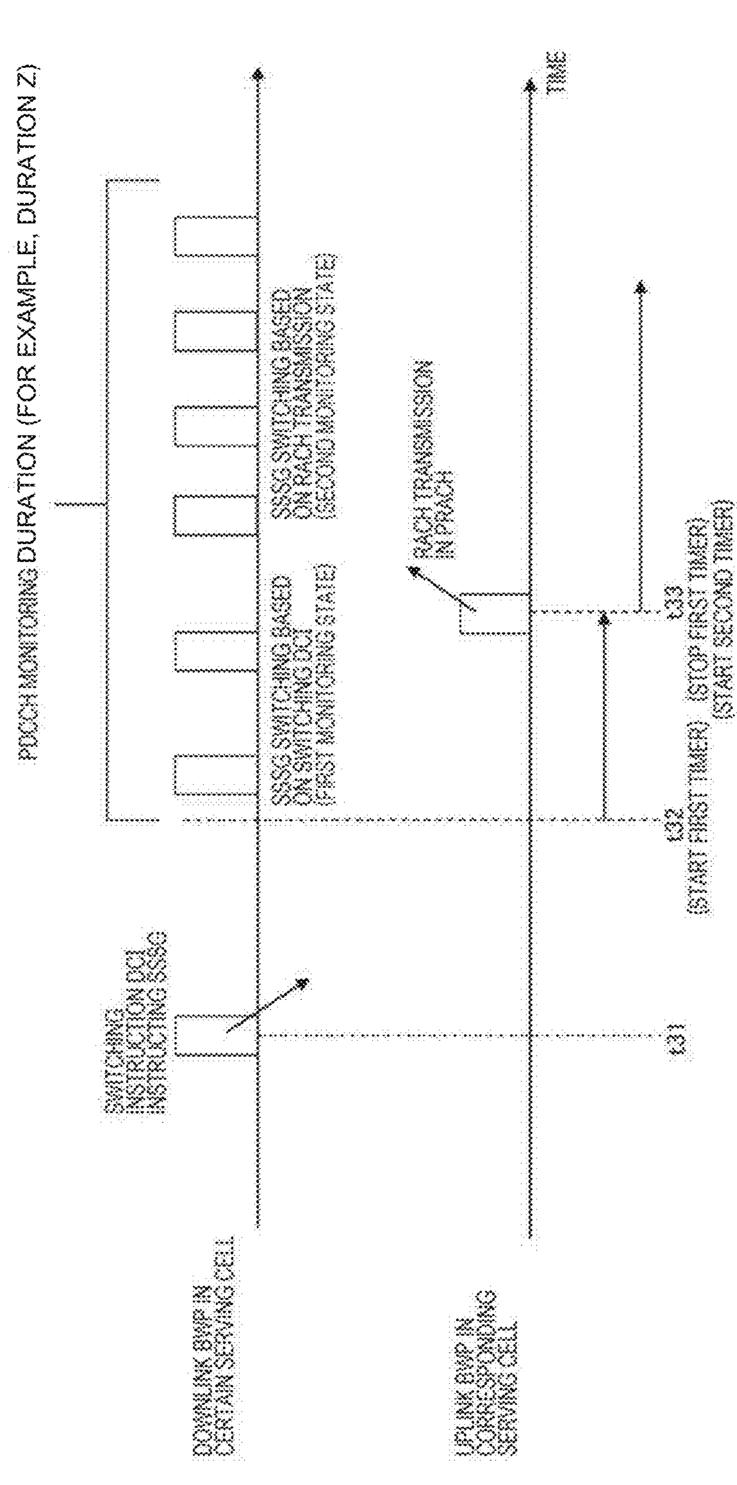
FIG. 27
PDCCH MONITORING DURATION (FOR EXAMPLE, DURATION Z)
TIME
SWITCHING INSTRUCTION DCI INSTRUCTING SSSG
SSSG SWITCHING BASED ON SWITCHING DCI (FIRST MONITORING STATE)
SSSG SWITCHING BASED ON RACH TRANSMISSION (SECOND MONITORING STATE)
RACH TRANSMISSION IN PRACH
DOWNLINK BWP IN CERTAIN SERVING CELL
UPLINK BWP IN CORRESPONDING SERVING CELL
t31
t32 (START FIRST TIMER)
t33 (STOP FIRST TIMER) (START SECOND TIMER)

FIG. 28

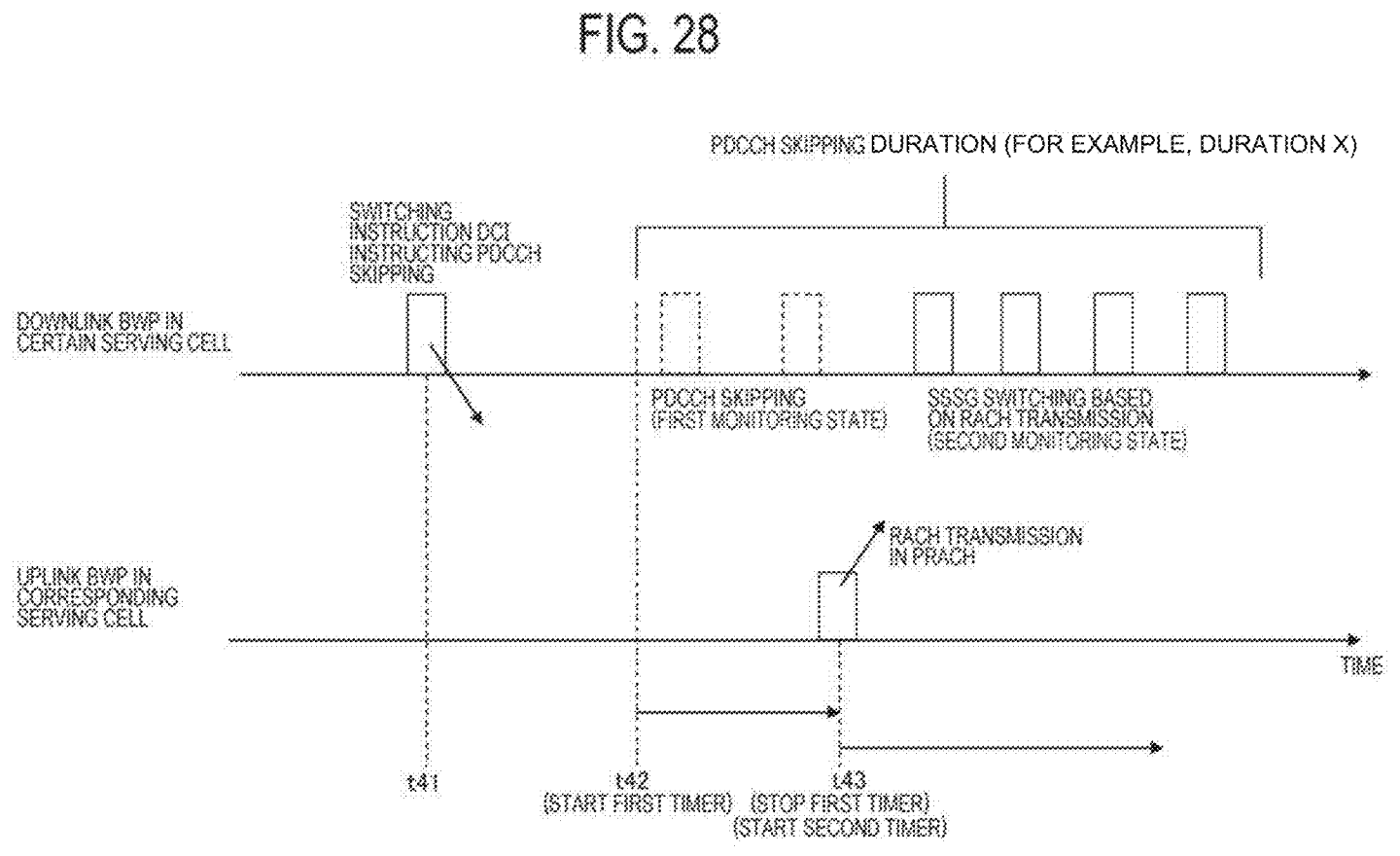

PDCCH SKIPPING DURATION (FOR EXAMPLE, DURATION X)

SWITCHING INSTRUCTION DCI INSTRUCTING PDCCH SKIPPING

DOWNLINK BWP IN CERTAIN SERVING CELL

PDCCH SKIPPING (FIRST MONITORING STATE)

SSSG SWITCHING BASED ON RACH TRANSMISSION (SECOND MONITORING STATE)

RACH TRANSMISSION IN PRACH

UPLINK BWP IN CORRESPONDING SERVING CELL

TIME t41 t42 (START FIRST TIMER)

t43 (STOP FIRST TIMER) (START SECOND TIMER)

BASE STATION 200
UE 100
RRC MESSAGE
(CELL GROUP CONFIGURATION)
S301
SWITCHING INSTRUCTION DCI (PDCCH)
S302
SWITCH PDCCH
MONITORING STATE
S303
SR OR RACH TRANSMISSION TRIGGER
S304
SR OR RACH PREAMBLE
S305
SWITCH PDCCH MONITORING STATE IN UNITS OF CELL GROUPS
(SR-INDUCED SIMULTANEOUS SWITCHING
OR RACH-INDUCED SIMULTANEOUS SWITCHING)
S306
UL GRANT
S307

BASE STATION 200
UE 100
S311
RRC MESSAGE
(CELL GROUP CONFIGURATION)
S312
SWITCHING INSTRUCTION DCI (PDCCH)
S313
SWITCH PDCCH MONITORING STATE
S314
SR OR RACH TRANSMISSION TRIGGER
S315
SWITCH PDCCH MONITORING STATE IN UNITS OF CELL GROUPS
(SR-INDUCED SIMULTANEOUS SWITCHING
OR RACH-INDUCED SIMULTANEOUS SWITCHING)
S316
SR OR RACH PREAMBLE
S317
UL GRANT

COMMUNICATION APPARATUS, BASE STATION, AND COMMUNICATION METHOD

CROSS-REFERENCE TO RELATED APPLICATIONS

The present application is a continuation application of international Patent Application No. PCT/JP2022/023185, filed on Jun. 8, 2022, which designated the U.S., and claims the benefit of priority of Japanese Patent Application No. 2021-097597, filed on Jun. 10, 2021, the entire contents of which are incorporated herein by reference.

TECHNICAL FIELD

The present disclosure relates to a communication apparatus, a base station, and a communication method used in a mobile communication system.

BACKGROUND ART

In recent years, in 3rd Generation Partnership Project (3GPP) (registered trademark, the same hereinbelow) which is a mobile communication system standardization project, introduction of a power saving technology for reducing power consumption of a communication apparatus in a radio resource control (RRC) connected state into a 5th generation (5G) system has been studied (see Non Patent Literature 1).

For example, in order to reduce power consumption necessary for monitoring a physical downlink control channel (PDCCH) in a communication apparatus, it has been studied to lengthen a monitoring period of the PDCCH or switch to a power saving state in which the monitoring of the PDCCH is skipped. In particular, in the communication apparatus, by dynamically switching the PDCCH monitoring state within the active time in the intermittent reception (DRX) of the RRC connected state, it is possible to obtain a greater effect of power consumption reduction than the power consumption reduction by DRX.

CITATION LIST

Non Patent Literature

Non Patent Literature 1: 3GPP Contribution RP-200938 "Revised WID UE Power Saving Enhancements for NR"

Non Patent Literature 2: 3GPP Contribution R1-2104253 "Extension(s) to Rel-16 DCI-based power saving adaptation for an active BWP"

Non Patent Literature 3: 3GPP Contribution R1-2105505 "UE power saving enhancements for Active Time"

SUMMARY OF INVENTION

A communication apparatus according to a first feature comprises: a transmitter configured to transmit a scheduling request (SR); and a controller configured to control a state related to monitoring of a physical downlink control channel (PDCCH) based on the transmission of the SR or a trigger of the SR.

A base station according to a second feature comprises a controller configured to control transmission of a scheduling request (SR) from a communication apparatus and control a state related to monitoring of a physical downlink control channel (PDCCH). A state related to the monitoring of the PDCCH is controlled based on the transmission of the SR or a trigger of the SR.

A communication method of a communication apparatus according to a third feature, the communication method comprises the steps of: transmitting a scheduling request (SR); and controlling a state related to monitoring of a physical downlink control channel (PDCCH) based on the transmission of the SR or a trigger of the SR.

A communication method of a base station according to a fourth feature, the communication method comprises the steps of: controlling transmission of a scheduling request (SR) from a communication apparatus; and controlling a state related to monitoring of a physical downlink control channel (PDCCH). The state related to the monitoring of the PDCCH is controlled based on the transmission of the SR or a trigger of the SR.

BRIEF DESCRIPTION OF DRAWINGS

FIG. 2 is a diagram illustrating a configuration example of a protocol stack according to the embodiment.

FIG. 5 is a diagram illustrating an outline of search space set (SSSG) switching according to the embodiment.

FIG. 13 is a diagram illustrating a configuration of a UE according to an embodiment.

FIG. 17 is a diagram illustrating a first configuration example of an RRC message according to the embodiment.

FIG. 18 is a diagram illustrating a second configuration example of an RRC message according to the embodiment.

FIG. 19 is a diagram illustrating a third configuration example of an RRC message according to the embodiment.

FIG. 20 is a diagram illustrating a first specific example of the SR-induced switching processing according to the embodiment.

FIG. 21 is a diagram illustrating a second specific example of the SR-induced switching processing according to the embodiment.

FIG. 22 is a diagram illustrating a first operation sequence example related to a RACH-induced switching processing according to an embodiment.

FIG. 27 is a diagram illustrating a first specific example of a RACH-induced switching processing according to the embodiment.

FIG. 28 is a diagram illustrating a second specific example of the RACH-induced switching processing according to the embodiment.

DESCRIPTION OF EMBODIMENTS

Figure 1:
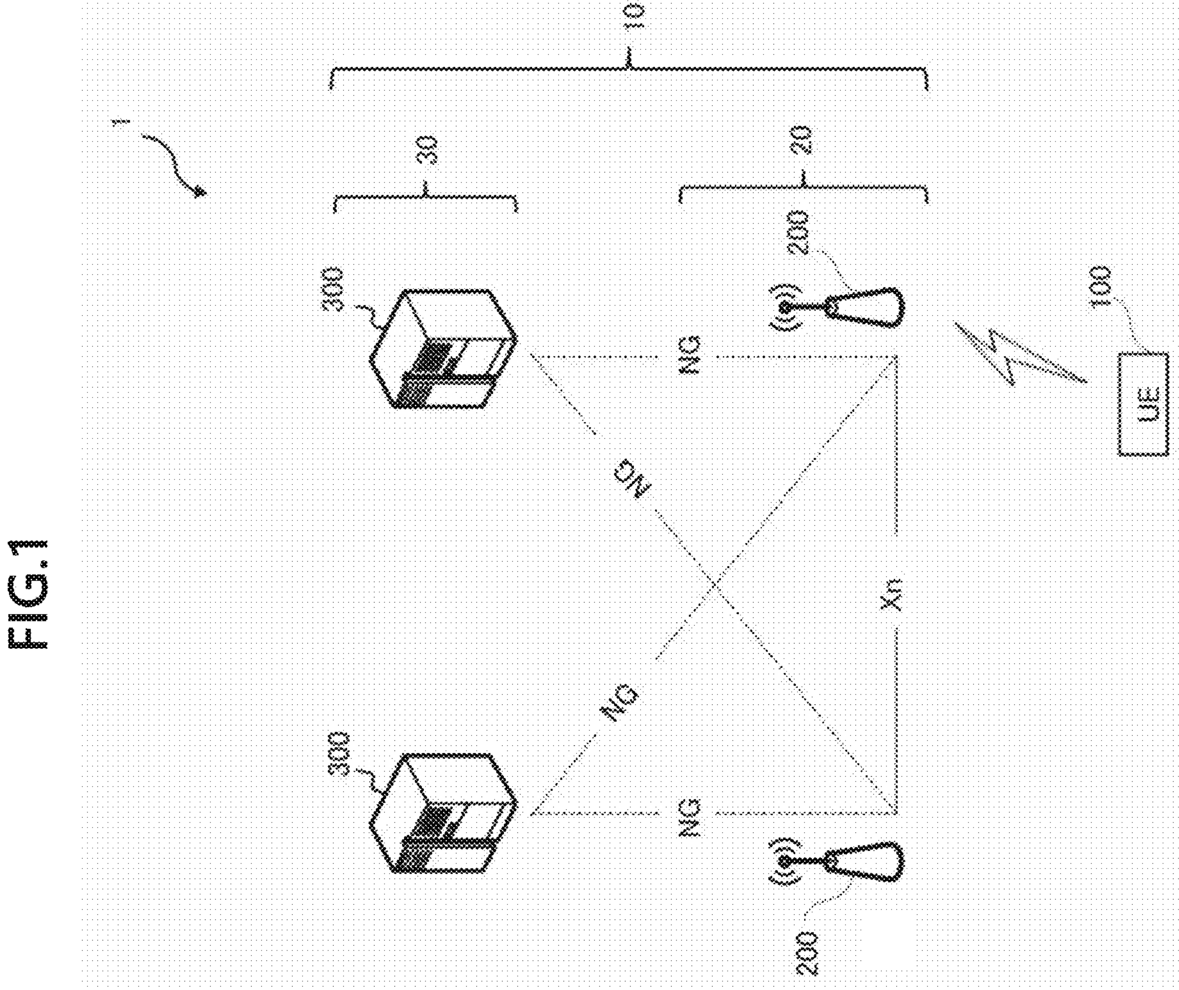
FIG. 1 is a diagram illustrating a configuration of a mobile communication system according to an embodiment.

In a method in which a communication apparatus switches a PDCCH monitoring state in response to SR transmission, when the communication apparatus autonomously switches a PDCCH monitoring state, a mismatch may occur between an actual PDCCH monitoring state in the communication apparatus and a PDCCH monitoring state recognized by a base station. Therefore, there is a concern that the base station cannot appropriately perform radio communication with the communication apparatus after the communication apparatus switches the PDCCH monitoring state in response to SR transmission.

Therefore, an embodiment provides a communication apparatus, a base station, and a communication method capable of appropriately performing radio communication even in a case of switching a PDCCH monitoring state.

A mobile communication system according to an embodiment will be described with reference to the drawings. In the description of the drawings, the same or similar parts are denoted by the same or similar reference numerals.

(1) Mobile Communication System

A mobile communication system according to the present embodiment will be described.

First, a configuration of a mobile communication system 1 according to the present embodiment will be described with reference to FIG. 1. The mobile communication system 1 is, for example, a system conforming to a technical specification (TS) of 3GPP. Hereinafter, as the mobile communication system 1, a description will be given, as an example, as to a fifth generation system (5th generation system: 5GS) of the 3GPP standard, that is, a mobile communication system based on new radio (NR).

The mobile communication system 1 includes a network 10 and a user equipment (UE) 100 that communicates with the network 10. The network 10 includes a next generation radio access network (NG-RAN) 20, which is a 5G radio access network, and a 5G core network (5GC) 30, which is a 5G core network.

The UE 100 is an equipment used by a user. The UE 100 is, for example, a mobile apparatus such as a mobile phone terminal such as a smartphone, a tablet terminal, a notebook PC, a communication module, or a communication card. The UE 100 may be a vehicle (for example, a car, a train, or the like) or a device provided in the vehicle. The UE 100 may be a transport body other than a vehicle (for example, a ship, an airplane, or the like) or a device provided in the transport body. The UE 100 may be a sensor or a device provided in the sensor. It is noted that the UE 100 may be referred to as another name such as a mobile station, a mobile terminal, a mobile apparatus, a mobile unit, a subscriber station, a subscriber terminal, a subscriber apparatus, a subscriber unit, a wireless station, a wireless terminal, a wireless apparatus, a wireless unit, a remote station, a remote terminal, a remote apparatus, or a remote unit.

The NG-RAN 20 includes a plurality of base stations 200. Each of the base stations 200 manages at least one cell. A cell forms a minimum unit of a communication area. One cell belongs to one frequency (a carrier frequency) and is formed by one component carrier. The term "cell" may represent a radio communication resource, and may also represent a communication target of the UE 100. Each base station 200 can perform radio communication with the UE 100 existing in its own cell. The base station 200 communicates with the UE 100 using a protocol stack of the RAN. The base station 200 provides NR user plane and control plane protocol terminations towards the UE 100 and is connected to the 5GC 30 via an NG interface. Such an NR base station 200 may be referred to as a gNodeB (gNB).

The 5GC 30 includes a core network apparatus 300. The core network apparatus 300 includes, for example, an access and mobility management function (AMF) and/or a user plane function (UPF). The AMF performs mobility management of the UE 100. The UPF provides a function specialized for user plane processing. The AMF and the UPF are connected to the base station 200 via the NG interface.

Figure 2:
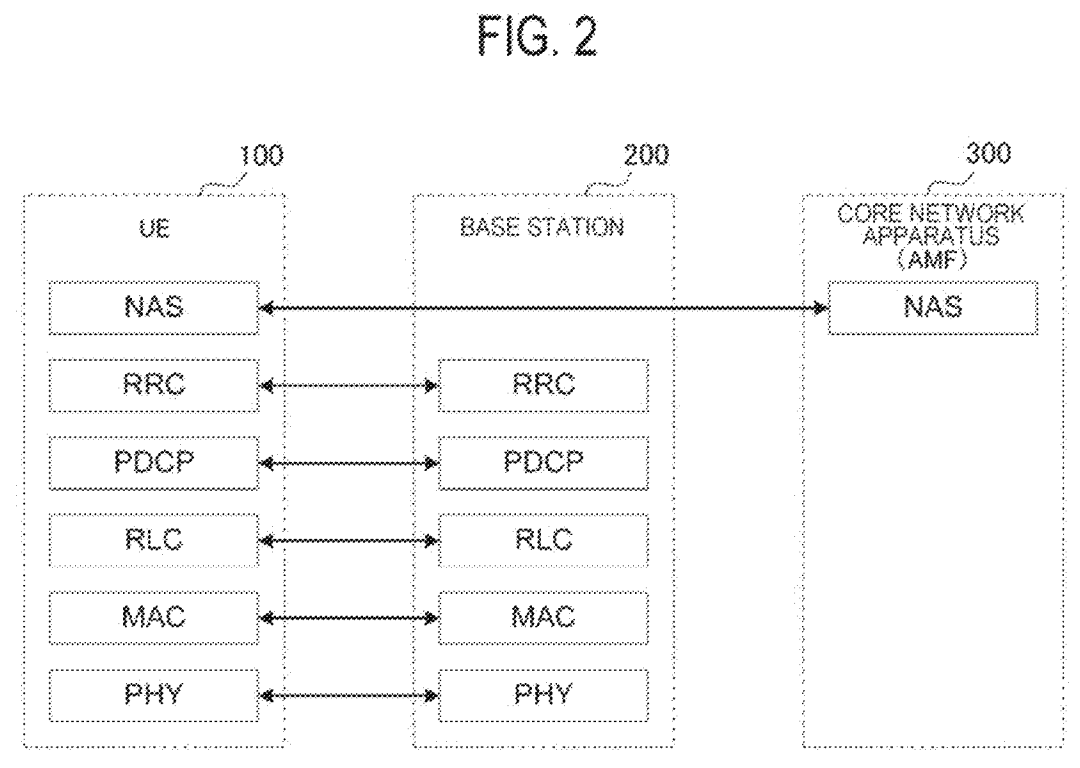

Next, a configuration example of the protocol stack according to the present embodiment will be described with reference to FIG. 2.

A protocol of a radio section between the UE 100 and the base station 200 includes a physical (PHY) layer, a medium access control (MAC) layer, a radio link control (RLC) layer, a packet data convergence protocol (PDCP) layer, and an RRC layer.

The PHY layer performs encoding/decoding, modulation/demodulation, antenna mapping/demapping, and resource mapping/demapping. Data and control information are transmitted, via a physical channel, between the PHY layer of the UE 100 and the PHY layer of the base station 200.

The MAC layer performs data priority control, retransmission processing by hybrid ARQ (HARM), a random access procedure, and the like. Data and control information are transmitted, via a transport channel, between the MAC layer of the UE 100 and the MAC layer of the base station 200. The MAC layer of the base station 200 includes a scheduler. The scheduler determines uplink and downlink transport formats (transport block size, modulation and coding scheme (MCS)) and allocated resources to the UE 100.

The RLC layer transmits data to the RLC layer on the reception side using the functions of the MAC layer and the PHY layer. Data and control information are transmitted, via a logical channel, between the RLC layer of the UE 100 and the RLC layer of the base station 200.

The PDCP layer performs header compression/decompression and encryption/decryption.

A service data adaptation protocol (SDAP) layer may be provided as a higher layer of the PDCP layer. The service data adaptation protocol (SDAP) layer performs mapping between an IP flow, which is a unit in which a core network performs QoS control, and a radio bearer, which is a unit in which an access stratum (AS) performs QoS control.

The RRC layer controls a logical channel, a transport channel, and a physical channel according to establishment, reestablishment, and release of the radio bearer. RRC signaling for various configurations is transmitted between the RRC layer of the UE 100 and the RRC layer of the base station 200. In a case where there is an RRC connection between the RRC of the UE 100 and the RRC of the base station 200, the UE 100 is in an RRC connected state. In a case where there is no RRC connection between the RRC of the UE 100 and the RRC of the base station 200, the UE 100 is in an RRC idle state. In a case where the RRC connection between the RRC of the UE 100 and the RRC of the base station 200 is suspended, the UE 100 is in an RRC inactive state.

An NAS layer located above the RRC layer performs session management and mobility management of the UE 100. NAS signaling is transmitted between the NAS layer of the UE 100 and the NAS layer of the core network apparatus 300 (AMF). It is noted that the UE 100 has an application layer and the like in addition to the protocol of the radio interface.

Next, an outline of a radio communication operation in the mobile communication system 1 according to the present embodiment will be described with reference to FIG. 3.

The base station 200 configures, in the UE 100, a search space corresponding to a candidate timing at which a PDCCH is provided. The UE 100 in the RRC connected state monitors (monitors) the PDCCH in the configured search space, receives downlink control information (DCI) carried on the PDCCH, and performs reception of a physical downlink shared channel (PDSCH) and/or transmission of a physical uplink shared channel (PUSCH) according to resource allocation (scheduling) indicated by the DCI. For example, the UE 100 may monitor a set of candidates for the PDCCH according to the corresponding search space. That is, the UE 100 may monitor the set of candidates of the PDCCH in the control resource set (CORESET) in the downlink bandwidth part (DL BWP) in the serving cell in which the monitoring of the PDCCH is configured according to the corresponding search space. Here, the monitoring may indicate decoding each of the candidates for the PDCCH according to a DCI format to be monitored.

Figure 3:
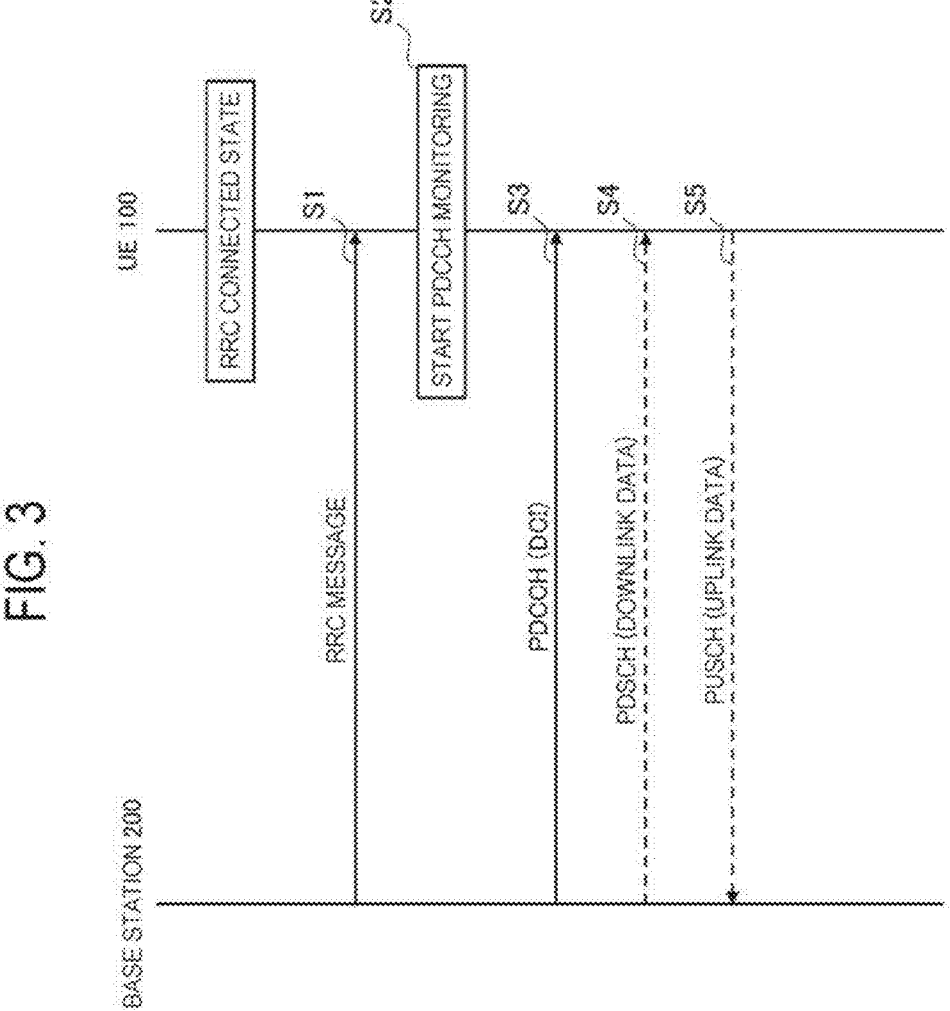
FIG. 3 is a diagram illustrating an outline of a radio communication operation in the mobile communication system according to the embodiment.

As illustrated in FIG. 3, in step S1, the base station 200 transmits the RRC message including the configuration related to the PDCCH (PDCCH configuration) to the UE 100, and performs various configurations related to the PDCCH on the UE 100. The RRC message may be a UE-specific RRC message, and may be, for example, an RRC reconfiguration message. Here, among the configurations related to the PDCCH, a search space configuration includes a search space period (also referred to as a PDCCH monitoring period), a search space offset (also referred to as a PDCCH monitoring offset), search space duration (for example, the number of consecutive slots), a symbol for PDCCH monitoring, an aggregation level, a type of search space, a DCI format, and the like. Here, each of the search spaces (each of the configurations of the search space) may be associated with one CORESET. The search space configuration may be configured for each of one or a plurality of DL BWPs. Here, the type of search space may include a UE-specific search space (USS) and/or a UE-common search space (CSS).

The DCI format includes a scheduling DCI format used for scheduling of the PDSCH or the PUSCH, and a non-scheduling DCI format not used for such scheduling. The DCI transmitted in the scheduling DCI format is referred to as scheduling DCI, and the DCI transmitted in the non-scheduling DCI format is referred to as non-scheduling DCI.

The scheduling DCI format includes a downlink DCI format (for example, a DCI format 1_0, a DCI format 1_1, and a DCI format 1_2) used for scheduling of PDSCH and an uplink DCI format (for example, a DCI format 0_0, a DCI format 0_1, and a DCI format 0_2) used for scheduling of PUSCH. The scheduling DCI may be a UE specific DCI that is individually transmitted to the UE. For example, the scheduling DCI may be transmitted by applying an RNTI individually allocated to the UE.

On the other hand, examples of the non-scheduling DCI format include a DCI format 2_0 and a DCI format 2_6. The non-scheduling DCI may be a DCI that can be simultaneously transmitted to a plurality of UEs 100. For example, the non-scheduling DCI may be transmitted by applying a common RNTI to the plurality of UEs 100.

In step S2, the UE 100 starts monitoring the PDCCH in the search space configured from the base station 200. For example, the DCI format 1_0, the DCI format 0_0, the DCI format 1_1, the DCI format 0_1, the DCI format 1_2, and the DCI format 0_2 are configured in the UE 100, and the UE 100 monitors the PDCCH (DCI) based on the configuration. For example, the base station 200 may perform configuration such that the UE 100 monitors the DCI format 1_0 and the DCI format 0_0 in a certain search space. In addition, the base station 200 may perform configuration such that the UE 100 monitors the DCI format 1_1 and the DCI format 0_1 in a certain search space. In addition, the base station 200 may perform configuration such that the UE 100 monitors the DCI format 1_2 and the DCI format 0_2 in a certain search space. That is, for example, in a case where the CSS is configured for a certain search space, the base station 200 may perform configuration such that the UE 100 monitors candidates for the PDCCH for the DCI format 1_0 and the DCI format 0_0. In addition, in a case where the CSS is configured for a certain search space, the base station 200 may perform configuration such that the UE 100 monitors candidates for the PDCCH for the DCI format 2_0. In addition, in a case where the USS is configured for a certain search space, the base station 200 may perform configuration such that the UE 100 monitors candidates for the PDCCH for the DCI format 1_0 and the DCI format 0_0 or the DCI format 1_1 and the DCI format 0_1. Further, in a case where the USS is configured for a certain search space, the base station 200 may configure the UE 100 so as to allow the UE 100 to monitor candidates of the PDCCH for the DCI format 1_0 and the DCI format 0_0 or the DCI format 1_2 and the DCI format 0_2.

In step S3, the UE 100 receives and detects a DCI addressed to its own UE from the base station 200. For example, the UE 100 performs blind decoding of the PDCCH using a cell-radio network temporary identifier (C-RNTI) and a modulation and coding scheme-C-RNTI (MCS-C-RNTI) or a configured scheduling-RNTI (CS-RNTI) allocated from the base station 200 to the UE 100, and obtains a DCI which has been successfully decoded as a DCI addressed to its own UE. Here, a CRC parity bit scrambled by the C-RNTI and the MCS-C-RNTI or the CS-RNTI is attached to the DCI transmitted from the base station 200.

When the DCI indicates scheduling of the PDSCH, in step S4, the UE 100 receives downlink data from the base station 200 with the scheduled PDSCH. When the DCI indicates scheduling of the PUSCH, in step S5, the UE 100 transmits uplink data to the base station 200 with the scheduled PUSCH. Here, the downlink data is also referred to as data of a downlink shared channel (DL-SCH). The uplink data is also referred to as data of an uplink shared channel (UL-SCH). Here, the downlink shared channel (DL-SCH) and the uplink shared channel (UL-SCH) are transport channels, and the PDSCH and the PUSCH are physical channels. For example, the downlink data (DL-SCH data) is mapped to the PDSCH, and the uplink data (UL-SCH data) is mapped to the PUSCH.

(2) Outline of Power Saving Technology

An outline of a power saving technique according to the present embodiment will be described.

Figure 4:
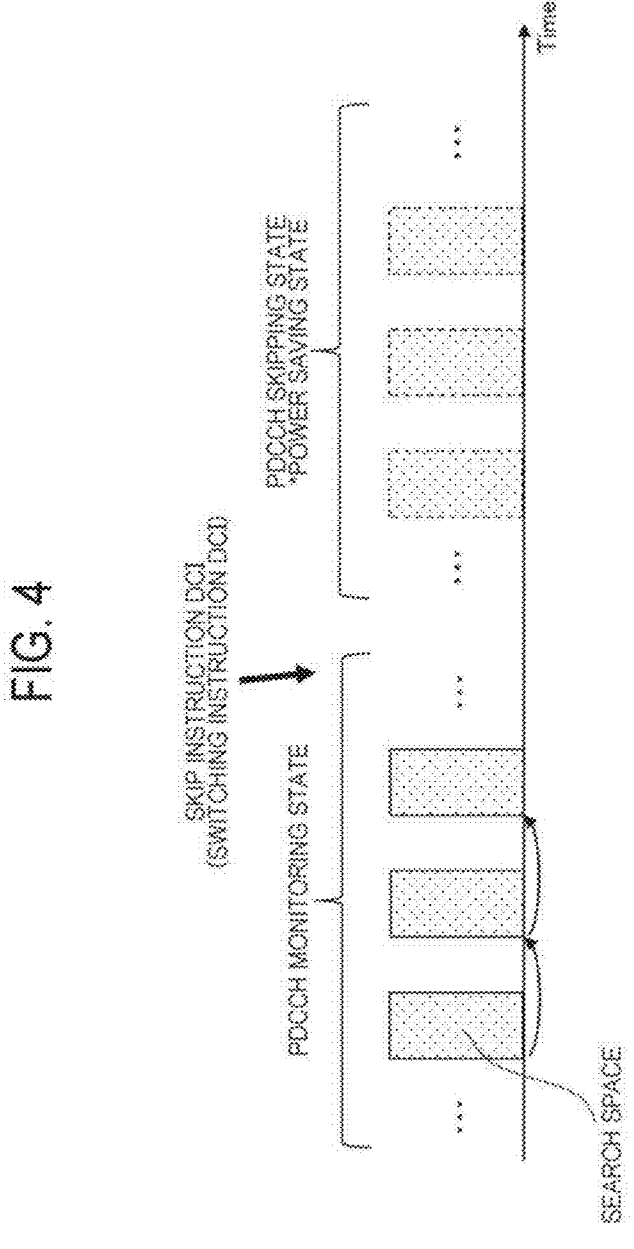
FIG. 4 is a diagram illustrating an outline of PDCCH skipping according to the embodiment.

First, an outline of PDCCH skipping according to the present embodiment will be described with reference to FIG. 4. Hereinafter, it is assumed that the UE 100 is in the RRC connected state.

First, the UE 100 monitors a PDCCH provided in a designated period in a search space based on a search space configuration configured by the base station 200.

Second, the base station 200 transmits, to the UE 100, a skip instruction DCI instructing the UE 100 to perform PDCCH skipping. The skip instruction DCI is an example of a switching instruction DCI. The skip instruction DCI may be scheduling DCI or non-scheduling DCI.

Third, the UE 100 skips the monitoring of the PDCCH for a designated duration in response to the reception of the skip instruction DCI from the base station 200. The designated duration during which the monitoring of the PDCCH is skipped may be configured by higher layer signaling (an RRC message). The designated duration may be determined by a timer value (that is, a configuration value of a switching timer), or may be determined by the number of consecutive slots or the number of consecutive search spaces. With such PDCCH skipping, power consumption required for the UE 100 to monitor the PDCCH is reduced, thereby making it possible to achieve dynamic power saving. Note that the PDCCH skipping may mean skipping the monitoring of the PDCCH, and the PDCCH skipping may be referred to as PDCCH monitoring skipping.

Next, an outline of search space set switching according to the present embodiment will be described with reference to FIG. 5.

First, the base station 200 configures a plurality of search space sets, which are a set of configurations related to a search space, in the UE 100 by higher layer signaling (the RRC message). Such a set of configurations related to the search space is referred to as a search space set (SSS) or a search space set group (SSSG), and hereinafter, the same is mainly referred to as the SSSG. One SSSG includes one or a plurality of search space configurations and is identified by an index of the SSSG. In the example of FIG. 5, the base station 200 configures, in the UE 100, SSSG #0 (a first search space set) in which a search space is provided in a designated period and SSSG #1 (a second search space set) in which a search space is provided in a period longer than the designated period. Here, a description will be given as to an example in which the base station 200 configures two SSSGs including the SSSG #0 and the SSSG #1 in the UE 100, but three or more SSSGs may be configured in the UE 100 for each of one or a plurality of BWPs (for example, DL BWP). Note that configuring a plurality of SSSGs (or three or more SSSGs) in the UE 100 may mean configuring a plurality of SSSGs (or three or more SSSGs) for one BWP, or may mean configuring a plurality of SSSGs (or three or more SSSGs) for a plurality of BWPs. In addition, considering that the search space includes the UE-specific search space and/or the UE-common search space as described above, the set of configurations related to the UE-specific search space may be referred to as a UE-specific search space set, and the set of configurations related to the UE-common search space may be referred to as a UE-common search space set.

Second, the UE 100 monitors, based on the SSSG #0, the PDCCH provided in the designated period in the search space.

Third, the base station 200 transmits, to the UE 100, a switching instruction DCI instructing SSSG switching. The switching instruction DCI may be scheduling DCI or non-scheduling DCI. That is, the base station 200 instructs the UE 100 to switch from the SSSG #0 to the SSSG #1 using the DCI.

Fourth, the UE 100 starts switching to the SSSG #1 in response to reception of the switching instruction DCI. The UE 100 performs switching to the SSSG #1 with a symbol after a switching delay time (switch delay) from the last symbol of the PDCCH in the SSSG #0. Such a switching delay time may be configured from the base station 200 to the UE 100 by higher layer signaling (the RRC message).

Fifth, the UE 100 monitors, based on the SSSG #1, the PDCCH provided in a period longer than the designated period in the search space. By such search space set switching, power consumption necessary for the UE 100 to monitor the PDCCH is reduced, thereby making it possible to achieve dynamic power saving.

It is noted that switching from the SSSG #1 to the SSSG #0 may be instructed by the base station 200 using a DCI, similarly to the switching from the SSSG #0 to the SSSG #1, or the UE 100 may perform the switching from the SSSG #1 to the SSSG #0 using a timer. A timer value of such a switching timer is configured, from the base station 200, in the UE 100 using higher layer signaling (the RRC message). In response to the detection of the switching instruction DCI instructing switching to the SSSG #1, the UE 100 starts monitoring of the PDCCH provided in the SSSG #1, sets a value of the switching timer to a value configured by the higher layer, and starts the switching timer. The UE 100 decrements the value of the switching timer, stops monitoring of the PDCCH in the SSSG #1 when the switching timer expires, and starts monitoring of the PDCCH in the SSSG #0 after the switching delay time (switch delay).

Note that each of "#0" in the SSSG #0 and "#1" in the SSSG #1 indicates an index (also referred to as a search space group ID) for a set (a group) of search spaces. That is, one or more search space sets may be associated with a set (group) of search spaces identified by an index. For example, the base station 200 may configure a set (group) of search spaces in the UE 100 by configuring an index associated with the one or more search space sets. In the present embodiment, the name SSSG is merely an example, and any name may be used as long as the name is a set (group) of search spaces associated with one or more search space sets.

In the search space set switching, an operation similar to the PDCCH skipping described above can be performed by not configuring a search space in one SSSG configured in the UE 100 and instructing the switching to the one SSSG using a DCI. In addition, by configuring a search space in one SSSG configured in the UE 100 and not configuring a monitoring opportunity for the search space (alternatively, the parameter related to the monitoring opportunity is configured to a predetermined value (for example, "0" or "Null")), an operation similar to the PDCCH skipping described above may be realized. Hereinafter, in order to facilitate the description, as a configuration for realizing an operation similar to the PDCCH skipping described above, it will be described that there is no search space in one SSSG, but it is a matter of course that the configuration may be replaced with no monitoring opportunity (alternatively, the parameter related to the monitoring opportunity is configured to a predetermined value). In addition, in the other SSSG configured in the UE 100, it is also possible to configure a long search space period and to instruct switching to the one SSSG by DCI. In order to perform such an operation, it is necessary to configure, in the UE 100, a total of three SSSGs including an SSSG having a normal search space period, an SSSG having no search space, and an SSSG having a long search space period. Such various SSSGs are configured in the UE 100 and switching of the SSSG is instructed by DCI, thereby making it possible to achieve flexible power saving.

Figure 6:
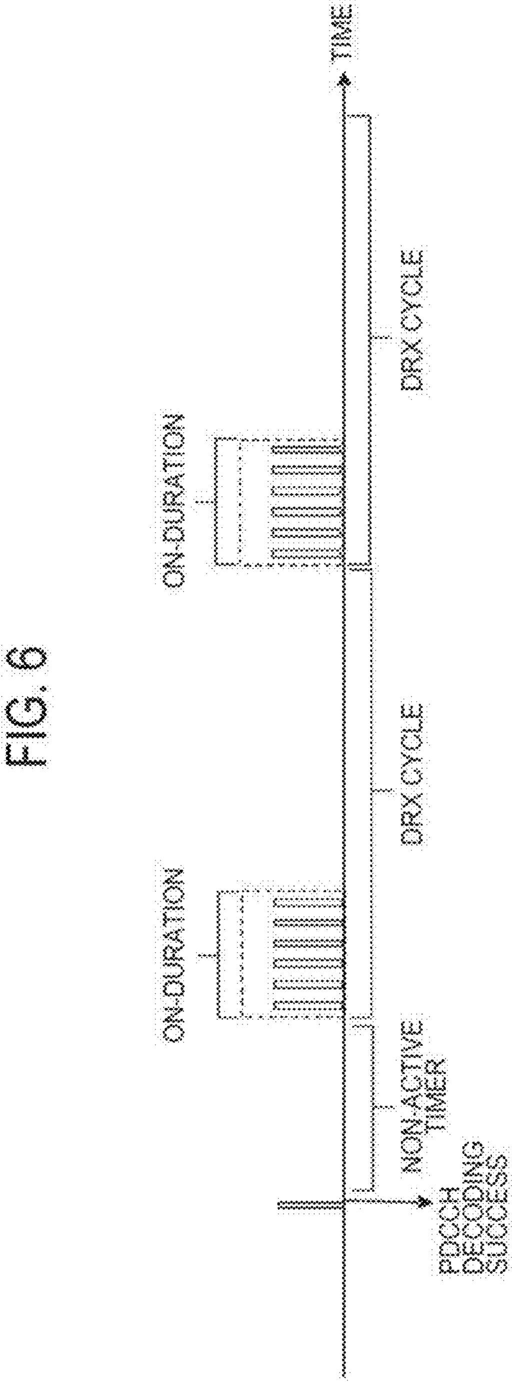
FIG. 6 is a diagram illustrating a DRX and a power saving state according to the embodiment.

Next, the DRX and the power saving state of the present embodiment will be described with reference to FIG. 6.

When DRX is configured in the UE 100, the UE 100 monitors a PDCCH discontinuously using a DRX operation. Specifically, the DRX operation is controlled by the following DRX parameters.

DRX cycle: defines a period during which the UE 100 wakes up.

On-duration: period during which the UE 100 waits to receive the PDCCH after the wake up of the UE 100. When the UE 100 successfully decodes the PDCCH, the UE 100 maintains the wake-up state and starts an inactivity-timer.

Inactivity timer: defines a time section during which the UE 100 waits after the last successful PDCCH decoding and a section during which the UE 100 sleeps again when the PDCCH decoding fails. In addition, the on-duration may be started after a predetermined configuration value DRX slot offset (DRX-SlotOffset) elapses after the inactivity timer expires. FIG. 6 corresponds to an operation in which the configuration value of DRX-SlotOffset is set to zero.

Retransmission timer: defines a time section during which retransmission is expected.

As described above, since the UE 100 in which the DRX is configured does not need to monitor the PDCCH in the sleep state (that is, in a reception-OFF duration), power consumption of the UE 100 can be reduced. On the other hand, the UE 100 waits to receive the PDCCH and monitors the PDCCH in the search space during the active time. The active time is a time during which any one of an on-duration timer (drx-onDurationTimer), an inactivity timer (drx-InactivityTimer), a downlink retransmission timer (drx-RetransmissionTimerDL), and an uplink retransmission timer (drx-RetransmissionTimerUL) is in operation.

The PDCCH skipping or the search space set switching is performed within the active time of the DRX, thereby making it possible to dynamically switch to the power saving state within the active time. Accordingly, it is possible to obtain a larger effect of power consumption reduction than that of power consumption reduction by DRX.

Next, a configuration example of the SSSG switching according to the present embodiment will be described with reference to FIG. 7.

Specifically, one or a plurality of SSSGs can be configured to the UE 100 from among various SSSGs including a plurality of SSSGs having different search space periods (different PDCCH periods) and SSSGs having no search space, and flexible power saving is realized by giving the instruction about the switching of the SSSG by DCI.

Figure 7:
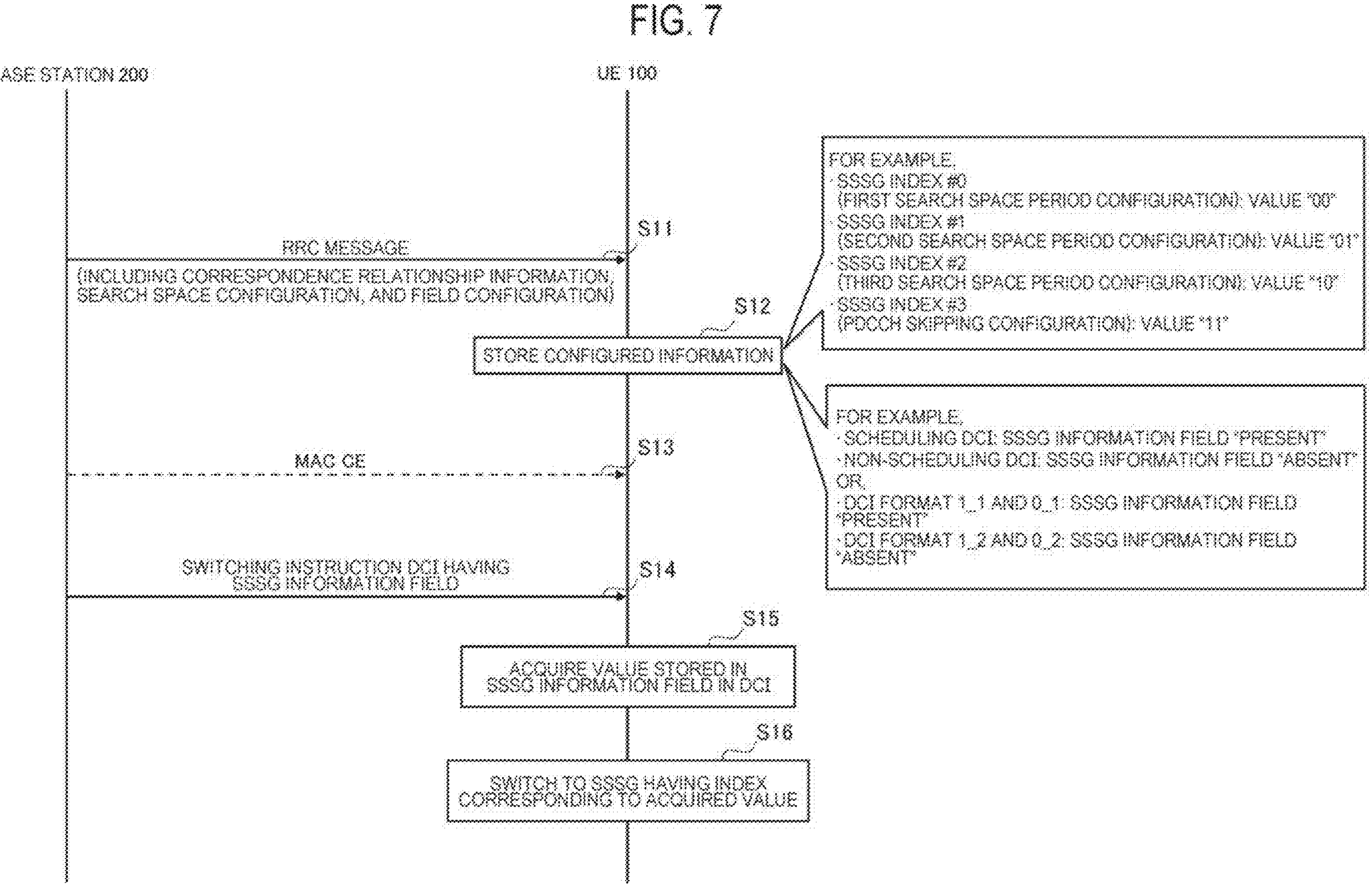
FIG. 7 is a diagram illustrating an example of SSSG switching according to the embodiment.

As illustrated in FIG. 7, in step S11, the base station 200 transmits one or a plurality of RRC messages to the UE 100. The one or the plurality of RRC messages may include dedicated RRC messages (for example, RRCReconfiguration messages) transmitted individually for UEs. The UE 100 receives the RRC message.

The RRC message includes correspondence relationship information indicating a correspondence relationship between an index of each of one or the plurality of SSSGs configured in the UE 100 and a value set in an information field (hereinafter referred to as an "SSSG information field") in a switching instruction DCI instructing switching of the SSSG applied by the UE 100. The one or plurality of SSSGs include at least one of an SSSG that periodically monitors the PDCCH and an SSSG that skips monitoring the PDCCH.

For example, when four SSSGs are configured in the UE 100, the correspondence relationship information includes information such as "an SSSG index #0: value "00"", "an SSSG index #1: value "01"", "an SSSG index #2: value "10"", and "an SSSG index #3: value "11"". The base station 200 is not limited to collectively configuring these four SSSGs in the UE 100, and may configure the four SSSGs in the UE 100, for example, by dividing the four SSSGs twice to obtain two SSSGs each. It is noted that the value set in the SSSG information field may be configured in a bitmap format. For example, a position (a code point) of a bit, which is "1", may be associated with an SSSG index, such as "an SSSG index #0: value "1000"", "an SSSG index #1: value "0100"", "an SSSG index #2: value "0010"", and "an SSSG index #3: value "0001"".

The RRC message further includes search space configuration information associated with each of the SSSG indexes. The search space configuration information includes one or a plurality of search space configurations. Each search space configuration includes a search space period, a search space offset, a search space duration (for example, the number of consecutive slots), a symbol for PDCCH monitoring, an aggregation level, a type of search space, a DCI format, and the like.

For example, search space configuration information associated with the SSSG index #0 is information for configuring a first search space period as a search space period. Search space configuration information associated with the SSSG index #1 is information for configuring a second search space period as a search space period. Search space configuration information associated with the SSSG index #2 is information for configuring a third search space period as a search space period. Search space configuration information associated with an SSSG index #4 is information indicating that no search space is configured. That is, the SSSG index #4 is associated with search space configuration information indicating PDCCH skipping.

The RRC message may include field configuration information indicating the presence/absence of an SSSG information field for each of one or a plurality of DCI formats. The switching instruction DCI is a DCI having a DCI format in which the presence of the SSSG information field is indicated by the field configuration information. The presence/absence of the SSSG information field may be configured for the non-scheduling DCI and/or the scheduling DCI in common or independently. The presence/absence of the SSSG information field may be configured in common for the DCI format 1_1 and the DCI format 0_1 and in common for the DCI format 1_2 and the DCI format 0_2.

The RRC message may include number-of-bits configuration information indicating the number of bits of the SSSG information field for each of one or a plurality of DCI formats. For the non-scheduling DCI and/or the scheduling DCI, the number of bits of the SSSG information field may be directly configured in common or independently. The number of bits of the SSSG information field may be configured in common for the DCI format 1_1 and the DCI format 0_1 and/or in common for the DCI format 1_2 and the DCI format 0_2. For example, the SSSG information field of up to two bits may be configured for the DCI format 1_1 and/or the DCI format 0_1 and/or one-bit SSSG information field may be configured for the DCI format 1_2 and the DCI format 0_2.

The RRC message may include a timer configuration value of a switching timer for one or the plurality of SSSGs.

In step S12, the UE 100 stores the information configured from the base station 200.

In step S13, the base station 200 may transmit, to the UE 100, MAC CE (hereinafter referred to as "SSSG state selection MAC CE") that designates activation or deactivation of the SSSG for each SSSG index. The UE 100 receives the SSSG state select MAC CE. The SSSG state select MAC CE is to give an instruction about the activation or deactivation for each SSSG index. The activated SSSG enters a valid state as the switching destination SSSG, and the deactivated SSSG enters an invalid state as the switching destination SSSG.

In step S14, the base station 200 transmits a switching instruction DCI having the SSSG information field to the UE 100 on the PDCCH. The UE 100 receives the switching instruction DCI on the PDCCH. The UE 100 may determine whether the DCI format of the detected DCI corresponds to the switching instruction DCI based on the field configuration information configured from the base station 200.

In step S15, the UE 100 obtains a value set in the SSSG information field of the switching instruction DCI received in step S14. The UE 100 may obtain the value set in the SSSG information field after specifying the number of bits of the SSSG information field based on the number-of-bits configuration information configured from the base station 200. Alternatively, the UE 100 may specify the number of bits of the SSSG information field based on the number of SSSG indexes (that is, the number of entries of the configured SSSG index list) configured in the UE 100 and then obtain the value set in the SSSG information field. For example, when the number of SSSG indexes configured in the UE 100 is "I", the UE 100 may calculate and specify the number of bits of the SSSG information field using an integer value obtained by rounding up a decimal point of $\log_2(I)$.

In step S16, the UE 100 performs switching to the SSSG having the SSSG index corresponding to the value set in the SSSG information field in the received switching instruction DCI based on the correspondence relationship information configured from the base station 200, and monitors the PDCCH according to the switching destination SSSG. For example, when the value set in the SSSG information field is "11", the UE 100 determines that the switching to the SSSG having the SSSG index #3 is instructed, and performs the switching to the SSSG having the SSSG index #3.

Next, an example of timer-based SSSG switching according to the present embodiment will be described with reference to FIG. 8. In this example, a case is assumed in which the UE 100 performs switching of an SSSG on a timer basis and three or more SSSGs can be configured in the UE 100.

The base station 200 may configure, in the UE 100, one of the SSSGs configured in the UE 100 as the default SSSG. For example, the base station 200 may designate one of the SSSG indexes to be configured in the UE 100 as a "default-SSSG-Id". For example, the base station 200 may use an RRC message to configure a "defaultSSSG-Id". That is, the base station 200 may configure the default SSSG for the UE 100 using the information included in the RRC message. The default SSSG may be an SSSG determined by a predetermined rule shared in advance by the base station 200 and the UE 100 among the SSSGs configured to the UE 100. The default SSSG may be the SSSG, as the default SSSG, configured by the base station 200 for the UE 100.

Figure 8:
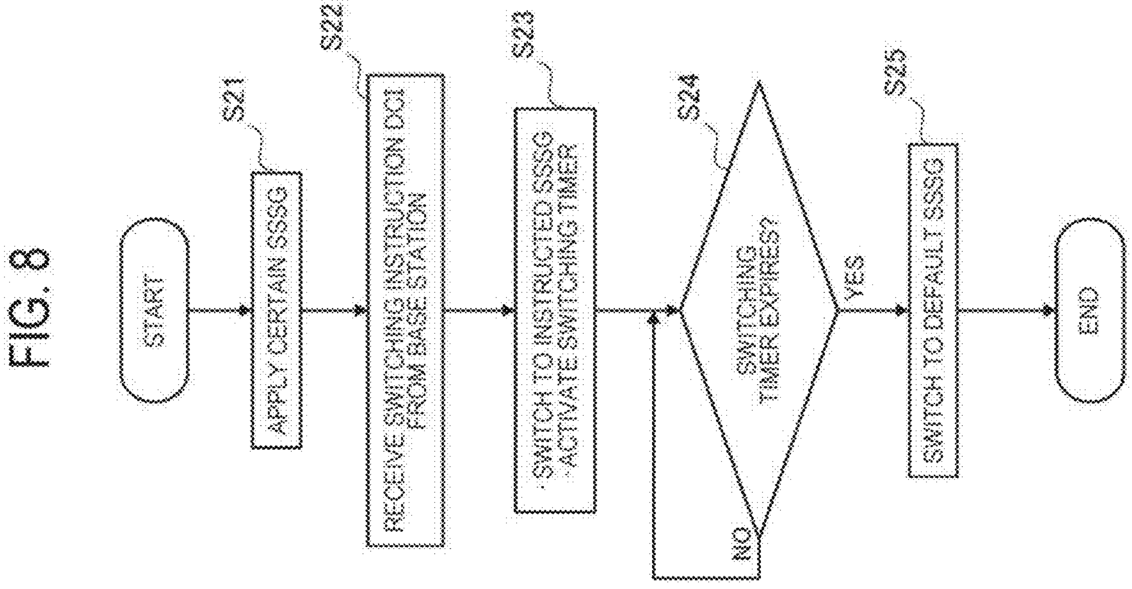
FIG. 8 is a diagram illustrating an example of timer-based SSSG switching according to the embodiment.

As illustrated in FIG. 8, in step S31, the UE 100 in which a plurality of SSSGs is configured by the base station 200 monitors the PDCCH using one SSSG among the plurality of SSSGs.

In step S32, the UE 100 receives, from the base station 200 on the PDCCH, the switching instruction DCI instructing switching to another SSSG.

In step S33, the UE 100 performs switching to the SSSG designated by the switching instruction DCI and activates a timer (switching timer) associated with the SSSG.

In step S34, the UE 100 determines whether the switching timer expires.

When the switching timer expires (step S34: YES), in step S35, the UE 100 switches to the default SSSG among the plurality of configured SSSGs. Here, by switching to the SSSG designated as the "defaultSSSG-Id" from the base station 200, the base station 200 can grasp the switching destination SSSG of the UE 100. Since the switching timer is a value configured by the base station 200, the base station 200 manages the switching timer similarly to the UE 100, and can grasp that the switching timer has expired in the UE 100.

The UE 100 determines the default SSSG according to a predetermined rule when the default SSSG is not configured by the base station 200, more specifically, when the default SSSG is not explicitly designated by the base station 200 as the "defaultSSSG-Id". For example, the UE 100 may determine the default SSSG according to a predetermined rule when the RRC message does not include the information for configuring the default SSSG. The predetermined rule is, for example, a rule defined in the technical specification of 3GPP, and is a rule shared in advance by the base station 200 and the UE 100.

Here, the predetermined rule may be a rule that determines, as a default SSSG, an SSSG corresponding to an SSSG index having the smallest value or an SSSG corresponding to an SSSG index having the largest value among the SSSG indexes configured in the UE 100. For example, if the rule is that the SSSG corresponding to the smallest SSSG index is the default SSSG, the UE 100 determines the SSSG of the SSSG index #0 as the default SSSG. If the rule is that the SSSG corresponding to the SSSG index with the largest value is the default SSSG, the UE 100 determines the SSSG for the SSSG index #4 as the default SSSG.

As described above, the UE 100 may receive, from the base station 200, the correspondence information indicating the correspondence between the SSSG index configured in the UE 100 and the value set in the SSSG information field in the switching instruction DCI. The predetermined rule may be a rule that determines, as a default SSSG, an SSSG corresponding to an SSSG index indicated by a specific value (for example, "0") as a value to be set in the SSSG information field in the switching instruction DCI. For example, the UE 100 determines, as the default SSSG, the SSSG with the SSSG index whose value set in the SSSG information field in the switching instruction DCI is indicated as "0".

The predetermined rule may be a rule that determines, as a default SSSG, an SSSG corresponding to an SSSG index (for example, an index #0) having a predetermined value among the SSSG indexes configured in the UE 100.

The predetermined rule may be a rule that determines, as a default SSSG, an SSSG other than the SSSG for which monitoring of the PDCCH is skipped among the SSSGs configured in the UE 100. That is, the UE 100 may assume that the SSSG index corresponding to PDCCH skipping is not configured as the default SSSG.

When DRX is configured for the UE 100, the UE 100 may apply a specific SSSG when switching from the DRX reception OFF duration to the reception ON duration (active time). The predetermined rule may be a rule that determines the specific SSSG as a default SSSG. That is, the UE 100 may determine the first SSSG for monitoring the PDCCH after the DRX reception OFF duration elapses as the default SSSG. For example, the base station 200 may transmit an RRC message including information for configuring the specific SSSG, and the UE 100 may determine the specific SSSG as the default SSSG. Further, the base station 200 may transmit the RRC message including the information for configuring the default SSSG, and the UE 100 may use the default SSSG as the first SSSG for monitoring the PDCCH after the DRX reception OFF duration elapses.

The UE 100 may receive the scheduling DCI indicating the radio resource allocated to the UE 100 as the switching instruction DCI. After receiving the scheduling DCI as the switching instruction DCI, the UE 100 may start the switching timer at a timing at which switching to one SSSG is performed (specifically, a slot that performs SSSG switching).

The UE 100 may use a common value as a value of the switching timer applied to two or more SSSGs among three or more SSSGs configured to the UE 100. The base station 200 may configure the common value as the value of the switching timer applied to two or more SSSGs among three or more SSSGs configured to the UE 100.

The UE 100 may use a dedicated value for each SSSG as the value of the switching timer applied to each of the SSSGs configured to the UE 100. The base station 200 may configure, to the UE 100, a dedicated switching timer configuration value for each SSSG.

In a case where the switching destination SSSG is the SSSG corresponding to the PDCCH skipping, the UE 100 may activate the switching timer associated with the SSSG at a timing (slot) of starting the switching to the SSSG. In the case of the PDCCH skipping state, that is, in a designated duration during which the monitoring of the PDCCH is skipped, a resource used for monitoring the PDCCH is not occupied, and the switching to the SSSG can be started at any timing. This advantage is utilized, and thus, it is possible to minimize the influence of the switching delay time without hindering the operation of monitoring the PDCCH. Note that the UE 100 may monitor the PDDCH by assuming the default SSSG after the switching timer expires.

Next, a first specific example of the operation using the switching timer according to the present embodiment will be described with reference to FIG. 9.

Figure 9:
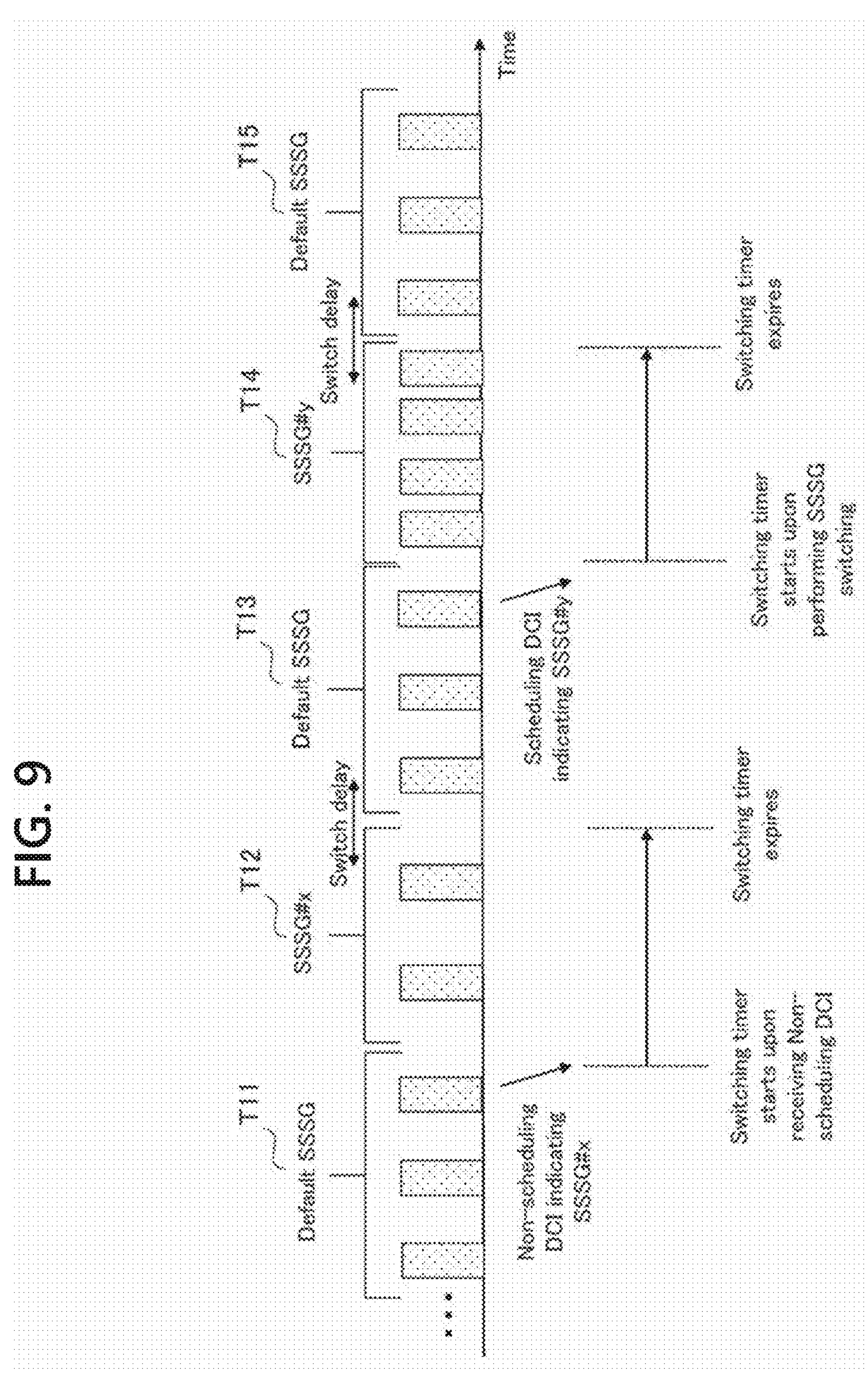
FIG. 9 is a diagram illustrating a first specific example of the operation using the switching timer according to the embodiment.

As illustrated in FIG. 9, a total of three SSSGs including a default SSSG (Default SSSG), SSSG #x, and SSSG #y are configured to the UE 100. Here, it is assumed that the base station 200 configures, to the UE 100, one common switching timer value for SSSG #x and SSSG #y that are not the default SSSG.

In a duration T11, the UE 100 monitors the PDCCH using the default SSSG. The UE 100 receives a non-scheduling DCI instructing switching to the SSSG #x in the last search space of the duration T11. Since HARQ processing does not occur in the case of the non-scheduling DCI, the UE 100 starts a switching timer when the non-scheduling DCI is received.

In a duration T12, the UE 100 monitors the PDCCH using the SSSG #x while the switching timer is in operation. The SSSG #x is an SSSG having a longer search space duration than the default SSSG. When the switching timer expires, the UE 100 switches to the default SSSG after a switching delay time (switch delay) has elapsed.

In a duration T13, the UE 100 monitors the PDCCH using the default SSSG. The UE 100 receives a scheduling DCI instructing switching to the SSSG #y in the last search space of the duration T13. Since HARQ processing occurs in the case of the scheduling DCI, the UE 100 does not start the switching timer at the time of receiving the scheduling DCI, and starts the switching timer at the timing (the slot) when the switching to the SSSG #y is executed.

In a duration T14, the UE 100 monitors the PDCCH using the SSSG #y while the switching timer is in operation. The SSSG #y is an SSSG having a shorter search space duration than the default SSSG. When the switching timer expires, the UE 100 switches to the default SSSG after a switching delay time (switch delay) has elapsed. Then, in a duration T15, the UE 100 monitors the PDCCH using the default SSSG.

Next, a second specific example of the operation using the switching timer according to the present embodiment will be described with reference to FIG. 10.

Figure 10:
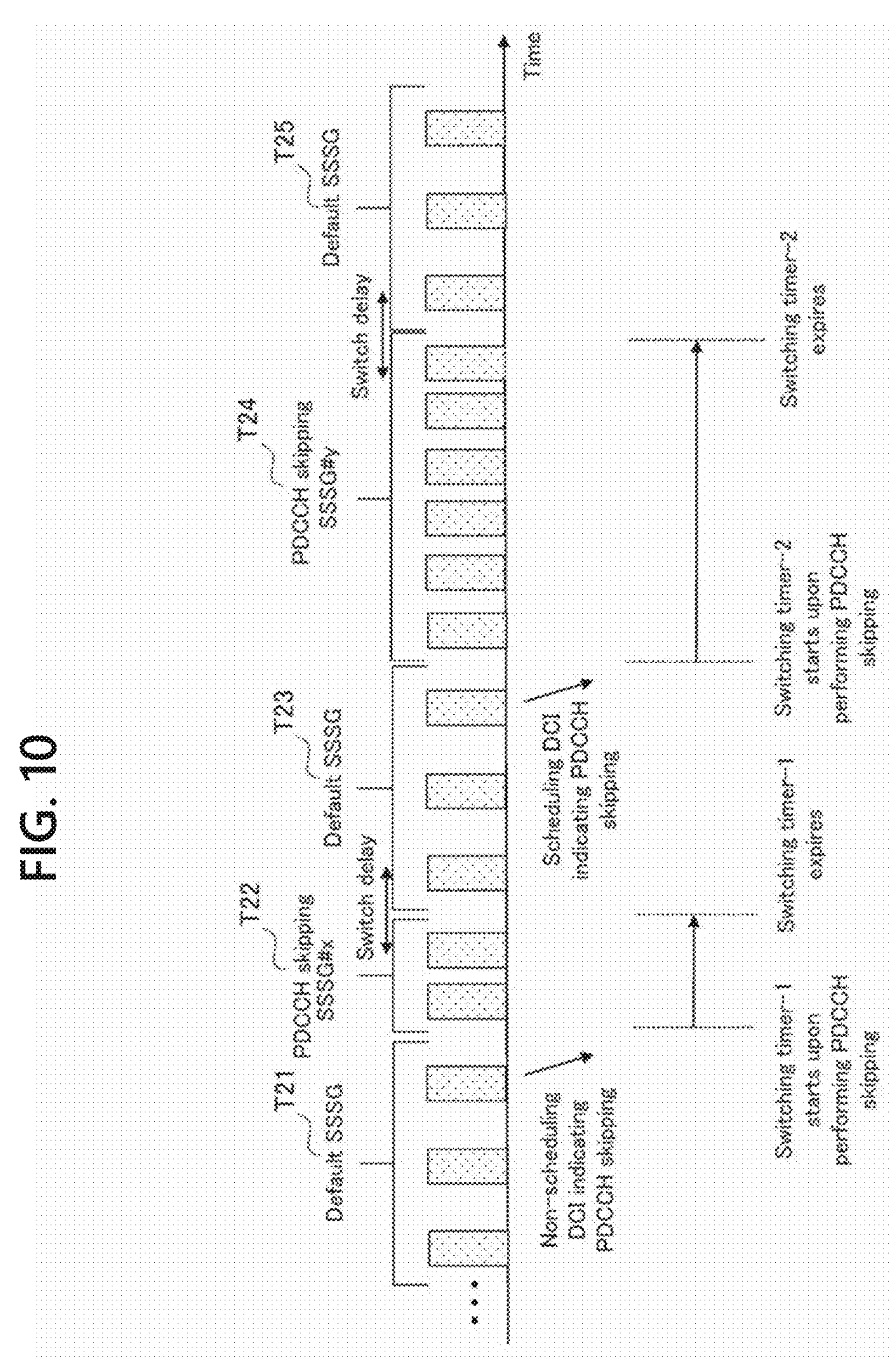
FIG. 10 is a diagram illustrating a second specific example of the operation using the switching timer according to the embodiment.

As illustrated in FIG. 10, a total of three SSSGs including a default SSSG (Default SSSG), an SSSG #x for PDCCH skipping (PDCCH skipping SSSG #x), and an SSSG #y for PDCCH skipping (PDCCH skipping SSSG #y) are configured to the UE 100. Here, it is assumed that the base station 200 configures, to the UE 100, dedicated switching timer values for SSSG #x and SSSG #y that are not the default SSSG.

In a duration T21, the UE 100 monitors the PDCCH using the default SSSG. The UE 100 receives a non-scheduling DCI instructing switching to the SSSG #x in the last search space of the duration T11. Since the switching destination SSSG #x is an SSSG corresponding to the PDCCH skipping, the UE 100 starts a switching timer (a switching timer-1) independently configured for the SSSG #x at a timing (a slot) when the switching to the SSSG #x is executed.

In a duration T22, the UE 100 skips monitoring of the PDCCH while the switching timer-1 is in operation. When the switching timer-1 expires, the UE 100 switches to the default SSSG after a switching delay time (switch delay) has elapsed.

In a duration T23, the UE 100 monitors the PDCCH using the default SSSG. The UE 100 receives a scheduling DCI instructing switching to the SSSG #y in the last search space of the duration T23. Since the switching destination SSSG #x is the SSSG corresponding to the PDCCH skipping, the UE 100 starts a switching timer (a switching timer-2) independently configured for the SSSG #y at a timing (a slot) when the switching to the SSSG #y is executed. A timer value of the switching timer-2 is larger than the timer value of the switching timer-1.

In a duration T24, the UE 100 skips monitoring of the PDCCH while the switching timer-2 is in operation. When the switching timer-2 expires, the UE 100 switches to the default SSSG after a switching delay time (switch delay) has elapsed. Then, in a duration T25, the UE 100 monitors the PDCCH using the default SSSG.

(3) Outline of SR Transmission and RACH Transmission

An outline of SR transmission and RACH transmission according to the present embodiment will be described.

Figure 11:
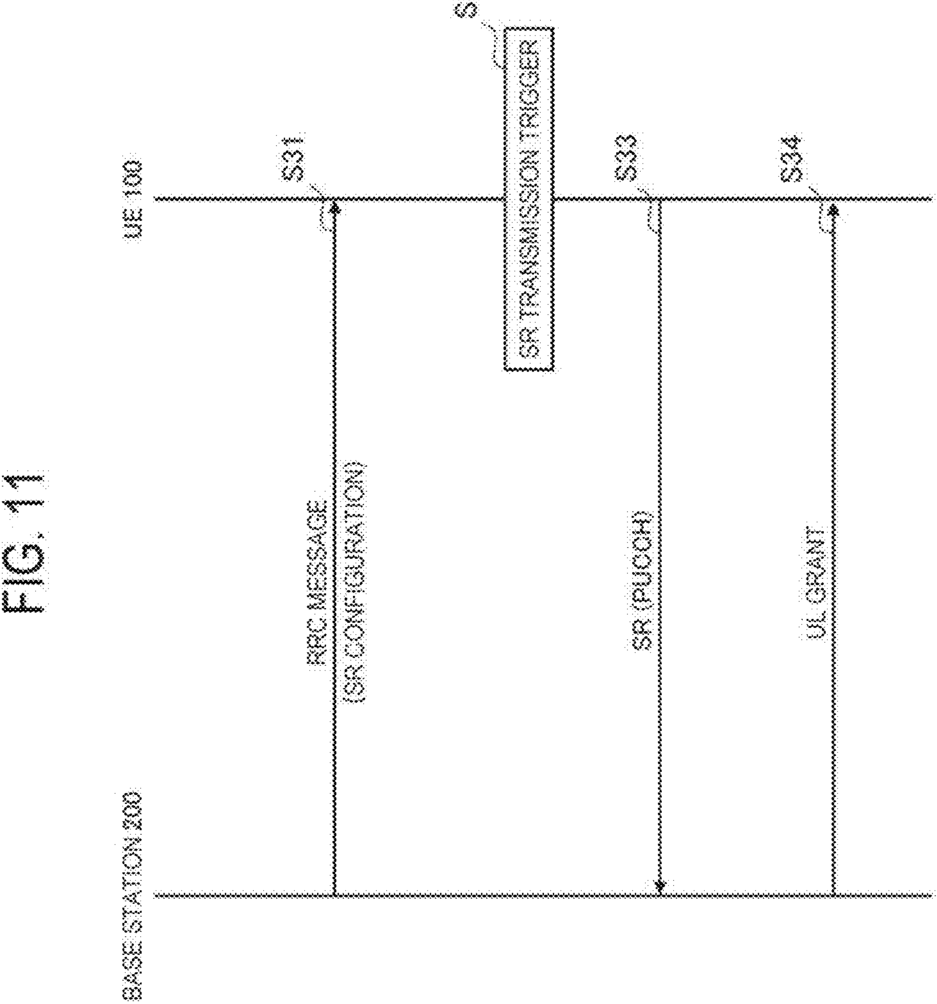
FIG. 11 is a diagram illustrating an outline of SR transmission according to an embodiment.

First, an outline of SR transmission according to the present embodiment will be described with reference to FIG. 11. The UE 100 transmits the SR on the PUCCH to request an uplink radio resource, specifically, an uplink shared channel (UL-SCH) resource for a new transmission. For example, the SR may be used to request an uplink shared channel (UL-SCH) resource for an initial transmission. Furthermore, for example, an uplink shared channel (UL-SCH) resource may be used to transmit uplink data (that is, the UL-SCH data).

In step S31, the base station 200 transmits the RRC message including the SR configuration for configuring the parameters for the SR resource to the UE 100. The SR configuration includes a plurality of SR resource configurations each associated with a logical channel. Each SR resource configuration includes, for the corresponding logical channel, information for configuring a PUCCH resource used for transmission of the SR, information for configuring a period and/or an offset used for transmission of the SR, and information for configuring a priority (phy-Priority) of the SR. Here, the priority (phy-Priority) of the SR may indicate the priority of the corresponding SR resource in the physical layer. For example, the priority (phy-Priority) of the SR may indicate whether the corresponding SR resource has a high priority (high-priority) or a low priority (low-priority) in priority processing in the physical layer. The UE 100 stores information configured by the RRC message.

In step S32, the UE 100 detects the SR transmission trigger. The SR transmission trigger may be any of generation of uplink data and/or a buffer status report (BSR) to be transmitted to the base station 200, arrival of the uplink data to be transmitted to the base station 200 at the MAC layer of the UE 100, and an instruction to transmit the SR from the MAC layer to the physical (PHY) layer in the UE 100. That is, the transmission trigger of the SR may be that the SR is triggered.

In step S33, the UE 100 transmits the SR to the base station 200 on the PUCCH in response to the transmission trigger of the SR based on the SR configuration configured in step S31. Specifically, the UE 100 transmits the SR using the SR resource configuration corresponding to the logical channel for which the SR transmission is performed, that is, the logical channel for transmitting the uplink data.

In step S34, the base station 200 allocates the UL-SCH resource to the UE 100 in response to the reception of the SR from the UE 100. Specifically, the base station 200 transmits scheduling DCI including the UL grant for allocating the UL-SCH resource to the UE 100 on the PDCCH. Here, the scheduling DCI including the UL grant for allocating the UL-SCH resource may correspond to the DCI format used for scheduling the PUSCH.

Figure 12:
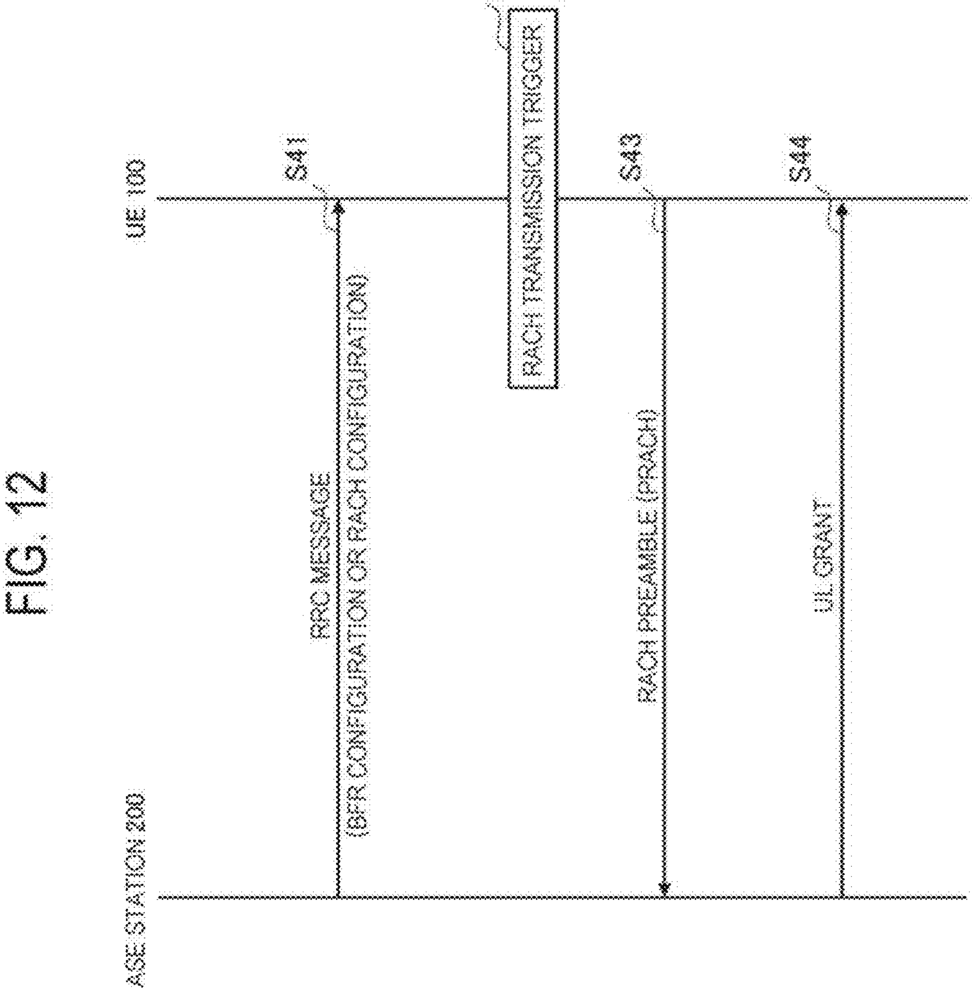
FIG. 12 is a diagram illustrating an outline of RACH transmission according to an embodiment.

Next, an outline of RACH transmission according to the present embodiment will be described with reference to FIG. 12. The UE 100 transmits a RACH transmission, specifically, a RACH preamble (also referred to as a random access preamble) on a physical random access channel (PRACH), for example, in order to perform beam failure recovery (BFR). The RACH transmission may mean starting a RACH procedure (also referred to as a random access procedure). The UE 100 may perform the RACH transmission in response to the absence of the PUCCH resource for SR for the logical channel corresponding to the generated uplink data.

In step S41, the base station 200 transmits the RRC message including the BFR configuration for configuring the RACH resource (specifically, the PRACH resource) for the BFR to the UE 100. The BFR configuration includes information for configuring a RACH resource (for example, a dedicated RACH preamble) and information on a reference signal resource used to detect a beam failure. That is, the RACH resource includes a PRACH resource and/or a RACH preamble. Alternatively, the base station 200 may transmit, to the UE 100, an RRC message including a RACH configuration for configuring a RACH resource that is not for BFR. The UE 100 stores information configured by the RRC message.

In step S42, the UE 100 detects a transmission trigger of the RACH. The transmission trigger of the RACH may be either that the UE 100 detects the beam failure or that there is no PUCCH resource for SR for the logical channel corresponding to the generated uplink data. That is, the transmission trigger of the RACH may be that the RACH is triggered.

In step S43, the UE 100 transmits the RACH preamble to the base station 200 on the RACH (PRACH) in response to the transmission trigger of the RACH based on the BFR configuration or the RACH configuration configured in step S41. Specifically, the UE 100 transmits the dedicated RACH preamble configured with the BFR configuration or the RACH configuration to the base station 200.

In step S44, the base station 200 allocates the UL-SCH resource to the UE 100 in response to the reception of the RACH from the UE 100. Specifically, the base station 200 transmits scheduling DCI including the UL grant for allocating the UL-SCH resource to the UE 100 on the PDCCH.

In this way, the UE 100 performs the SR transmission in response to the SR transmission trigger, and performs the RACH transmission in response to the RACH transmission trigger. Such SR transmission and RACH transmission may occur in the above-described power saving state (that is, a state in which the monitoring period of the PDCCH is lengthened or the monitoring of the PDCCH is skipped). Since radio communication is performed between the UE 100 and the base station 200 after the SR transmission or the RACH transmission, it is preferable to switch the PDCCH monitoring state from the power saving state using the transmission of the SR or the RACH or the transmission trigger as a trigger and leave the power saving state.

Here, in a case where the UE 100 switches the PDCCH monitoring state in response to the transmission (or transmission trigger) of the SR or RACH, if the UE 100 autonomously switches the PDCCH monitoring state, a mismatch may occur between the actual PDCCH monitoring state in the UE 100 and the PDCCH monitoring state recognized by the base station 200. Therefore, there is a concern that the base station 200 cannot appropriately perform radio communication with the UE 100 after the UE 100 switches the PDCCH monitoring state. Therefore, in the present embodiment, it is possible to switch the PDCCH monitoring state based on the SR or RACH transmission (or transmission trigger) under the control of the base station 200.

In addition, the UE 100 to which carrier aggregation or dual connectivity is applied can perform radio communication using a plurality of serving cells simultaneously. Therefore, when the UE 100 switches the PDCCH monitoring state in response to the SR or RACH transmission (or transmission trigger), it may be inefficient to switch the PDCCH monitoring state only for the serving cell in which the SR transmission or the RACH transmission is performed. Therefore, in the present embodiment, it is possible to simultaneously switch the PDCCH monitoring state based on SR or RACH transmission (or transmission trigger) in units of groups (hereinafter, referred to as a "cell group") including a plurality of serving cells.

Here, the "PDCCH monitoring state" in the present embodiment may include skipping monitoring of the PDCCH and/or executing monitoring of the PDCCH in the configured SSSG. For example, the switching of the PDCCH monitoring state may include switching the operation from the operation of skipping the monitoring of the PDCCH to the operation of monitoring the PDCCH with the configured SSSG. In addition, the switching of the PDCCH monitoring state may include switching the operation from the operation of monitoring the PDCCH in the configured SSSG to the operation of skipping the monitoring of the PDCCH. In addition, the switching of the PDCCH monitoring state may include switching the operation from the operation of monitoring the PDCCH with the configured first SSSG (for example, SSSG #x in FIG. 9) to the operation of monitoring the PDCCH with the configured second SSSG (for example, SSSG #y in FIG. 9).

Furthermore, the switching of the PDCCH monitoring state may include switching of the SSSG used for monitoring the PDCCH. For example, the switching of the PDCCH monitoring state may include switching the SSSG from the SSSG (for example, SSSG #x and/or SSSG #y in FIG. 10) configured for PDCCH skipping to the SSSG (for example, SSSG #x and/or SSSG #y in FIG. 9) configured for PDCCH monitoring. Furthermore, the switching of the PDCCH monitoring state may include switching the SSSG from the SSSG (for example, SSSG #x and/or SSSG #y in FIG. 9) configured for monitoring the PDCCH to the SSSG (for example, SSSG #x and/or SSSG #y in FIG. 10) configured for PDCCH skipping. Furthermore, the switching of the PDCCH monitoring state may include switching the SSSG from a first SSSG (for example, SSSG #x in FIG. 9) configured for monitoring the PDCCH to a second SSSG (for example, SSSG #y in FIG. 10) configured for monitoring the PDCCH.

Here, in the present embodiment, for ease of description, the SSSG used for monitoring the PDCCH is also referred to as a PDCCH monitoring state. In addition, as described above, the configured SSSG includes the default SSSG (Default SSSG).

(4) Configuration of Communication Apparatus

Figure 13:
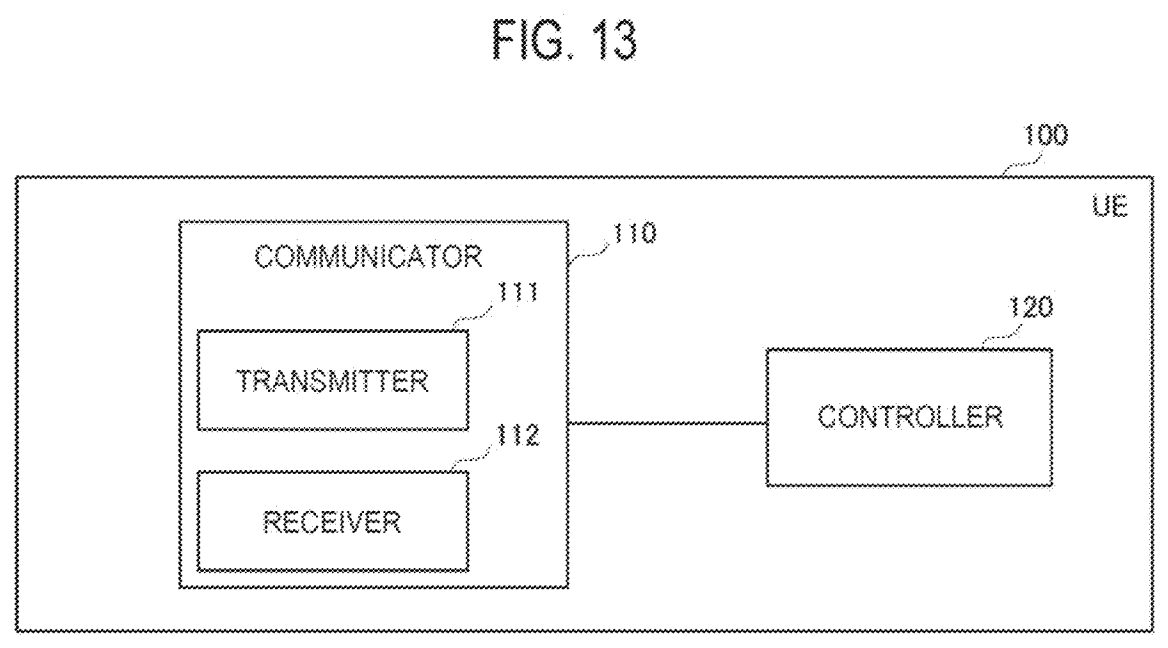

Next, a configuration of the UE 100 according to the present embodiment will be described with reference to FIG. 13. The UE 100 includes a communicator 110 and a controller 120.

The communicator 110 performs radio communication with the base station 200 by transmitting and receiving a radio signal to and from the base station 200. The communicator 110 includes at least one transmitter 111 and at least one receiver 112. The transmitter 111 and the receiver 112 may include an antenna and an RF circuit. The antenna converts a signal into a radio wave and emits the radio wave into space. Furthermore, the antenna receives a radio wave in space and converts the radio wave into a signal. The RF circuit performs analog processing of a signal transmitted and received via the antenna. The RF circuit may include a high frequency filter, an amplifier, a modulator, a low pass filter, and the like.

The controller 120 performs various types of control in the UE 100. The controller 120 controls communication with the base station 200 via the communicator 110. An operation of the UE 100 described above and described later may be an operation under the control of the controller 120. The controller 120 may include at least one processor capable of executing a program and a memory that stores the program. The processor may execute the program to perform the operation of the controller 120. The controller 120 may include a digital signal processor that performs digital processing of a signal transmitted and received via the antenna and the RF circuit. The digital processing includes processing of the protocol stack of the RAN. The memory stores the program executed by the processor, a parameter related to the program, and data related to the program. The memory may include at least one of a read only memory (ROM), an erasable programmable read only memory (EPROM), an electrically erasable programmable read only memory (EEPROM), a random access memory (RAM), and a flash memory. All or part of the memory may be included in the processor.

In the UE 100 according to the present embodiment, the transmitter 111 performs SR transmission to the base station 200. The controller 120 performs SR-induced switching processing of switching a PDCCH monitoring state related to PDCCH monitoring in response to SR transmission or an SR transmission trigger. The receiver 112 receives the RRC message including the switching control information for controlling the SR-induced switching processing from the base station 200. The controller 120 controls the SR-induced switching processing based on the switching control information. As a result, it is possible to switch the PDCCH monitoring state based on the SR transmission or the transmission trigger under the control of the base station 200, and it is possible to appropriately perform the radio communication even when the PDCCH monitoring state is switched.

Furthermore, in the UE 100 according to the present embodiment, the transmitter 111 performs RACH transmission to the base station 200. In response to the RACH transmission or the RACH transmission trigger, the controller 120 performs RACH-induced switching processing for switching a PDCCH monitoring state related to PDCCH monitoring. The receiver 112 receives an RRC message or a MAC control element (MAC CE) including switching control information for controlling the RACH-induced switching processing from the base station 200. The controller 120 controls the RACH-induced switching processing based on the switching control information. As a result, it is possible to switch the PDCCH monitoring state based on the transmission of the RACH or the transmission trigger under the control of the base station 200, and it is possible to appropriately perform the radio communication even when the PDCCH monitoring state is switched.

Further, in the UE 100 according to the present embodiment, the receiver 112 receives the RRC message for configuring the cell group from the base station 200. The transmitter 111 transmits SR or RACH to the base station 200. The controller 120 performs a simultaneous switching processing of simultaneously switching the PDCCH monitoring state related to the monitoring of the PDCCH for each serving cell in the cell group in response to the transmission (or transmission trigger) of the SR or the RACH. As a result, it is possible to simultaneously switch the PDCCH monitoring state based on the SR or RACH transmission (or transmission trigger) in units of cell groups including a plurality of serving cells, and it is possible to efficiently switch the PDCCH monitoring state.

(5) Configuration of Base Station

Figure 14:
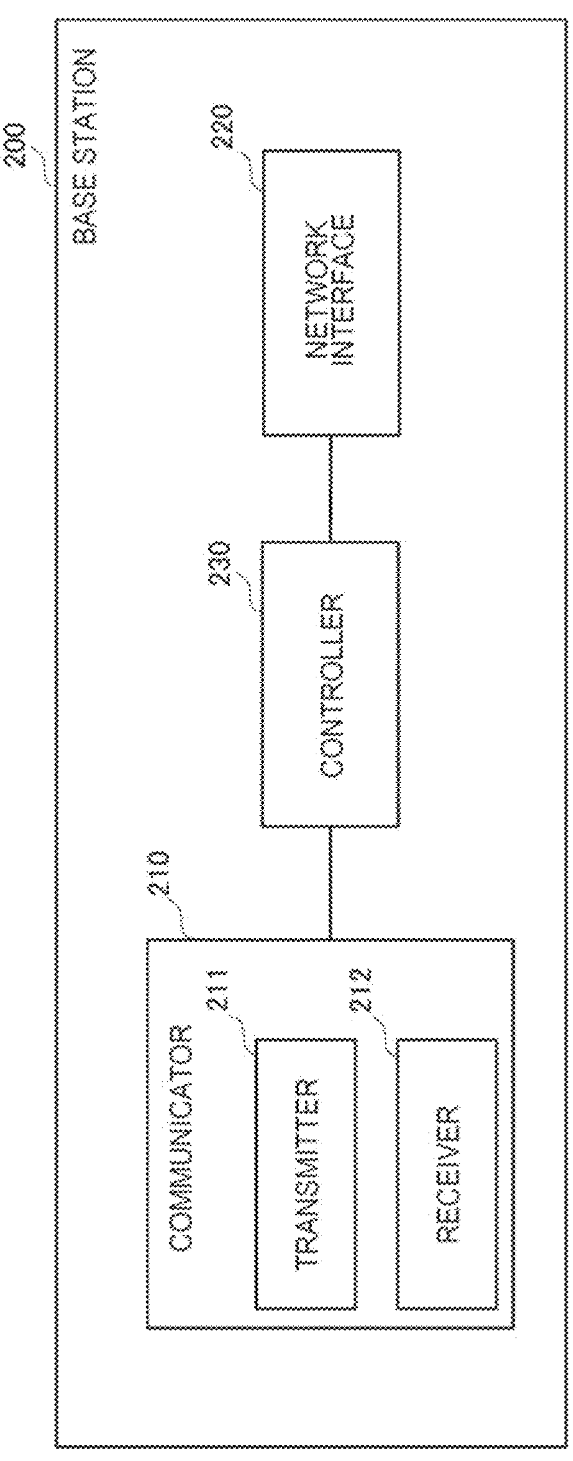
FIG. 14 is a diagram illustrating a configuration of a base station according to an embodiment.

Next, a configuration of the base station 200 according to the present embodiment will be described with reference to FIG. 14. The base station 200 includes a communicator 210, a network interface 220, and a controller 230.

For example, the communicator 210 receives a radio signal from the UE 100 and transmits a radio signal to the UE 100. The communicator 210 includes at least one transmitter 211 and at least one receiver 212. The transmitter 211 and the receiver 212 may include an antenna and an RF circuit. The antenna converts a signal into a radio wave and emits the radio wave into space. Furthermore, the antenna receives a radio wave in space and converts the radio wave into a signal. The RF circuit performs analog processing of a signal transmitted and received via the antenna. The RF circuit may include a high frequency filter, an amplifier, a modulator, a low pass filter, and the like.

The network interface 220 transmits and receives a signal to and from a network. The network interface 220 receives, for example, a signal from a neighboring base station connected via an Xn interface, which is an interface between base stations, and transmits the signal to the neighboring base station. In addition, the network interface 220 receives, for example, a signal from the core network apparatus 300 connected via the NG interface, and transmits the signal to the core network apparatus 300.

The controller 230 performs various types of control in the base station 200. The controller 230 controls, for example, communication with the UE 100 via the communicator 210. Furthermore, the controller 230 controls, for example, communication with a node (for example, the neighboring base station and the core network apparatus 300) via the network interface 220. The operation of the base station 200 described above and described later may be an operation under the control of the controller 230. The controller 230 may include at least one processor capable of executing a program and a memory that stores the program. The processor may execute the program to perform the operation of the controller 230. The controller 230 may include a digital signal processor that performs digital processing of a signal transmitted and received via an antenna and an RF circuit. The digital processing includes processing of the protocol stack of the RAN. The memory stores the program executed by the processor, a parameter related to the program, and data related to the program. All or part of the memory may be included in the processor.

In the base station 200 according to the present embodiment, the receiver 212 receives the SR from the UE 100 on the PUCCH. The transmitter 211 transmits the RRC message including the switching control information for controlling the SR-induced switching processing to the UE 100. The SR-induced switching processing is a process in which the UE 100 switches the PDCCH monitoring state related to the monitoring of the PDCCH in response to the SR transmission or the SR transmission trigger. As a result, it is possible to switch the PDCCH monitoring state based on the SR transmission or the transmission trigger under the control of the base station 200, and it is possible to appropriately perform the radio communication even when the PDCCH monitoring state is switched.

Furthermore, in the base station 200 according to the present embodiment, the receiver 212 receives a RACH preamble from the UE 100 on a RACH (PRACH). The transmitter 211 transmits the RRC message or the MAC CE including the switching control information for controlling the RACH-induced switching processing to the UE 100. The RACH-induced switching processing is a process in which the UE 100 switches the PDCCH monitoring state related to the monitoring of the PDCCH in response to the RACH transmission or the RACH transmission trigger. As a result, it is possible to switch the PDCCH monitoring state based on the transmission of the RACH or the transmission trigger under the control of the base station 200, and it is possible to appropriately perform the radio communication even when the PDCCH monitoring state is switched.

Further, in the base station 200 according to the present embodiment, the receiver 212 receives the SR or the RACH preamble from the UE 100. The transmitter 211 transmits the RRC message for configuring the cell group to the UE 100. The cell group is a group including serving cells in which the UE 100 simultaneously switches the PDCCH monitoring state related to the monitoring of the PDCCH in response to the transmission or trigger of the SR or RACH. As a result, it is possible to simultaneously switch the PDCCH monitoring state based on the SR or RACH transmission (or transmission trigger) in units of cell groups including a plurality of serving cells, and it is possible to efficiently switch the PDCCH monitoring state.

(6) SR-Induced Switching Processing

The SR-induced switching processing according to the present embodiment will be described on the premise of the above-described configuration and operation.

(6.1) Operation Sequence Example of SR-Induced Switching Processing

A first operation sequence example related to the SR-induced switching processing according to the present embodiment will be described with reference to FIG. 15. In the first operation sequence example, the UE 100 (the controller 120) switches the PDCCH monitoring state after the SR transmission by performing the SR-induced switching processing in response to the SR transmission.

In step S101, the base station 200 (the transmitter 211) transmits the RRC message to the UE 100. The RRC message may be a dedicated RRC message (for example, RRCReconfiguration message) transmitted for each UE. The UE 100 (the receiver 112) receives the RRC message.

The RRC message includes an SR configuration for configuring a parameter for an SR resource. The SR configuration includes switching control information for controlling the SR-induced switching processing. As a result, the switching control information for controlling the SR-induced switching processing can be efficiently configured for the UE 100.

The SR configuration may include a plurality of SR resource configurations each associated with a logical channel. Each of the plurality of SR resource configurations may include switching control information. As a result, the SR-induced switching processing can be controlled independently for each logical channel.

The RRC message may include a PDCCH configuration that configures UE-specific PDCCH parameters. The PDCCH configuration may include switching control information for controlling the SR-induced switching processing. The RRC message may further include information for configuring the PDCCH skipping and/or the SSSG switching described above.

The switching control information may be information related to whether the SR-induced switching processing is enabled. The switching control information may include 1-bit flag information indicating whether the SR-induced switching processing is enabled or disabled. As a result, the base station 200 can control whether the UE 100 performs the SR-induced switching processing.

The switching control information may be information designating a PDCCH monitoring state after switching by the SR-induced switching processing. For example, the switching control information may include an index indicating the SSSG after switching by the SR-induced switching processing. As a result, the base station 200 can designate the PDCCH monitoring state (for example, SSSG) of the switching destination when the UE 100 performs the SR-induced switching processing.

When the RRC message does not include the switching control information, the UE 100 (the controller 120) may perform control so that the SR-induced switching processing is not performed. For example, in a case where the enabling of the SR-induced switching processing is not configured and/or the PDCCH monitoring state (for example, SSSG) of the switching destination when the SR-induced switching processing is performed is not configured, the UE 100 (the controller 120) does not perform the SR-induced switching processing even when the SR is transmitted. As a result, it is possible to prevent a mismatch between the actual PDCCH monitoring state in the UE 100 and the PDCCH monitoring state recognized by the base station 200.

In step S102, the base station 200 (the transmitter 211) transmits, to the UE 100 on the PDCCH, the switching instruction DCI instructing PDCCH skipping or SSSG switching. The UE 100 (the receiver 112) receives the switching instruction DCI.

In step S103, the UE 100 (the controller 120) switches the PDCCH monitoring state in response to the reception of the switching instruction DCI. In a case where the PDCCH skipping is configured, the UE 100 (the controller 120) may skip the monitoring of the PDCCH for a designated duration in response to the reception of the switching instruction DCI (skip instruction DCI). When the SSSG switching is configured, the UE 100 (the controller 120) may switch to the SSSG instructed by the switching instruction DCI in response to reception of the switching instruction DCI. As a result, the UE 100 enters the power saving state in which the power consumption necessary for monitoring the PDCCH is reduced.

In step S104, the UE 100 (the controller 120) detects the SR transmission trigger. The SR transmission trigger may be any of generation of uplink data and/or a BSR to be transmitted to the base station 200, arrival of the uplink data to be transmitted to the base station 200 at the MAC layer of the UE 100, and an instruction to transmit an SR from the MAC layer to the physical (PHY) layer in the UE 100.

In step S105, the UE 100 (the transmitter 111) transmits the SR to the base station 200 on the PUCCH in response to the transmission trigger of the SR based on the SR configuration configured in step S101. For example, the UE 100 transmits the SR using the SR resource configuration corresponding to the logical channel targeted for the SR transmission, that is, the logical channel for transmitting the uplink data. The base station 200 (the receiver 212) receives the SR.

In step S106, the UE 100 (the controller 120) switches the PDCCH monitoring state in response to the transmission of the SR (the SR-induced switching processing). The SR-induced switching processing is a process of switching the PDCCH monitoring state from the first monitoring state to the second monitoring state. The first monitoring state corresponds to the above-described power saving state. The second monitoring state is a state in which the PDCCH is monitored more frequently than in the first monitoring state. This makes it easier to cope with radio communication (data communication) occurring after transmission of SR. That is, the UE 100 (the controller 120) may perform the PDCCH skipping and/or the SSSG switching based on the SR transmission (or the SR transmission trigger). Furthermore, the SR-induced switching processing may correspond to a process related to PDCCH skipping and/or SSSG switching based on SR transmission (or SR transmission trigger).

For example, the first monitoring state may be a state in which the PDCCH is monitored in a first period, and the second monitoring state may be a state in which the PDCCH is monitored in a second period shorter than the first period. For example, the UE 100 (the controller 120) switches to the SSSG having the short PDCCH monitoring period in response to the transmission of the SR after the SSSG switching is configured and switching to the SSSG having the long PDCCH monitoring period is instructed by the DCI.

In addition, the first monitoring state may be a state in which the PDCCH is not monitored (that is, PDCCH skipping), and the second monitoring state may be a state in which the PDCCH is periodically monitored. For example, the UE 100 (the controller 120) switches to a state of monitoring the PDCCH in response to the transmission of the SR after the PDCCH skipping is configured and the instruction to perform the PDCCH skipping is given by the DCI.

The UE 100 (the controller 120) may perform the SR-induced switching processing only when performing the SR transmission when the UE itself is in the power saving state. That is, in a case where the UE 100 (the controller 120) performs the SR transmission when the UE itself is not in the power saving state, the SR-induced switching processing may not be performed. Alternatively, the UE 100 (the controller 120) may perform the SR-induced switching processing only when SR transmission is performed in a state in which PDCCH skipping and/or SSSG switching is configured. That is, the UE 100 (the controller 120) may not perform the SR-induced switching processing in a case where the PDCCH skipping and/or the SSSG switching are/is not configured.

The UE 100 (the controller 120) may perform the SR-induced switching processing only when the switching control information indicates that the SR-induced switching processing is enabled. When performing the SR-induced switching processing based on the switching control information indicating that the SR-induced switching processing is enabled, the UE 100 (the controller 120) may switch to a predetermined PDCCH monitoring state in the SR-induced switching processing. The predetermined PDCCH monitoring state may be the default SSSG described above.

When the PDCCH monitoring state (for example, SSSG) of the switching destination by the SR-induced switching processing is designated by the switching control information, the UE 100 (the controller 120) may switch to the PDCCH monitoring state designated by the switching control information. For example, in a case where the switching control information includes an index indicating the SSSG after switching by the SR-induced switching processing, the UE 100 (the controller 120) switches to the SSSG indicated by the index.

When the switching control information is configured for each logical channel, the UE 100 (the controller 120) may control the SR-induced switching processing based on the switching control information corresponding to one logical channel according to the SR transmission in the one logical channel. For example, in a case where the switching control information is configured for each of the logical channels #0 to #4 of the UE 100 and SR is transmitted for the logical channel #1, the UE 100 (the controller 120) controls the SR-induced switching processing using the switching control information corresponding to the logical channel #1. As a result, the SR-induced switching processing can be appropriately controlled for each logical channel.

Here, the UE 100 (the transmitter 111) can transmit not only a positive SR but also a negative SR. For example, the positive SR may be an SR whose value is set to "1", and the negative SR may be an SR whose value is set to "0". Furthermore, for example, the positive SR may be used to request an uplink shared channel (UL-SCH) resource, and the negative SR may be used so as not to request an uplink shared channel (UL-SCH) resource. When transmitting negative SR to the base station 200, the UE 100 (the controller 120) performs control so that the SR-induced switching processing is not performed. That is, the UE 100 (the controller 120) performs the SR-induced switching processing only when the positive SR is transmitted to the base station 200.

In step S107, the base station 200 (the controller 230) allocates the UL-SCH resource to the UE 100 in response to the reception of the SR from the UE 100. Specifically, the base station 200 (the transmitter 211) transmits scheduling DCI including the UL grant for allocating the UL-SCH resource to the UE 100 on the PDCCH.

Figure 16:
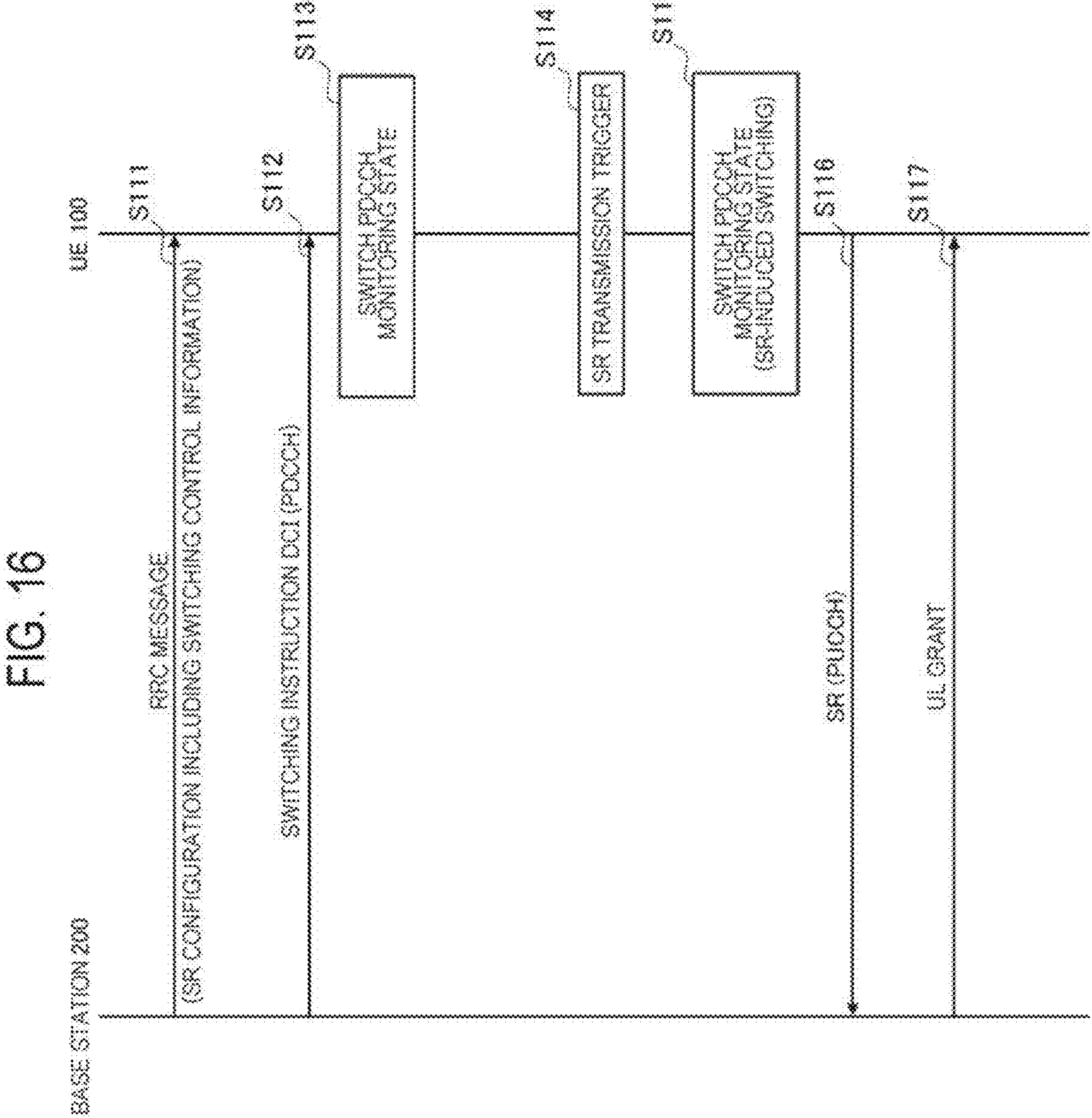
FIG. 16 is a diagram illustrating a second operation sequence example related to the SR-induced switching processing according to the embodiment.

With reference to FIG. 16, the difference from the above-described first operation sequence example will be mainly described in the second operation sequence example related to the SR-induced switching processing according to the present embodiment. In the second operation sequence example, the UE 100 (the controller 120) switches the PDCCH monitoring state before the transmission of the SR by performing the SR-induced switching processing in response to the SR transmission trigger.

Figure 15:
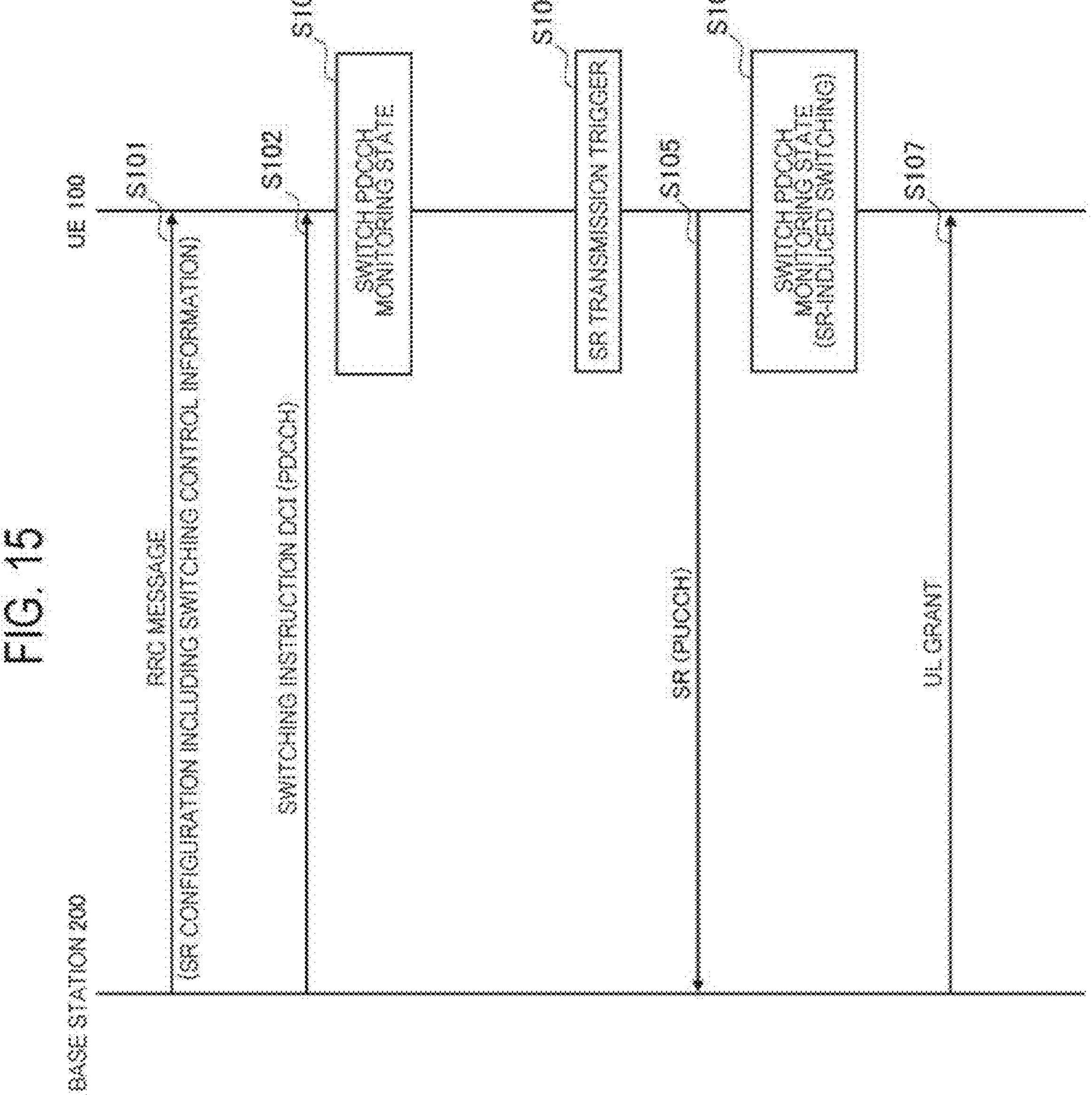
FIG. 15 is a diagram illustrating a first operation sequence example related to the SR-induced switching processing according to the embodiment.

In FIG. 16, the operations in steps S111 to S114 are similar to the operations in steps S101 to S104 in FIG. 15.

In step S115, the UE 100 (the controller 120) switches the PDCCH monitoring state in response to the SR transmission trigger (the SR-induced switching processing).

In step S116, the UE 100 (the transmitter 111) transmits the SR to the base station 200 on the PUCCH.

In step S117, the base station 200 (the controller 230) allocates the UL-SCH resource to the UE 100 in response to the reception of the SR from the UE 100.

As described above, according to the second operation sequence example, the SR-induced switching processing can be initiated at an earlier stage than the first operation sequence example. In the UE 100, in a case where it takes a certain time to switch the PDCCH monitoring state in the SR-induced switching processing, there is a possibility that it is not in time for reception of the UL grant from the base station 200 if the SR-induced switching processing is initiated after the SR is transmitted. Therefore, by initiating the SR-induced switching processing before transmitting the SR, the UL grant from the base station 200 can be more reliably received.

Whether the trigger of the SR-induced switching processing is the SR transmission (that is, after SR transmission) or the SR transmission trigger (that is, before SR transmission) may be configured from the base station 200 to the UE 100. For example, the base station 200 (the transmitter 211) may transmit switching control information including information for configuring whether the trigger of the SR-induced switching processing is the SR transmission or the SR transmission trigger to the UE 100 by the RRC message.

(6.2) Configuration Example of RRC Message for SR-Induced Switching Processing

A first configuration example of the RRC message according to the present embodiment will be described with reference to FIG. 17. In the first configuration example, switching control information for controlling the SR-induced switching processing is included in the SR configuration (SchedulingRequestConfig).

The base station 200 (the transmitter 211) transmits the RRC message including the SR configuration (SchedulingRequestConfig) illustrated in FIG. 17 to the UE 100. SchedulingRequestConfig can include a list of SRs whose configurations are to be added or changed (schedulingRequestToAddModList) and a list of SRs whose configurations are to be released (schedulingRequestToReleaseList). The schedulingRequestToAddModList includes a configuration (SchedulingRequestToAddMod) of the SR to be added or changed, and the SchedulingRequestToAddMod includes an SR identifier (schedulingRequestId) for identifying the SR resource configuration. The schedulingRequestId is associated with the logical channel. Specifically, the logical channel configuration (LogicalChannelConfig) of each logical channel includes schedulingRequestId, and the UE 100 (the controller 120) applies the SR resource configuration indicated by the schedulingRequestId to the logical channel.

In the first configuration example, as illustrated in A1 of FIG. 17, SchedulingRequestConfig includes a list of SSSGs to be switched in the SR-induced switching processing (schedulingRequestToAddModListExt-r17). schedulingRequestToAddModListExt-r17 is associated with schedulingRequestId. As illustrated in A2 of FIG. 17, schedulingRequestToAddModListExt-r17 includes information (SchedulingRequestToAddMod-v17xy) for configuring the SSSG to be switched in the SR-induced switching processing, and SchedulingRequestToAddMod-v17xy includes an identifier or an index (searchSpaceSetId-r17) of the SSSG. Information as illustrated in A1 and A2 of FIG. 17 corresponds to switching control information for controlling the SR-induced switching processing.

In response to SR transmission or an SR transmission trigger for a certain logical channel, the UE 100 (the controller 120) switches to the SSSG indicated by searchSpaceSetId-r17 in SchedulingRequestToAddMod-v17xy associated with the logical channel. In a case where SchedulingRequestToAddMod-v17xy and/or searchSpaceSetId-r17 associated with the logical channel are not configured, the UE 100 (the controller 120) may not perform the SSSG switching according to the SR transmission or the SR transmission trigger, or may perform the SSSG switching to the default SSSG according to the SR transmission or the SR transmission trigger.

A second configuration example of the RRC message according to the present embodiment will be described with reference to FIG. 18. In the first configuration example, the switching control information for controlling the SR-induced switching processing is included in the SR resource configuration (SchedulingRequestResourceConfig).

The base station 200 (the transmitter 211) transmits, to the UE 100, the RRC message including the SR resource configuration (SchedulingRequestResourceConfig) illustrated in FIG. 18. SchedulingRequestResourceConfig can include an SR identifier (schedulingRequestId) associated with a logical channel, information (resource) for configuring a PUCCH resource used for SR transmission, information (periodicityAndOffset) for configuring a period and/or an offset used for SR transmission, and information (phy-PriorityIndex-r16) for configuring a priority (phy-Priority) of SR. In the present second configuration example, as illustrated in B1 of FIG. 18, SchedulingRequestResourceConfig includes an identifier or an index (searchSpaceSetId-r17) of the switching destination SSSG in the SR-induced switching processing. Information as illustrated in B1 of FIG. 18 corresponds to switching control information for controlling the SR-induced switching processing.

In response to SR transmission or an SR transmission trigger for a certain logical channel, the UE 100 (the controller 120) switches to the SSSG indicated by searchSpaceSetId-r17 associated with the logical channel. In a case where the searchSpaceSetId-r17 associated with the logical channel is not configured, the UE 100 (the controller 120) may not perform the SSSG switching according to the SR transmission or the SR transmission trigger, or may perform the SSSG switching to the default SSSG according to the SR transmission or the SR transmission trigger.

A third configuration example of the RRC message according to the present embodiment will be described with reference to FIG. 19.

The base station 200 (the transmitter 211) transmits the RRC message including the PDCCH configuration (PDCCH-Config) illustrated in FIG. 19 to the UE 100. As illustrated in Cl of FIG. 19, PDCCH-Config can include information for configuring the default SSSG (defaultSearchSpaceSet-r17) and information for configuring the first SSG (firstSearchSpaceSet-r17).

The defaultSearchSpaceSet-r17 includes indexes of the default SSSG (SearchSpaceSetId-r17). firstSearchSpaceSet-r17 consists of the index of the first SSSG (SearchSpaceSetId-r17). The first SSSG refers to an SSSG to be first applied by the UE 100. In a case where the firstSearchSpaceSet-r17 is configured for the primary cell (SpCell), the UE 100 (the controller 120) enables the SSSG configured in the firstSearchSpaceSet-r17 at the time of RRC configuration or RRC reconfiguration. In a case where the firstSearchSpaceSet-r17 is configured for a secondary cell (SCell), the UE 100 (the controller 120) uses the SSSG configured in the firstSearchSpaceSet-r17 when the secondary cell is enabled.

In a case where the switching destination SSSG by the SR-induced switching processing is not explicitly designated from the base station 200, the UE 100 (the controller 120) may switch to the default SSSG (defaultSearchSpaceSet) in response to the SR transmission or the SR transmission trigger. Alternatively, in a case where the switching destination SSSG by the SR-induced switching processing is not explicitly designated from the base station 200, the UE 100 (the controller 120) may switch to the first SSSG (firstSearchSpaceSet) in response to the SR transmission or the SR transmission trigger.

(6.3) Specific Example of SR-Induced Switching Processing

A first specific example of the SR-induced switching processing according to the present embodiment will be described with reference to FIG. 20. As described above, the SR-induced switching processing is a process of switching the PDCCH monitoring state from the first monitoring state to the second monitoring state. The first monitoring state corresponds to the above-described power saving state. In the first specific example, the first monitoring state is a state in which the PDCCH is monitored in a first period, and the second monitoring state is a state in which the PDCCH is monitored in a second period shorter than the first period.

At time t11, the UE 100 (the receiver 112) receives, from the base station 200, the switching instruction DCI indicating the SSSG in the downlink BWP in a certain serving cell.

At time t12, the UE 100 (the controller 120) initiates to apply the instructed SSSG in response to the reception of the switching instruction DCI (that is, the first monitoring state is initiated). The UE 100 (the controller 120) initiates the first timer defining the duration of the first monitoring state at the start of the first monitoring state. In the first timer, for example, a duration Z is set as a timer value. The timer value (timer configuration value) of the first timer may be configured from the base station 200 to the UE 100 by an RRC message.

At time t13, the UE 100 (the transmitter 111) transmits the SR to the base station 200 on the PUCCH in the uplink BWP in the serving cell. The UE 100 (the controller 120) performs the SR-induced switching processing of switching to a predetermined SSSG in response to the SR transmission or the SR transmission trigger (that is, the second monitoring state is initiated). The predetermined SSSG may be an SSSG configured by the base station 200 through SR configuration, a default SSSG (defaultSearchSpaceSet), or a first SSSG (firstSearchSpaceSet).

The UE 100 (the controller 120) stops the first timer when performing the SR-induced switching processing. Stopping the first timer can prevent switching to the default SSSG due to expiration of the first timer.

The UE 100 (the controller 120) starts the second timer that defines the duration of the second monitoring state when performing the SR-induced switching processing. In the second timer, for example, a duration Y is set as a timer value. The timer value (timer configuration value) of the second timer may be configured from the base station 200 to the UE 100 by an RRC message. When performing the SR-induced switching processing, the UE 100 (the controller 120) starts the second timer in which the timer value is set. As a result, the base station 200 can control the duration of the second monitoring state.

In the second monitoring state, the UE 100 (the receiver 112) may receive scheduling DCI (for example, the DCI format used for scheduling the PDSCH or the DCI format used for scheduling the PUSCH) used for radio resource allocation from the base station 200. The UE 100 (the controller 120) may restart the second timer in response to the reception of the scheduling DCI. Since data communication occurs due to reception of the scheduling DCI, the duration of the second monitoring state can be extended by restarting the second timer. In addition, the UE 100 (the controller 120) may restart the second timer in response to the SR transmission or the SR transmission trigger in the second monitoring state. Since data communication occurs due to SR transmission, the duration of the second monitoring state can be extended by restarting the second timer.

The UE 100 (the controller 120) switches to a predetermined PDCCH monitoring state in response to the expiration of the second timer. That is, the UE 100 (the controller 120) ends the second monitoring state when the duration Y expires. The predetermined PDCCH monitoring state to be the switching destination when the second timer expires may be a default SSSG (defaultSearchSpaceSet) or a first SSSG (firstSearchSpaceSet).

A second specific example of the SR-induced switching processing according to the present embodiment will be described with reference to FIG. 21. In the second specific example, the first monitoring state is a state in which the PDCCH is not monitored (that is, PDCCH skipping), and the second monitoring state is a state in which the PDCCH is periodically monitored.

At time t21, the UE 100 (the receiver 112) receives, from the base station 200, the switching instruction DCI that instructs PDCCH skipping in the downlink BWP in a certain serving cell.

At time t22, the UE 100 (the controller 120) initiates the PDCCH skipping in response to the reception of the switching instruction DCI (that is, the first monitoring state is initiated). The UE 100 (the controller 120) initiates the first timer defining the duration of the first monitoring state at the start of the first monitoring state. In the first timer, for example, a duration X is set as a timer value. The timer value (timer configuration value) of the first timer may be configured from the base station 200 to the UE 100 by an RRC message.

At time t23, the UE 100 (the transmitter 111) transmits the SR to the base station 200 on the PUCCH in the uplink BWP in the serving cell. The UE 100 (the controller 120) performs the SR-induced switching processing of switching to a predetermined SSSG in response to the SR transmission or the SR transmission trigger (that is, the second monitoring state is initiated). As a result, the PDCCH skipping ends, and the monitoring of the PDCCH is initiated (resumed). The predetermined SSSG may be an SSSG configured by the base station 200 through SR configuration, a default SSSG (defaultSearchSpaceSet), or a first SSSG (firstSearchSpaceSet).

The UE 100 (the controller 120) stops the first timer when performing the SR-induced switching processing. Stopping the first timer can prevent switching to the default SSSG due to expiration of the first timer.

The UE 100 (the controller 120) starts the second timer that defines the duration of the second monitoring state when performing the SR-induced switching processing. In the second timer, for example, a duration Y is set as a timer value. The timer value (timer configuration value) of the second timer may be configured from the base station 200 to the UE 100 by an RRC message. When performing the SR-induced switching processing, the UE 100 (the controller 120) starts the second timer in which the timer value is set. As a result, the base station 200 can control the duration of the second monitoring state.

In the second monitoring state, the UE 100 (the receiver 112) may receive scheduling DCI (for example, the DCI format used for scheduling the PDSCH or the DCI format used for scheduling the PUSCH) used for radio resource allocation from the base station 200. The UE 100 (the controller 120) may restart the second timer in response to the reception of the scheduling DCI. Since data communication occurs due to reception of the scheduling DCI, the duration of the second monitoring state can be extended by restarting the second timer. In addition, the UE 100 (the controller 120) may restart the second timer in response to the SR transmission or the SR transmission trigger in the second monitoring state. Since data communication occurs due to SR transmission, the duration of the second monitoring state can be extended by restarting the second timer.

The UE 100 (the controller 120) switches to a predetermined PDCCH monitoring state in response to the expiration of the second timer. That is, the UE 100 (the controller 120) ends the second monitoring state when the duration Y expires. The predetermined PDCCH monitoring state to be the switching destination when the second timer expires may be a default SSSG (defaultSearchSpaceSet) or a first SSSG (firstSearchSpaceSet).

(7) RACH-Induced Switching Processing

A RACH-induced switching processing according to the present embodiment will be described on the premise of the above-described configuration and operation.

(7.1) Operation Sequence Example Related to RACH-Induced Switching Processing A first operation sequence example related to the RACH-induced switching processing according to the present embodiment will be described with reference to FIG. 22. In the first operation sequence example, the UE 100 (the controller 120) performs the RACH-induced switching processing according to the RACH transmission (specifically, RACH preamble transmission) to switch the PDCCH monitoring state after the RACH transmission.

In step S201, the base station 200 (the transmitter 211) transmits the RRC message to the UE 100. The RRC message may be a dedicated RRC message (for example, RRCReconfiguration message) transmitted for each UE. The UE 100 (the receiver 112) receives the RRC message.

The RRC message includes a RACH resource for beam failure recovery (BFR) and a BFR configuration for configuring a reference signal resource for detecting a beam failure. The RACH configuration includes switching control information for controlling the RACH-induced switching processing. As a result, the switching control information for controlling the RACH-induced switching processing can be efficiently configured for the UE 100. Note that the MAC layer of the UE 100 monitors the reference signal in the reference signal resource configured by the BFR configuration for the primary cell, and when the beam failure instance is detected a predetermined number of times in the physical layer within a predetermined time, initiates the RACH procedure for the primary cell using the RACH resource configured by the BFR configuration.

The BFR configuration may include a plurality of BFR resource configurations each associated with the RACH preamble. Each of the plurality of RACH resource configurations may include switching control information. As a result, the RACH-induced switching processing can be controlled independently for each RACH preamble.

The RRC message may include a PDCCH configuration that configures UE-specific PDCCH parameters. The PDCCH configuration may include switching control information for controlling the RACH-induced switching processing. The RRC message may further include information for configuring the PDCCH skipping and/or the SSSG switching described above.

The switching control information may be information related to whether the RACH-induced switching processing is enabled. The switching control information may include 1-bit flag information indicating whether the RACH-induced switching processing is enabled or disabled. As a result, the base station 200 can control whether the UE 100 performs the RACH-induced switching processing.

The switching control information may be information designating a PDCCH monitoring state after switching by the RACH-induced switching processing. For example, the switching control information may include an index indicating the SSSG after switching by the RACH-induced switching processing. As a result, the base station 200 can designate the PDCCH monitoring state (for example, SSSG) of the switching destination when the UE 100 performs the RACH-induced switching processing.

The UE 100 (the controller 120) may perform control so that the RACH-induced switching processing is not performed in a case where the RRC message does not include the switching control information. For example, when the enabling of the RACH-induced switching processing is not configured and/or the PDCCH monitoring state (for example, SSSG) of the switching destination when the RACH-induced switching processing is performed is not configured, the UE 100 (the controller 120) does not perform the RACH-induced switching processing even when the RACH is transmitted. As a result, it is possible to prevent a mismatch between the actual PDCCH monitoring state in the UE 100 and the PDCCH monitoring state recognized by the base station 200.

In step S202, the base station 200 (the transmitter 211) transmits, to the UE 100 on the PDCCH, the switching instruction DCI instructing PDCCH skipping or SSSG switching. The UE 100 (the receiver 112) receives the switching instruction DCI.

In step S203, the UE 100 (the controller 120) switches the PDCCH monitoring state in response to the reception of the switching instruction DCI. In a case where the PDCCH skipping is configured, the UE 100 (the controller 120) may skip the monitoring of the PDCCH for a designated duration in response to the reception of the switching instruction DCI (skip instruction DCI). When the SSSG switching is configured, the UE 100 (the controller 120) may switch to the SSSG instructed by the switching instruction DCI in response to reception of the switching instruction DCI. As a result, the UE 100 enters the power saving state in which the power consumption necessary for monitoring the PDCCH is reduced.

In step S204, the UE 100 (the controller 120) detects the transmission trigger of the RACH. The transmission trigger of the RACH may be any of the following: the MAC layer of the UE 100 detects the beam failure for the primary cell, there is no PUCCH resource for SR for the logical channel corresponding to the uplink data generated in the UE 100, and the MAC layer instructs the physical layer to transmit the RACH in the UE 100.

In step S205, the UE 100 (the transmitter 111) transmits the RACH preamble to the base station 200 on the PRACH in response to the transmission trigger of the RACH based on the RACH configuration configured in step S201. For example, the UE 100 controls the RACH-induced switching processing based on the switching control information corresponding to one RACH preamble in response to transmission or a transmission trigger of the one RACH preamble configured in the BFR configuration. The base station 200 (the receiver 212) receives the RACH.

In step S206, the UE 100 (the controller 120) switches the PDCCH monitoring state in response to the transmission of the RACH (RACH-induced switching processing). The RACH-induced switching processing is a process of switching the PDCCH monitoring state from the first monitoring state to the second monitoring state. The first monitoring state corresponds to the above-described power saving state. The second monitoring state is a state in which the PDCCH is monitored more frequently than in the first monitoring state. This makes it easier to support radio communication (data communication) that occurs after transmission of the RACH. That is, the UE 100 (the controller 120) may perform the PDCCH skipping and/or the SSSG switching based on the transmission of the RACH (or the RACH transmission trigger). Furthermore, the RACH-induced switching processing may correspond to a process related to PDCCH skipping and/or SSSG switching based on RACH transmission (or RACH transmission trigger).

For example, the first monitoring state may be a state in which the PDCCH is monitored in a first period, and the second monitoring state may be a state in which the PDCCH is monitored in a second period shorter than the first period. For example, the UE 100 (the controller 120) switches to the SSSG having the short PDCCH monitoring period in response to the transmission of the RACH after the SSSG switching is configured and switching to the SSSG having the long PDCCH monitoring period is instructed by the DCI.

In addition, the first monitoring state may be a state in which the PDCCH is not monitored (that is, PDCCH skipping), and the second monitoring state may be a state in which the PDCCH is periodically monitored. For example, the UE 100 (the controller 120) is configured to perform the PDCCH skipping, and after being instructed to perform the PDCCH skipping by the DCI, switches to a state of monitoring the PDCCH according to the transmission of the RACH.

The UE 100 (the controller 120) may perform the RACH-induced switching processing only when the UE performs the RACH transmission when the UE is in the power saving state. That is, in a case where the UE 100 (the controller 120) performs the RACH transmission when the UE itself is not in the power saving state, the RACH-induced switching processing may not be performed. Alternatively, the UE 100 (the controller 120) may perform the RACH-induced switching processing only when the RACH transmission is performed in the state in which the PDCCH skipping and/or the SSSG switching is configured. That is, the UE 100 (the controller 120) may not perform the RACH-induced switching processing in a case where the PDCCH skipping and/or the SSSG switching are not configured.

The UE 100 (the controller 120) may perform the RACH-induced switching processing only when the switching control information indicates that the RACH-induced switching processing is enabled. When performing the RACH-induced switching processing based on the switching control information indicating that the RACH-induced switching processing is enabled, the UE 100 (the controller 120) may switch to a predetermined PDCCH monitoring state in the RACH-induced switching processing. The predetermined PDCCH monitoring state may be the default SSSG described above.

When the PDCCH monitoring state (for example, SSSG) of the switching destination by the RACH-induced switching processing is designated by the switching control information, the UE 100 (the controller 120) may switch to the PDCCH monitoring state designated by the switching control information. For example, in a case where the switching control information includes an index indicating the SSSG after switching by the RACH-induced switching processing, the UE 100 (the controller 120) switches to the SSSG indicated by the index.

In a case where the switching control information is configured for each RACH preamble, the UE 100 (the controller 120) may control the RACH-induced switching processing based on the switching control information corresponding to one RACH preamble in response to the transmission of the one RACH preamble. For example, when the switching control information is configured for each of the RACH preambles #0 to #4 configured in the UE 100 and the RACH transmission by the RACH preamble #1 is performed, the UE 100 (the controller 120) controls the RACH-induced switching processing using the switching control information corresponding to the RACH preamble #1. As a result, the RACH-induced switching processing can be appropriately controlled for each RACH preamble.

In step S207, the base station 200 (the controller 230) allocates the UL-SCH resource to the UE 100 in response to the reception of the RACH preamble from the UE 100. Specifically, the base station 200 (the transmitter 211) transmits scheduling DCI including the UL grant for allocating the UL-SCH resource to the UE 100 on the PDCCH.

Figure 23:
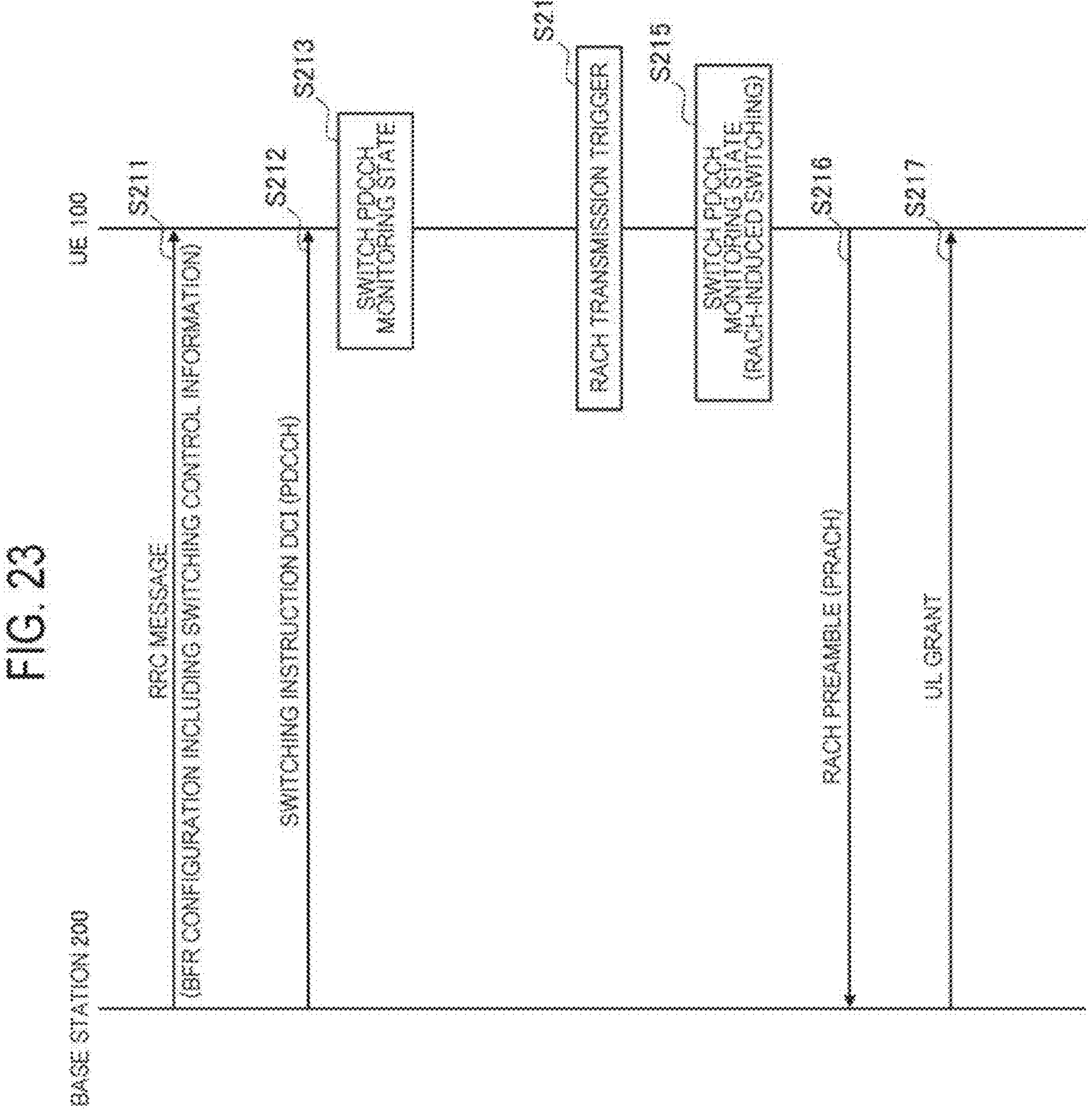
FIG. 23 is a diagram illustrating a second operation sequence example related to the RACH-induced switching processing according to the embodiment.

With reference to FIG. 23, the difference from the above-described first operation sequence example will be mainly described in the second operation sequence example related to the RACH-induced switching processing according to the present embodiment. In the second operation sequence example, the UE 100 (the controller 120) switches the PDCCH monitoring state before the transmission of the RACH preamble by performing the RACH-induced switching processing in response to the RACH transmission trigger.

In FIG. 23, the operations in steps S211 to S214 are similar to the operations in steps S201 to S204 in FIG. 22.

In step S215, the UE 100 (the controller 120) switches the PDCCH monitoring state according to the transmission trigger of the RACH (RACH-induced switching processing).

In step S216, the UE 100 (the transmitter 111) transmits the RACH preamble to the base station 200 on the PRACH.

In step S217, the base station 200 (the controller 230) allocates the UL-SCH resource to the UE 100 in response to the reception of the RACH preamble from the UE 100.

As described above, according to the second operation sequence example, the RACH-induced switching processing can be initiated at an earlier stage than the first operation sequence example. In the UE 100, in a case where it takes a certain time to switch the PDCCH monitoring state in the RACH-induced switching processing, there is a possibility that it is not in time for reception of the UL grant from the base station 200 if the RACH-induced switching processing is initiated after the RACH preamble is transmitted. Therefore, the UL grant from the base station 200 can be more reliably received by initiating the RACH-induced switching processing before transmitting the RACH preamble.

Whether the trigger of the RACH-induced switching processing is the RACH transmission (that is, after the RACH preamble is transmitted) or the RACH transmission trigger (that is, before RACH preamble transmission) may be configured in the UE 100 from the base station 200. For example, the base station 200 (the transmitter 211) may transmit, to the UE 100 by an RRC message, switching control information including information for configuring whether a trigger of the RACH-induced switching processing is the RACH transmission or the RACH transmission trigger.

Figure 24:
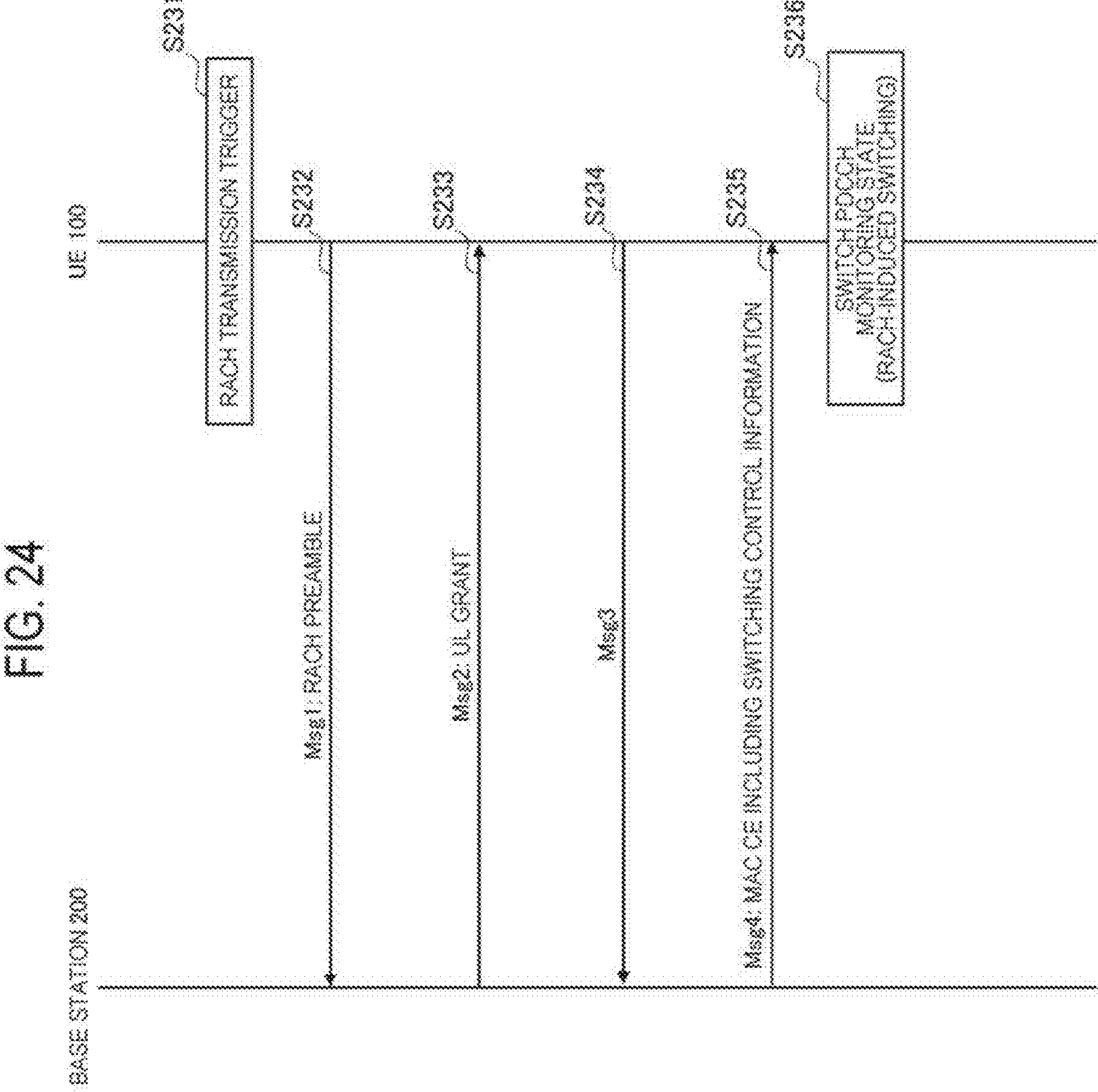
FIG. 24 is a diagram illustrating a third operation sequence example related to a RACH-induced switching processing according to the embodiment.

With reference to FIG. 24, differences from the above-described first and second operation sequence examples will be mainly described for the third operation sequence example related to the RACH-induced switching processing according to the present embodiment. In the third operation sequence example, the UE 100 (the controller 120) performs the RACH-induced switching processing in response to reception of the MAC CE including the switching control information from the base station 200 in the RACH procedure, and switches the PDCCH monitoring state at the end of the RACH procedure. Prior to the operation of FIG. 24, the operations of steps S201 to S203 of FIG. 22 may be performed.

In step S231, the UE 100 (the controller 120) detects the transmission trigger of the RACH. The transmission trigger of the RACH may be any of the following: the MAC layer of the UE 100 detects the beam failure for the primary cell, there is no PUCCH resource for SR for the logical channel corresponding to the uplink data generated in the UE 100, and the MAC layer instructs the physical layer to transmit the RACH in the UE 100.

In step S232, the UE 100 (the transmitter 111) transmits the RACH preamble to the base station 200 on the PRACH based on the RACH configuration configured from the base station 200. The base station 200 (the receiver 212) receives the RACH preamble. Here, in a case where the UE 100 transmits the RACH preamble in response to the detection of the beam failure, the RACH preamble for BFR is applied. In response to reception of the RACH preamble for BFR from the UE 100, the base station 200 (the controller 230) can recognize that the UE 100 has initiated the RACH procedure for BFR. Note that the transmission of the RACH preamble is referred to as Msg1 in the RACH procedure. The UE 100 (the controller 120) may perform the RACH-induced switching processing in response to the RACH transmission trigger or the RACH transmission similarly to the above-described first and second operation sequence examples.

In step S233, the base station 200 (the controller 230) allocates the UL-SCH resource to the UE 100 in response to the reception of the RACH preamble from the UE 100. Specifically, the base station 200 (the transmitter 211) transmits scheduling DCI including the UL grant for allocating the UL-SCH resource to the UE 100 on the PDCCH. The UE 100 (the receiver 112) receives the scheduling DCI including the UL grant. The transmission of the UL grant is referred to as Msg2 in the RACH procedure.

In step S234, the UE 100 (the transmitter 111) performs the uplink transmission using the UL-SCH resource allocated by the UL grant from the base station 200. The base station 200 (the receiver 112) receives the uplink transmission. Such uplink transmission is referred to as Msg3 in the RACH procedure.

In step S235, the base station 200 (the transmitter 211) performs downlink transmission to the UE 100. The UE 100 (the receiver 112) receives the downlink transmission. Such downlink transmission is referred to as Msg4 in the RACH procedure. Here, the base station 200 (the transmitter 211) transmits, to the UE 100, the MAC CE including switching control information designating a PDCCH monitoring state (for example, SSSG) after switching. The UE 100 (the receiver 112) receives the MAC CE. That is, after performing the RACH transmission, the UE 100 (the receiver 112) receives the MAC CE including the switching control information from the base station 200 in the RACH procedure.

In step S236, the UE 100 (the controller 120) performs the RACH-induced switching processing in response to the reception of the MAC CE. Specifically, the UE 100 (the controller 120) switches to the PDCCH monitoring state (for example, SSSG) designated by the switching control information included in the MAC CE.

Note that, although the example in which the base station 200 transmits the MAC CE including the switching control information in the Msg4 has been described, the base station 200 may transmit the MAC CE including the switching control information in the Msg2.

(7.2) Configuration Example of Message for RACH-Induced Switching Processing

A configuration example of the RRC message according to the present embodiment will be described with reference to FIG. 25. In the present configuration example, the switching control information for controlling the RACH-induced switching processing is included in the BFR configuration (BeamFailureRecoveryConfig).

Figure 25:
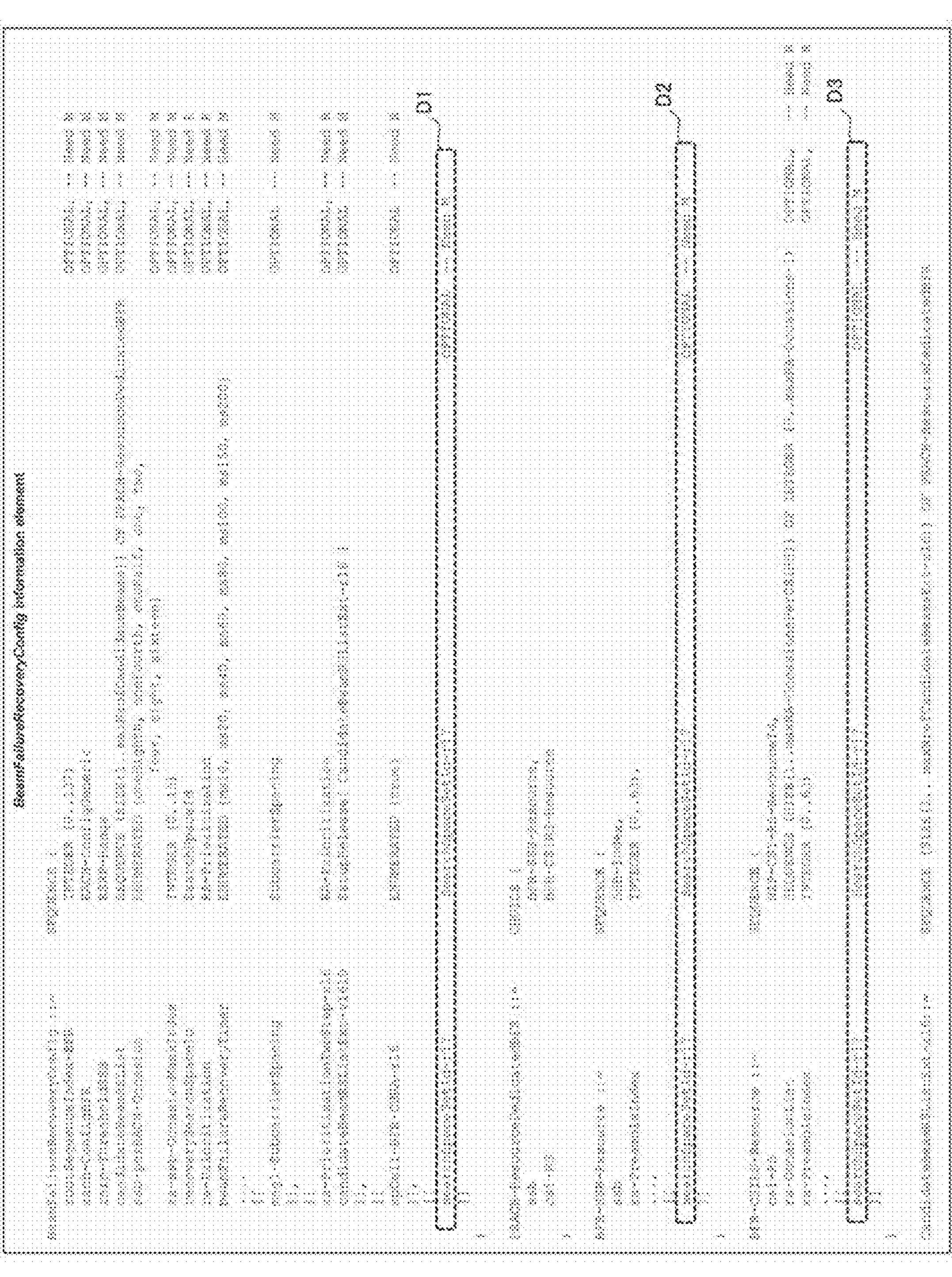
FIG. 25 is a diagram illustrating a configuration example of an RRC message according to an embodiment.

The base station 200 (the transmitter 211) transmits the RRC message including the BFR configuration (BeamFailureRecoveryConfig) illustrated in FIG. 25 to the UE 100. BeamFailureRecoveryConfig can include information for configuring a RACH resource for BFR and information for configuring a reference signal (RS) resource used to detect a beam failure. The reference signal resource is an SSB (SS/PBCH Block) resource or a CSI-RS (Channel State Information RS) resource.

In the present configuration example, as illustrated in D1 of FIG. 25, BeamFailureRecoveryConfig can include information (searchSpaceSetId-r17) for configuring the SSSG to be switched in the RACH-induced switching processing as an information element common to all the RACH preambles. searchSpaceSetId-r17 is an identifier or an index of the SSSG. Furthermore, in the present configuration example, as illustrated in D2 and D3 of FIG. 25, BeamFailureRecoveryConfig can include information (searchSpaceSetId-r17) for configuring the SSSG to be switched in the RACH-induced switching processing as an information element specific to a specific RACH preamble. As a result, the switching destination SSSG can be independently configured for each RACH preamble. The information illustrated in D1 to D3 of FIG. 25 corresponds to switching control information for controlling the RACH-induced switching processing.

In response to the RACH transmission or the RACH transmission trigger of one RACH preamble, the UE 100 (the controller 120) switches to the SSSG indicated by the searchSpaceSetId-r17 associated with the one RACH preamble. In a case where the searchSpaceSetId-r17 associated with the RACH preamble is not configured, the UE 100 (the controller 120) may not perform the SSSG switching according to the RACH transmission or the RACH transmission trigger, or may perform the SSSG switching to the default SSSG according to the RACH transmission or the RACH transmission trigger.

Figure 26:
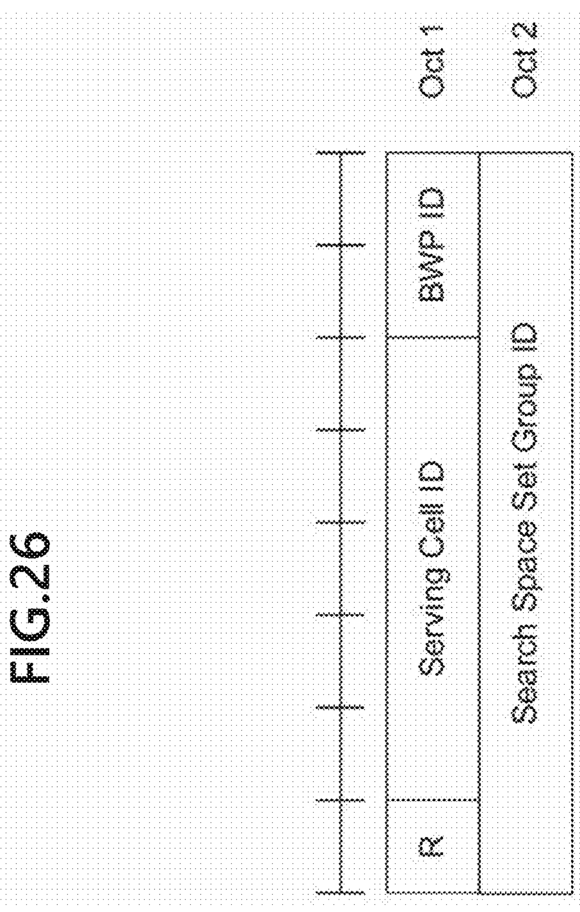
FIG. 26 is a diagram illustrating a configuration example of a MAC CE according to an embodiment.

A configuration example of the MAC CE according to the present embodiment will be described with reference to FIG. 26. The MAC CE according to the present embodiment is a MAC CE for SSSG switching. Such a MAC CE may be referred to as a "Serving Cell Set based Search Space Set Group Indication MAC CE". The SSSG switching MAC CE may be configured to be identifiable by a MAC PDU subheader with an eLCID defined for the SSSG switching MAC CE. The SSSG switching MAC CE includes the following fields and has a fixed size.

- Serving cell ID (cell identifier): this field indicates an ID of a serving cell to which the MAC CE is applied, and a length of the field is, for example, 5 bits. In a case where the serving cell indicated by the serving cell ID is configured as a part of the cell group, the MAC CE is applied to all the serving cells in the cell group to which the serving cell belongs.
- BWP ID (BWP identifier): this field indicates a downlink BWP to which this MAC CE is applied. A length of the BWP ID field is, for example, two bits.
- Search space set group ID (SSSG identifier): this field indicates a search space set group (SSSG) in which the UE monitors the PDCCH, that is, the switching destination SSSG. A length of the field is, for example, 8 bits.
- R: is a reserved bit and is configured to "0".

Upon receiving the SSSG switching MAC CE from the base station 200, the UE 100 (the controller 120) switches to the SSSG indicated by the SSSG switching MAC CE in the downlink BWP for the serving cell indicated by the SSSG switching MAC CE.

(7.3) Specific Example of RACH-Induced Switching Processing

A first specific example of the RACH-induced switching processing according to the present embodiment will be described with reference to FIG. 27. As described above, the RACH-induced switching processing is a process of switching the PDCCH monitoring state from the first monitoring state to the second monitoring state. The first monitoring state corresponds to the above-described power saving state. In the first specific example, the first monitoring state is a state in which the PDCCH is monitored in a first period, and the second monitoring state is a state in which the PDCCH is monitored in a second period shorter than the first period.

At time t31, the UE 100 (the receiver 112) receives, from the base station 200, the switching instruction DCI indicating the SSSG in the downlink BWP in a certain serving cell.

At time t32, the UE 100 (the controller 120) initiates to apply the instructed SSSG in response to the reception of the switching instruction DCI (that is, the first monitoring state is initiated). The UE 100 (the controller 120) initiates the first timer defining the duration of the first monitoring state at the start of the first monitoring state. In the first timer, for example, a duration Z is set as a timer value. The timer value (timer configuration value) of the first timer may be configured from the base station 200 to the UE 100 by an RRC message.

At time t33, the UE 100 (the transmitter 111) transmits the RACH preamble to the base station 200 on the PRACH in the uplink BWP of the serving cell. In response to the RACH transmission or the RACH transmission trigger, the UE 100 (the controller 120) performs RACH-induced switching processing of switching to a predetermined SSSG (that is, the second monitoring state is initiated). The predetermined SSSG may be an SSSG configured by the base station 200 through RACH configuration, a default SSSG (defaultSearchSpaceSet), or a first SSSG (firstSearchSpaceSet).

The UE 100 (the controller 120) stops the first timer when performing the RACH-induced switching processing. Stopping the first timer can prevent switching to the default SSSG due to expiration of the first timer.

The UE 100 (the controller 120) starts the second timer that defines the duration of the second monitoring state when performing the RACH-induced switching processing. In the second timer, for example, a duration Y is set as a timer value. The timer value (timer configuration value) of the second timer may be configured from the base station 200 to the UE 100 by an RRC message. When performing the RACH-induced switching processing, the UE 100 (the controller 120) starts the second timer in which the timer value is set. As a result, the base station 200 can control the duration of the second monitoring state.

In the second monitoring state, the UE 100 (the receiver 112) may receive scheduling DCI (for example, the DCI format used for scheduling the PDSCH or the DCI format used for scheduling the PUSCH) used for radio resource allocation from the base station 200. The UE 100 (the controller 120) may restart the second timer in response to the reception of the scheduling DCI. Since data communication occurs due to reception of the scheduling DCI, the duration of the second monitoring state can be extended by restarting the second timer. In addition, the UE 100 (the controller 120) may restart the second timer in response to the RACH transmission or the RACH transmission trigger in the second monitoring state. Since data communication occurs due to RACH transmission, the duration of the second monitoring state can be extended by restarting the second timer.

The UE 100 (the controller 120) switches to a predetermined PDCCH monitoring state in response to the expiration of the second timer. That is, the UE 100 (the controller 120) ends the second monitoring state when the duration Y expires. The predetermined PDCCH monitoring state to be the switching destination when the second timer expires may be a default SSSG (defaultSearchSpaceSet) or a first SSSG (firstSearchSpaceSet).

A second specific example of the RACH-induced switching processing according to the present embodiment will be described with reference to FIG. 28. In the second specific example, the first monitoring state is a state in which the PDCCH is not monitored (that is, PDCCH skipping), and the second monitoring state is a state in which the PDCCH is periodically monitored.

At time t41, the UE 100 (the receiver 112) receives, from the base station 200, the switching instruction DCI that instructs PDCCH skipping in the downlink BWP in a certain serving cell.

At time t42, the UE 100 (the controller 120) initiates the PDCCH skipping in response to the reception of the switching instruction DCI (that is, the first monitoring state is initiated). The UE 100 (the controller 120) initiates the first timer defining the duration of the first monitoring state at the start of the first monitoring state. In the first timer, for example, a duration X is set as a timer value. The timer value (timer configuration value) of the first timer may be configured from the base station 200 to the UE 100 by an RRC message.

At time t43, the UE 100 (the transmitter 111) transmits the RACH preamble to the base station 200 on the PRACH in the uplink BWP of the serving cell. In response to the RACH transmission or the RACH transmission trigger, the UE 100 (the controller 120) performs RACH-induced switching processing of switching to a predetermined SSSG (that is, the second monitoring state is initiated). As a result, the PDCCH skipping ends, and the monitoring of the PDCCH is initiated (resumed). The predetermined SSSG may be an SSSG configured by the base station 200 through RACH configuration, a default SSSG (defaultSearchSpaceSet), or a first SSSG (firstSearchSpaceSet).

The UE 100 (the controller 120) stops the first timer when performing the RACH-induced switching processing. Stopping the first timer can prevent switching to the default SSSG due to expiration of the first timer.

The UE 100 (the controller 120) starts the second timer that defines the duration of the second monitoring state when performing the RACH-induced switching processing. In the second timer, for example, a duration Y is set as a timer value. The timer value (timer configuration value) of the second timer may be configured from the base station 200 to the UE 100 by an RRC message. When performing the RACH-induced switching processing, the UE 100 (the controller 120) starts the second timer in which the timer value is set. As a result, the base station 200 can control the duration of the second monitoring state.

Here, the timer value of the second timer used for the RACH-induced switching processing may be configured in common with the timer value of the second timer used for the SR-induced switching processing described above by the RRC message. Alternatively, the timer value of the second timer used for the RACH-induced switching processing may be configured independently of the timer value of the second timer used for the SR-induced switching processing described above by the RRC message.

In the second monitoring state, the UE 100 (the receiver 112) may receive scheduling DCI (for example, the DCI format used for scheduling the PDSCH or the DCI format used for scheduling the PUSCH) used for radio resource allocation from the base station 200. The UE 100 (the controller 120) may restart the second timer in response to the reception of the scheduling DCI. Since data communication occurs due to reception of the scheduling DCI, the duration of the second monitoring state can be extended by restarting the second timer. In addition, the UE 100 (the controller 120) may restart the second timer in response to the RACH transmission or the RACH transmission trigger in the second monitoring state. Since data communication occurs due to RACH transmission, the duration of the second monitoring state can be extended by restarting the second timer.

The UE 100 (the controller 120) switches to a predetermined PDCCH monitoring state in response to the expiration of the second timer. That is, the UE 100 (the controller 120) ends the second monitoring state when the duration Y expires. The predetermined PDCCH monitoring state to be the switching destination when the second timer expires may be a default SSSG (defaultSearchSpaceSet) or a first SSSG (firstSearchSpaceSet).

(8) Simultaneous Switching Processing

The simultaneous switching processing according to the present embodiment will be described on the premise of the above-described configuration and operation.

A first operation sequence example related to the simultaneous switching processing according to the present embodiment will be described with reference to FIG. 29. In the first operation sequence example, the UE 100 (the controller 120) performs the SR-induced switching processing or the RACH-induced switching processing in a cell group unit including a plurality of serving cells according to the SR transmission or the RACH transmission.

In step S301, the base station 200 (the transmitter 211) transmits the RRC message to the UE 100. The RRC message may be a dedicated RRC message (for example, RRCReconfiguration message) transmitted for each UE. The UE 100 (the receiver 112) receives the RRC message. The RRC message includes the above-described switching control information. The RRC message may further include information for configuring PDCCH skipping and/or SSSG switching.

The RRC message includes information for configuring at least one cell group in the UE 100. The information for configuring the cell group may include an identifier of each cell group and an identifier of each serving cell belonging to the cell group. Here, the cell group configured to the UE 100 includes, for example, cell group #1: serving cells #1, #2, #3, and #4
cell group #2: serving cells #5, #6, #7, and #8
cell group #3: serving cells #9, #10, #11, #12
cell group #4: serving cells #13, #14, #15, and #16.

The RRC message may include information for commonly configuring a cell group to which the simultaneous switching processing based on the SR transmission or transmission trigger (hereinafter, it is referred to as "SR-induced simultaneous switching processing") is applied and a cell group to which the simultaneous switching processing based on the RACH transmission or transmission trigger (hereinafter, it is referred to as "RACH-induced simultaneous switching processing") is applied. For example, each of the above-described cell groups #1 to #4 is commonly applied to the SR-induced simultaneous switching processing and the RACH-induced simultaneous switching processing. Information for configuring such a common cell group may be included in the PDCCH configuration in the RRC message. By configuring such a common cell group, the configuration related to the simultaneous switching processing can be made efficient.

The RRC message may include information for independently configuring a cell group to which the SR-induced simultaneous switching processing is applied and a cell group to which the RACH-induced simultaneous switching processing is applied. For example, among the above-described cell groups #1 to #4, the cell group #1 and the cell group #2 may be configured in the UE 100 as the cell groups to which the SR-induced simultaneous switching processing is applied, and the cell group #3 and the cell group #4 may be configured in the UE 100 as the cell groups to which the RACH-induced simultaneous switching processing is applied. As a result, the base station 200 can finely control the simultaneous switching processing. In the case of configuring such an independent cell group, the information for configuring the cell group to which the SR-induced simultaneous switching processing is applied may be included in the SR configuration for configuring the parameter for the SR resource. The information for configuring the cell group to which the RACH-induced simultaneous switching processing is applied may be included in the BFR configuration for configuring the RACH resource and the RS resource for the BFR.

The RRC message may include information for configuring a primary timing advance group (PTAG) and a secondary timing advance group (STAG) as cell groups. These timing advance groups (cell groups) may be identified by a timing advance group identifier (tag-id). These timing advance groups (cell groups) may be used as cell groups to which the RACH-induced simultaneous switching processing is applied.

In step S302, the base station 200 (the transmitter 211) transmits, to the UE 100 on the PDCCH, the switching instruction DCI instructing PDCCH skipping or SSSG switching. The UE 100 (the receiver 112) receives the switching instruction DCI.

In step S303, the UE 100 (the controller 120) switches the PDCCH monitoring state in response to the reception of the switching instruction DCI. In a case where the PDCCH skipping is configured, the UE 100 (the controller 120) may skip the monitoring of the PDCCH for a designated duration in response to the reception of the switching instruction DCI (skip instruction DCI). When the SSSG switching is configured, the UE 100 (the controller 120) may switch to the SSSG instructed by the switching instruction DCI in response to reception of the switching instruction DCI. As a result, the UE 100 enters the power saving state in which the power consumption necessary for monitoring the PDCCH is reduced. The UE 100 (the controller 120) may switch the PDCCH monitoring state for each cell group to which the serving cell in which the switching instruction DCI is detected belongs. In the above example, when the switching instruction DCI is detected in the serving cell #1, the UE 100 (the controller 120) may switch the PDCCH monitoring state for the serving cells #1, #2, #3, and #4 included in the cell group #1 to which the serving cell #1 belongs.

In step S304, the UE 100 (the controller 120) detects the SR or RACH transmission trigger.

In step S305, the UE 100 (the transmitter 111) transmits the SR to the base station 200 on the PUCCH in response to the SR transmission trigger. Alternatively, the UE 100 (the transmitter 111) transmits the RACH preamble to the base station 200 on the PRACH in response to the transmission trigger of the RACH. The base station 200 (the receiver 212) receives the SR or RACH.

In step S306, the UE 100 (the controller 120) simultaneously switches the PDCCH monitoring state for each serving cell in the cell group in response to the transmission of the SR or the RACH (the SR-induced simultaneous switching processing or the RACH-induced simultaneous switching processing). The switching processing in each serving cell is controlled by the switching control information similarly to the SR-induced switching processing or the RACH-induced switching processing described above.

The SR-induced simultaneous switching processing or the RACH-induced simultaneous switching processing is a process of simultaneously switching the PDCCH monitoring state from the first monitoring state to the second monitoring state for each serving cell in the cell group. The first monitoring state corresponds to the above-described power saving state. The second monitoring state is a state in which the PDCCH is monitored more frequently than in the first monitoring state.

Here, in response to the transmission of the SR, the UE 100 (the controller 120) may perform the SR-caused simultaneous switching processing on the cell group to which the downlink component carrier (DL CC) corresponding to the uplink component carrier (UL CC) on which the SR is transmitted belongs.

Similarly, in response to the transmission of the RACH (RACH preamble), the UE 100 (the controller 120) may perform the RACH-induced simultaneous switching processing on the cell group to which the DL CC corresponding to the UL CC on which the RACH is transmitted belongs.

The UE 100 (the controller 120) may perform the RACH-induced simultaneous switching processing on the PTAG in response to the transmission of the RACH in the PTAG. The UE 100 (the controller 120) may perform the RACH-induced simultaneous switching processing on the STAG in response to the transmission of the RACH in the STAG.

The first monitoring state may be a state in which the PDCCH is monitored in a first period, and the second monitoring state may be a state in which the PDCCH is monitored in a second period shorter than the first period. For example, the UE 100 (the controller 120) switches to the SSSG having the short PDCCH monitoring period in response to the transmission of the SR or the RACH after the SSSG switching is configured and the switching to the SSSG having the long PDCCH monitoring period is instructed by the DCI.

The first monitoring state may be a state in which the PDCCH is not monitored (that is, PDCCH skipping), and the second monitoring state may be a state in which the PDCCH is periodically monitored. For example, after PDCCH skipping is configured and an instruction to perform PDCCH skipping is given by the DCI, the UE 100 (the controller 120) switches to a state of monitoring the PDCCH in response to the transmission of the SR or the RACH.

In step S307, the base station 200 (the controller 230) allocates the UL-SCH resource to the UE 100 in response to the reception of the SR or the RACH preamble from the UE 100. Specifically, the base station 200 (the transmitter 211) transmits scheduling DCI including the UL grant for allocating the UL-SCH resource to the UE 100 on the PDCCH.

Figure 30:
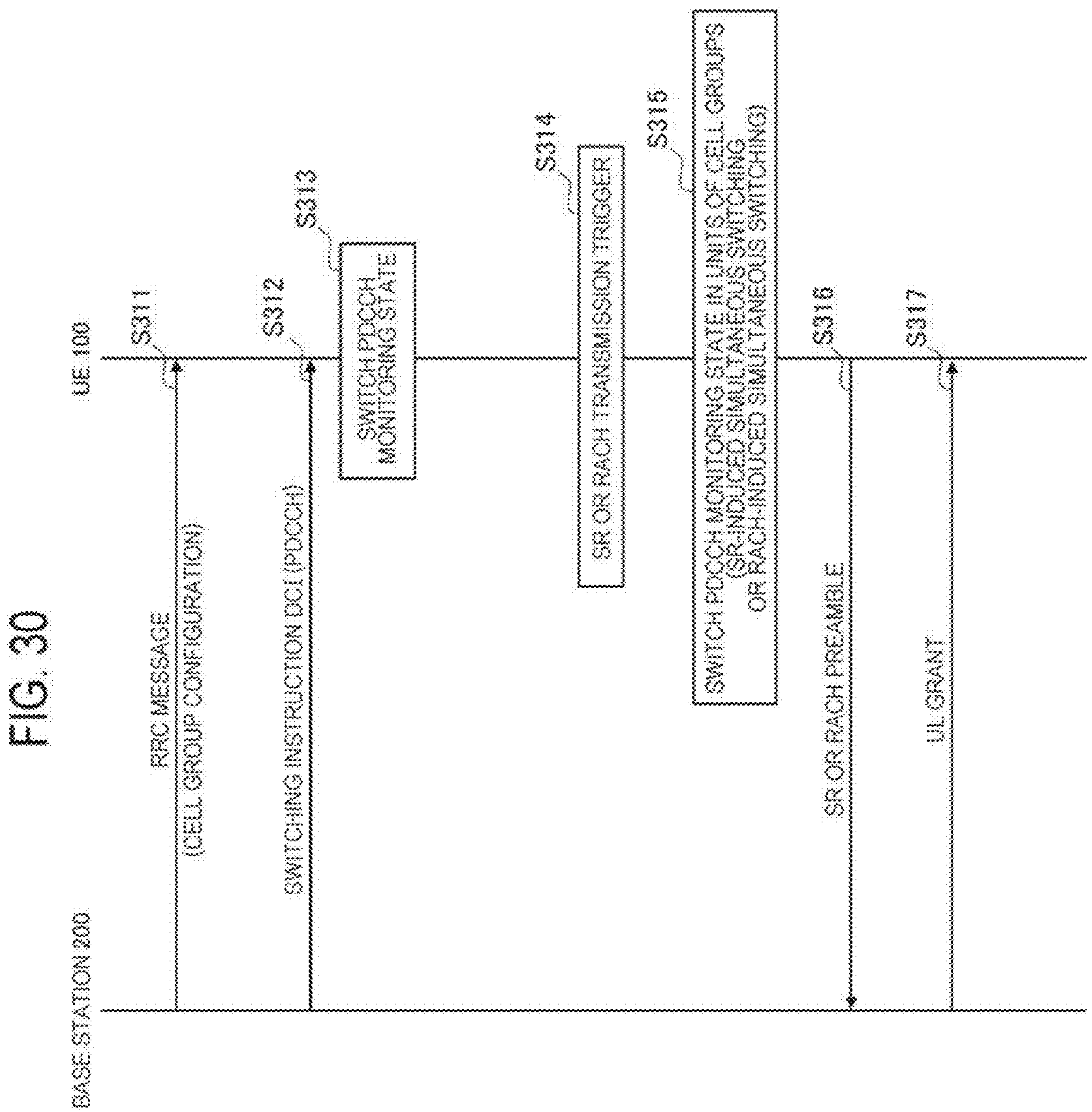
FIG. 30 is a diagram illustrating a second operation sequence example related to the simultaneous switching processing according to the embodiment.

With reference to FIG. 30, the difference from the above-described first operation sequence example will be mainly described for the second operation sequence example related to the simultaneous switching processing according to the present embodiment. In the second operation sequence example, the UE 100 (the controller 120) performs the SR-induced switching processing or the RACH-induced switching processing in a cell group unit including a plurality of serving cells according to the SR transmission trigger or the RACH transmission trigger.

Figure 29:
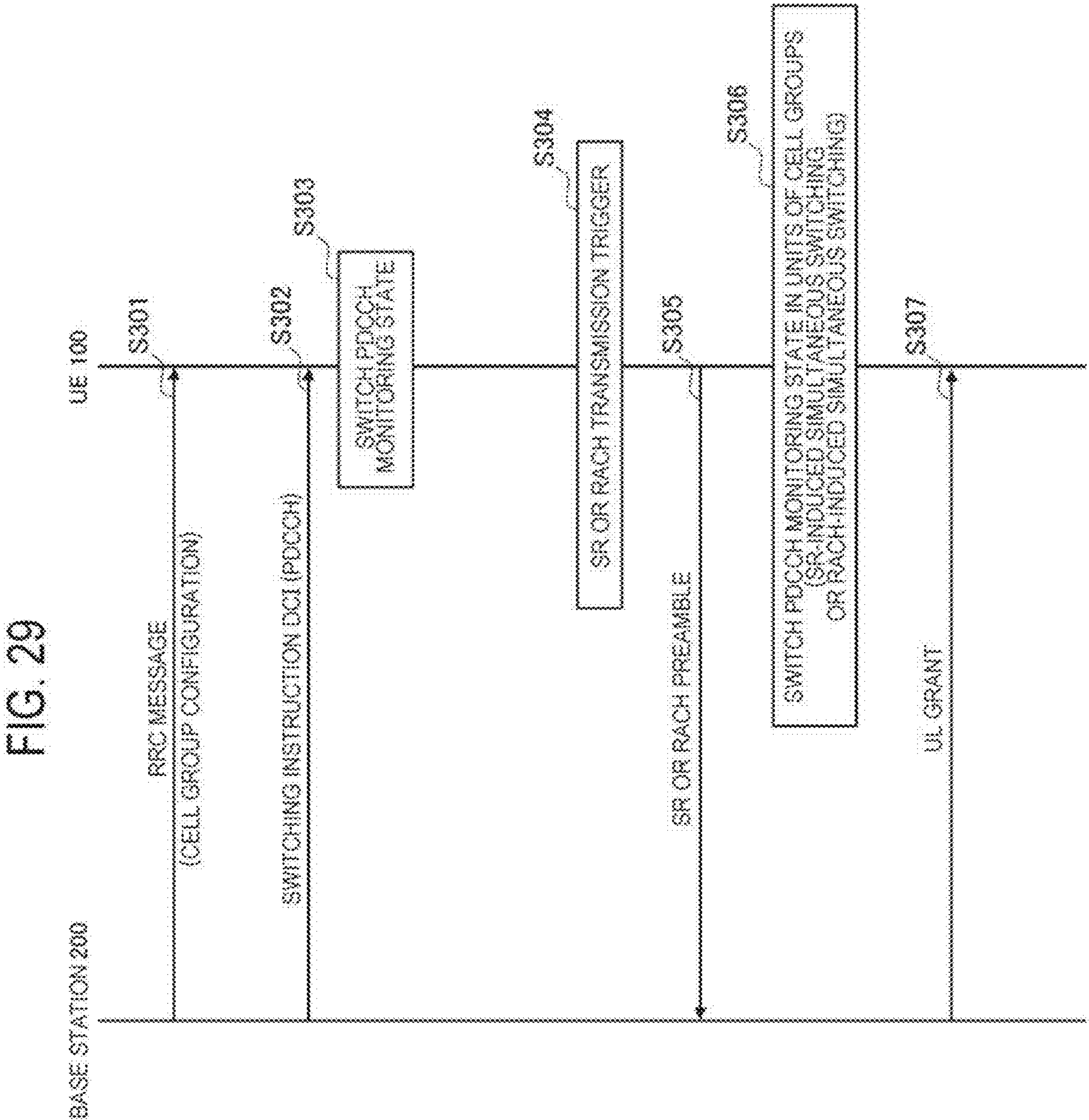
FIG. 29 is a diagram illustrating a first operation sequence example related to the simultaneous switching processing according to the embodiment.

In FIG. 30, the operations in steps S311 to S314 are similar to the operations in steps S301 to S304 in FIG. 29.

In step S315, the UE 100 (the controller 120) switches the PDCCH monitoring state in response to the SR or RACH transmission trigger (the SR-induced simultaneous switching processing or the RACH-induced simultaneous switching processing).

Here, in response to the SR transmission trigger, the UE 100 (the controller 120) may perform the SR-caused simultaneous switching processing on the cell group to which the DL CC corresponding to the UL CC on which the SR is transmitted belongs.

Similarly, the UE 100 (the controller 120) may perform the RACH-induced simultaneous switching processing for the cell group to which the DL CC corresponding to the UL CC in which the RACH is transmitted belongs in response to the transmission trigger of the RACH (RACH preamble).

The UE 100 (the controller 120) may perform the RACH-induced simultaneous switching processing on the PTAG in response to the transmission trigger of the RACH in the PTAG. The UE 100 (the controller 120) may perform the RACH-induced simultaneous switching processing on the STAG in response to the transmission trigger of the RACH in the STAG.

In step S316, the UE 100 (the transmitter 111) transmits the SR or the RACH preamble to the base station 200.

In step S317, the base station 200 (the controller 230) allocates the UL-SCH resource to the UE 100 in response to the reception of the SR or the RACH preamble from the UE 100.

Note that, in the operation sequence example related to the simultaneous switching processing according to the present embodiment, the cell group to which the simultaneous switching processing is applied is preconfigured from the base station 200 to the UE 100 by the RRC message. However, similarly to the operation of FIG. 24, the base station 200 may instruct the UE 100 of the cell group to which the simultaneous switching processing is applied by the MAC CE.

(9) Other Embodiments

The operation sequence (and the operation flow) in the above-described embodiment may not necessarily be executed in time series according to the order described in the flow diagram or the sequence diagram. For example, the steps in the operation may be performed in an order different from the order described as the flow diagram or the sequence diagram, or may be performed in parallel. In addition, some of the steps in the operation may be removed and additional steps may be added to the processing. Furthermore, the operation sequence (and the operation flow) in the above-described embodiment may be performed separately and independently, or may be performed by combining two or more operation sequences (and operation flows). For example, some steps of one operation flow may be added to another operation flow, or some steps of one operation flow may be replaced with some steps of another operation flow.

In the above-described embodiments, the base station 200 may include a plurality of units. The plurality of units may include a first unit that hosts a higher layer (higher layer) included in the protocol stack and a second unit that hosts a lower layer (lower layer) included in the protocol stack. The higher layer may include the RRC layer, the SDAP layer, and the PDCP layer, and the lower layer may include the RLC layer, the MAC layer, and the PHY layer. The first unit may be a CU (central unit), and the second unit may be a DU (Distributed Unit). The plurality of units may include a third unit that performs processing of a lower layer of the PHY layer. The second unit may perform processing of a higher layer of the PHY layer. The third unit may be an RU (Radio Unit). The base station 200 may be one of the plurality of units, and may be connected to another unit of the plurality of units. In addition, the base station 200 may be an IAB (Integrated Access and Backhaul) donor or an IAB node.

In the above-described embodiments, a mobile communication system based on the NR is described as an example of the mobile communication system 1. However, the mobile communication system 1 is not limited to this example. The mobile communication system 1 may be a system conforming to a TS of any of LTE or another generation system (for example, sixth generation) of the 3GPP standard. The base station 200 may be an eNB providing protocol terminations of E-UTRA user plane and control plane toward the UE 100 in LTE. The mobile communication system 1 may be a system conforming to a TS defined in a standard other than the 3GPP standard.

A program for causing a computer to execute each processing performed by the UE 100 or the base station 200 may be provided. The program may be recorded on a computer readable medium. The program can be installed in the computer by using the computer readable medium. Here, the computer readable medium on which the program is recorded may be a non-transitory recording medium. The non-transitory recording medium is not particularly limited, but may be, for example, a recording medium such as a CD-ROM or a DVD-ROM. In addition, a circuit that executes each processing performed by the UE 100 or the base station 200 may be integrated, and at least a part of the UE 100 or the base station 200 may be configured as a semiconductor integrated circuit (chipset, SoC).

In the above-described embodiment, "transmit (transmit)" may mean to perform processing of at least one layer in a protocol stack used for transmission, or may mean to physically transmit a signal wirelessly or by wire. Alternatively, "transmit" may mean a combination of performing the processing of at least one layer and physically transmitting a signal wirelessly or by wire. Similarly, "receive (receive)" may mean to perform processing of at least one layer in a protocol stack used for reception, or may mean to physically receive a signal wirelessly or by wire. Alternatively, "receive" may mean a combination of performing the processing of at least one layer and physically receiving a signal wirelessly or by wire. Similarly, "acquire (obtain/acquire)" may mean to acquire information from stored information, may mean to acquire information from information received from another node, or may mean to acquire the information by generating information. Similarly, "include (include)"

and "comprise (comprise)" do not mean to include only the listed items, but mean that the terms may include only the listed items or may include additional items in addition to the listed items. Similarly, in the present disclosure, "or (or)" does not mean exclusive OR but means OR.

Although the present disclosure has been described in accordance with examples, it is understood that the present disclosure is not limited to the examples and structures. The present disclosure also includes various modification examples and modifications within an equivalent range. In addition, various combinations and modes, and other combinations and modes including only one element, more elements, or less elements are also within the scope and idea of the present disclosure.

(10) Supplementary Note

Features related to the above-described embodiment will be additionally described.

(Supplementary Note 1)

A communication apparatus (100) that performs radio communication with a base station (200), the communication apparatus including:

- a transmitter (111) configured to transmit a scheduling request (SR) to the base station (200);
- a controller (120) configured to perform an SR-induced switching processing of switching a PDCCH monitoring state related to monitoring of a physical downlink control channel (PDCCH) in response to the SR transmission or the SR transmission trigger; and
- a receiver (112) configured to receive a radio resource control (RRC) message including switching control information for controlling the SR-induced switching processing from the base station (200), in which
- the controller (120) is configured to control the SR-induced switching processing based on the switching control information.

(Supplementary Note 2)

The communication apparatus (100) according to Supplementary note 1, in which

- the RRC message includes an SR configuration for configuring a parameter for an SR resource, and
- the SR configuration includes the switching control information.

(Supplementary Note 3)

The communication apparatus (100) according to Supplementary note 2, in which

- the SR configuration includes a plurality of SR resource configurations each associated with a logical channel,
- each of the plurality of SR resource configurations includes the switching control information, and
- the controller (120) is configured to control the SR-induced switching processing based on the switching control information corresponding to one logical channel in response to the SR transmission or the SR transmission trigger in the one logical channel.

(Supplementary Note 4)

The communication apparatus (100) according to any one of Supplementary notes 1 to 3, in which

- the switching control information is information related to whether the SR-induced switching processing is enabled, and
- the controller (120) is configured to perform the SR-induced switching processing based on the switching control information indicating that the SR-induced switching processing is enabled.

(Supplementary Note 5)

The communication apparatus (100) according to Supplementary note 4, in which

- the controller (120) is configured to switch to a predetermined PDCCH monitoring state in the SR-induced switching processing.

(Supplementary Note 6)

The communication apparatus (100) according to any one of Supplementary notes 1 to 4, in which

- the switching control information is information for designating a PDCCH monitoring state after switching by the SR-induced switching processing, and
- the controller (120) is configured to switch to the PDCCH monitoring state designated by the switching control information in the SR-induced switching processing.

(Supplementary Note 7)

The communication apparatus (100) according to any one of Supplementary notes 1 to 6, in which

- the controller (120) is configured to perform control so that the SR-induced switching processing is not performed in a case where the RRC message does not include the switching control information.

(Supplementary Note 8)

The communication apparatus (100) according to any one of Supplementary notes 1 to 7, in which

- the transmitter (111) is configured to transmit a negative SR whose value is set to "0" to the base station (200), and
- in a case where the negative SR is transmitted, the controller (120) is configured to perform control so that the SR-induced switching processing is not performed.

(Supplementary Note 9)

The communication apparatus (100) according to any one of Supplementary notes 1 to 8, in which

- the SR transmission trigger includes instructing the SR transmission from a media access control (MAC) layer to a physical layer in the communication apparatus (100).

(Supplementary Note 10)

The communication apparatus (100) according to any one of Supplementary notes 1 to 9, in which

- the SR-induced switching processing is a process of switching the PDCCH monitoring state from a first monitoring state to a second monitoring state, and
- the second monitoring state is a state in which the PDCCH is monitored more frequently than the first monitoring state.

(Supplementary Note 11)

The communication apparatus (100) according to Supplementary note 10, in which

- the first monitoring state is a state in which the PDCCH is monitored in a first period, and
- the second monitoring state is a state in which the PDCCH is monitored in a second period shorter than the first period.

(Supplementary Note 12)

The communication apparatus (100) according to Supplementary note 10, in which

- the first monitoring state is a state in which the PDCCH is not monitored, and
- the second monitoring state is a state in which the PDCCH is periodically monitored.

(Supplementary Note 13)

The communication apparatus (100) according to any one of Supplementary notes 10 to 12, in which

- the controller (120) is configured to initiate a first timer that defines a duration of the first monitoring state at a start of the first monitoring state, and the controller (120) is configured to stop the first timer when performing the SR-induced switching processing.

(Supplementary Note 14)

The communication apparatus (100) according to any one of Supplementary notes 10 to 13, in which the controller (120) is configured to start a second timer that determines the duration of the second monitoring state when performing the SR-induced switching processing.

(Supplementary Note 15)

The communication apparatus (100) according to Supplementary note 14, in which the RRC message includes information for configuring a timer value indicating a duration of the second monitoring state, and the controller (120) is configured to start the second timer in which the timer value is set when the SR-induced switching processing is performed.

(Supplementary Note 16)

The communication apparatus (100) according to Supplementary note 14 or 15, in which the receiver (112) is configured to receive, from the base station (200), scheduling downlink control information (DCI) used for radio resource allocation in the second monitoring state, and the controller (120) is configured to restart the second timer in response to reception of the scheduling DCI.

(Supplementary Note 17)

The communication apparatus (100) according to any one of Supplementary notes 14 to 16, in which the controller (120) is configured to restart the second timer in response to the SR transmission or the SR transmission trigger in the second monitoring state.

(Supplementary Note 18)

The communication apparatus (100) according to any one of Supplementary notes 14 to 17, in which the controller (120) is configured to switch to a predetermined PDCCH monitoring state in response to expiration of the second timer.

(Supplementary Note 19)

A base station (200) that performs radio communication with a communication apparatus (100), the base station including:

a receiver (212) configured to receive a scheduling request (SR) from the communication apparatus (100); and a transmitter (211) configured to transmit a radio resource control (RRC) message including switching control information for controlling an SR-induced switching processing to the communication apparatus (100), in which the SR-induced switching processing is a process in which the communication apparatus (100) switches a PDCCH monitoring state related to monitoring of a physical downlink control channel (PDCCH) in response to SR transmission or an SR transmission trigger.

(Supplementary Note 20)

A communication method used by a communication apparatus (100) that performs radio communication with a base station (200), the communication method including the steps of:

receiving, from the base station (200), a radio resource control (RRC) message including switching control information;

performing SR transmission to the base station (200); and performing the SR-induced switching processing according to the SR transmission or the SR transmission trigger based on the switching control information, in which the SR-induced switching processing is a process in which the communication apparatus (100) switches a PDCCH monitoring state related to monitoring of a physical downlink control channel (PDCCH) in response to SR transmission or an SR transmission trigger.

The invention claimed is:

1. A communication apparatus comprising:

a receiver configured to:

receive, from a base station, a radio resource control (RRC) message including first information and second information, the first information configuring a plurality of cell groups, the second information configuring a duration in unit of slots for skipping of physical downlink control channel (PDCCH) monitoring, and receive, from the base station, a downlink control information (DCI) format including an information field related to the skipping of the PDCCH monitoring, a controller configured to start the skipping of the PDCCH monitoring for the duration on a downlink bandwidth part (BWP) of a serving cell in a case where the duration is configured and a value indicating the skipping of the PDCCH monitoring for the duration is set in the information field, and a transmitter configured to transmit, to the base station, a positive scheduling request (SR), wherein the controller is configured to, in a case where the duration is configured and the positive SR is transmitted on a physical uplink control channel (PUCCH) after receiving the DCI format including the information field in which the value is set, resume the PDCCH monitoring in all serving cells of a cell group corresponding to the transmission of the positive SR, the cell group being one of the plurality of cell groups configured based on-determined according to the first information.

2. The communication apparatus according to claim 1, wherein;

the DCI format is used for scheduling of a physical uplink shared channel (PUSCH) or a physical downlink shared channel (PDSCH), and a cyclic redundancy check (CRC) scrambled by one of a cell-radio network temporary identifier (C-RNTI), a modulation and coding scheme-C-RNTI (MCS-C-RNTI) and a configured scheduling radio network temporary identifier (CS-RNTI) is attached to the DCI format.

3. A base station comprising:

a transmitter configured to:

transmit, to a communication apparatus, a radio resource control (RRC) message including first information and second information, the first information configuring a plurality of cell groups, the second information configuring a duration in unit of slots for skipping of physical downlink control channel (PDCCH) monitoring, and transmit, to the communication apparatus, a downlink control information (DCI) format including an information field related to the skipping of the PDCCH monitoring, a controller configured to control the communication apparatus to start the skipping of the PDCCH monitoring for the duration on a downlink bandwidth part (BWP) of a serving cell in a case where the duration is configured and a value indicating the skipping of the PDCCH monitoring for the duration is set in the information field, and a receiver configured to receive, from the communication apparatus, a positive scheduling request (SR), wherein the controller is configured to control the communication apparatus to, when the communication apparatus transmits in a case where the duration is configured and the positive SR is received on a physical uplink control channel (PUCCH) after transmitting the DCI format including the information field in which the value is set, resume the PDCCH monitoring in all serving cells of a cell group corresponding to the transmission of the positive SR, the cell group being one of the plurality of cell groups configured based on the first information.

4. The base station according to claim 3, wherein:

the DCI format is used for scheduling of a physical uplink shared channel (PUSCH) or a physical downlink shared channel (PDSCH), and a cyclic redundancy check (CRC) scrambled by one of a cell-radio network temporary identifier (C-RNTI), a modulation and coding scheme-C-RNTI (MCS-C-RNTI) and a configured scheduling radio network temporary identifier (CS-RNTI) is attached to the DCI format.

5. A method executed by a communication apparatus, the method comprising:

receiving, from a base station, a radio resource control (RRC) message including first information and second information, the first information configuring a plurality of cell groups, the second information configuring a duration in unit of slots for skipping of physical downlink control channel (PDCCH) monitoring;

receiving, from the base station, a downlink control information (DCI) format including an information field related to the skipping of the PDCCH monitoring;

starting the skipping of the PDCCH monitoring for the duration on a downlink bandwidth part (BWP) of a serving cell in a case where the duration is configured and a value indicating the skipping of the PDCCH monitoring for the duration is set in the information field;

transmitting, to the base station, a positive scheduling request (SR), and in a case where the duration is configured and the positive SR is transmitted on a physical uplink control channel (PUCCH) after receiving the DCI format including the information field in which the value is set, resuming the PDCCH monitoring in all serving cells of a cell group corresponding to the transmission of the positive SR, the cell group being one of the plurality of cell groups configured based on the first information.

6. The method according to claim 5, wherein:

the DCI format is used for scheduling of a physical uplink shared channel (PUSCH) or a physical downlink shared channel (PDSCH), and a cyclic redundancy check (CRC) scrambled by one of a cell-radio network temporary identifier (C-RNTI), a modulation and coding scheme-C-RNTI (MCS-C-RNTI) and a configured scheduling radio network temporary identifier (CS-RNTI) is attached to the DCI format.

* * * * *